United States Patent
Green et al.

(10) Patent No.: US 9,743,124 B2
(45) Date of Patent: Aug. 22, 2017

(54) SYSTEMS AND METHODS TO DELIVER A PERSONALIZED MEDIACAST WITH AN UNINTERRUPTED LEAD-IN PORTION

(71) Applicant: Abacast, Inc., Vancouver, WA (US)

(72) Inventors: Robert D. Green, Seattle, WA (US); James M. Kott, Kirkland, WA (US); John W. Morris, IV, Washougal, WA (US)

(73) Assignee: WIDEORBIT INC., San Francisco, CA (US)

( * ) Notice: Subject to any disclaimer, the term of this patent is extended or adjusted under 35 U.S.C. 154(b) by 0 days.

(21) Appl. No.: 14/485,416

(22) Filed: Sep. 12, 2014

(65) Prior Publication Data

US 2015/0074732 A1    Mar. 12, 2015

Related U.S. Application Data

(60) Provisional application No. 61/877,182, filed on Sep. 12, 2013.

(51) Int. Cl.
    *H04N 21/2668*    (2011.01)
    *H04N 21/234*    (2011.01)
    (Continued)

(52) U.S. Cl.
    CPC ... *H04N 21/2668* (2013.01); *H04N 21/23106* (2013.01); *H04N 21/23418* (2013.01);
    (Continued)

(58) Field of Classification Search
    CPC ......... H04N 21/23418; H04N 21/2668; H04N 21/23106
    See application file for complete search history.

(56) References Cited

U.S. PATENT DOCUMENTS 5,351,135 A    9/1994    Saeger
6,487,721 B1    11/2002    Safadi
(Continued)

FOREIGN PATENT DOCUMENTS

WO    2015/175121 A1    11/2015

OTHER PUBLICATIONS

Green et al., "Systems and Methods to Deliver a Personalized Mediacast," U.S. Appl. No. 61/611,403, filed Mar. 15, 2012, 75 pages.
(Continued)

*Primary Examiner* — Olugbenga Idowu
(74) *Attorney, Agent, or Firm* — Seed IP Law Group LLP

(57) ABSTRACT

Content delivery is provided responsive to mediacast content consumer requests by providing personalized mediacasts to each of a plurality of mediacast content consumers. Each of the personalized mediacasts includes a variety of replaceable programming and non-programming content segments and a variety of non-replaceable programming and non-programming content segments. Replacement programming and non-programming content segments may be targeted, for example selected based in part on one or more selection criterion associated with the mediacast content consumer, or provided by the broadcaster or Webcaster. A buffering scheme may be employed to inherently adjust asynchronicity between a broadcast or Webcast and a personalized mediacast. Actual insertion of replacement programming and non-programming content segments may occur upstream of a content consumer device or at the content consumer device.

30 Claims, 13 Drawing Sheets

(51) Int. Cl.
  *H04N 21/231* (2011.01)
  *H04N 21/262* (2011.01)
  *H04N 21/643* (2011.01)
  *H04N 21/81* (2011.01)
  *H04N 21/845* (2011.01)

(52) U.S. Cl.
  CPC .. *H04N 21/26258* (2013.01); *H04N 21/64322* (2013.01); *H04N 21/812* (2013.01); *H04N 21/8456* (2013.01)

(56) References Cited

U.S. PATENT DOCUMENTS

| | | | |
|---|---|---|---|
| 6,577,716 B1 | 6/2003 | Minter et al. | |
| 7,412,714 B2 | 8/2008 | Kitayama | |
| 7,676,405 B2 | 3/2010 | Steelberg et al. | |
| 7,747,769 B1 | 6/2010 | Kearns et al. | |
| 7,752,642 B2 | 7/2010 | Lemmons | |
| 7,925,774 B2 | 4/2011 | Zhang et al. | |
| 7,979,877 B2 | 7/2011 | Huber et al. | |
| 8,230,037 B2 | 7/2012 | Story et al. | |
| 8,387,102 B1* | 2/2013 | Roberts | H04N 21/2393 725/94 |
| 8,700,792 B2* | 4/2014 | Hughes | H04N 7/17318 709/231 |
| 8,812,637 B2 | 8/2014 | Cragun et al. | |
| 8,819,754 B2 | 8/2014 | Virdi et al. | |
| 8,893,208 B2 | 11/2014 | Ma et al. | |
| 9,032,456 B2* | 5/2015 | Pierson | G11B 27/005 725/101 |
| 2001/0023498 A1 | 9/2001 | Cosmao et al. | |
| 2002/0078443 A1 | 6/2002 | Gadkari et al. | |
| 2003/0028873 A1 | 2/2003 | Lemmons | |
| 2003/0033157 A1 | 2/2003 | Dempski et al. | |
| 2003/0037068 A1* | 2/2003 | Thomas | H04N 5/76 |
| 2003/0188320 A1 | 10/2003 | Shing | |
| 2004/0025176 A1 | 2/2004 | Franklin et al. | |
| 2004/0073916 A1 | 4/2004 | Petrovic et al. | |
| 2004/0088726 A1 | 5/2004 | Ma et al. | |
| 2004/0128682 A1 | 7/2004 | Liga et al. | |
| 2004/0133467 A1 | 7/2004 | Siler | |
| 2007/0074243 A1 | 3/2007 | Verhaegh et al. | |
| 2007/0157228 A1 | 7/2007 | Bayer et al. | |
| 2007/0220411 A1 | 9/2007 | Hauser | |
| 2008/0120638 A1 | 5/2008 | King et al. | |
| 2009/0031037 A1 | 1/2009 | Mendell et al. | |
| 2009/0060458 A1 | 3/2009 | Bauchot et al. | |
| 2010/0223314 A1 | 9/2010 | Gadel et al. | |
| 2010/0269138 A1 | 10/2010 | Krikorian et al. | |
| 2010/0280889 A1 | 11/2010 | Gabriel et al. | |
| 2010/0293046 A1 | 11/2010 | Cooke et al. | |
| 2011/0145370 A1 | 6/2011 | Nieuwenhuys | |
| 2013/0132997 A1 | 5/2013 | King et al. | |
| 2013/0144723 A1 | 6/2013 | Green et al. | |
| 2013/0198328 A1 | 8/2013 | Green et al. | |
| 2013/0246567 A1 | 9/2013 | Green et al. | |
| 2013/0282495 A1 | 10/2013 | Gilbane et al. | |
| 2014/0068648 A1 | 3/2014 | Green et al. | |
| 2014/0109136 A1 | 4/2014 | Evans et al. | |
| 2014/0149596 A1 | 5/2014 | Emerson, III | |
| 2014/0223475 A1 | 8/2014 | McIntire et al. | |
| 2014/0280746 A1 | 9/2014 | Johns | |
| 2015/0334434 A1 | 11/2015 | Green et al. | |

OTHER PUBLICATIONS

Green et al., "Systems and Methods to Deliver a Personalized Mediacast," Notice of Allowance mailed Nov. 6, 2014, for U.S. Appl. No. 13/711,984, 22 pages.
Green et al., "Systems and Methods to Deliver a Personalized Mediacast With an Uninterrupted Lead-In Portion," U.S. Appl. No. 61/877,182, filed Sep. 12, 2013, 171 pages.
Green et al., "Systems and Methods to Identify Video Content Types," U.S. Appl. No. 61/992,662, filed May 13, 2014, 100 pages.
Green et al., "Systems, Methods and Articles to Automatically Expose and Place Material in Streams of Programming," U.S. Appl. No. 61/561,186, filed Nov. 17, 2011, 70 pages.
Green et al., "Systems, Methods and Articles to Automatically Expose and Place Material in Streams of Programming," Office Action mailed May 14, 2014, for U.S. Appl. No. 13/679,828, 49 pages.
Green et al., "Systems, Methods and Articles to Automatically Expose and Place Material in Streams of Programming," Amendment filed Oct. 13, 2014, for U.S. Appl. No. 13/679,828, 20 pages.
Green et al., "Systems, Methods and Articles to Provide Content in Networked Environment," U.S. Appl. No. 61/587,475, filed Jan. 17, 2012, 98 pages.
Green et al., "Systems, Methods and Articles to Provide Content in Networked Environment," U.S. Appl. No. 61/677,968, filed Jul. 31, 2012, 84 pages.
Green et al., "Systems, Methods and Articles to Provide Content in Networked Environment," Office Action mailed Apr. 11, 2014, for U.S. Appl. No. 13/956,020, 13 pages.
Green et al., "Systems, Methods and Articles to Provide Content in Networked Environment," Amendment filed Sep. 11, 2014, for U.S. Appl. No. 13/956,020, 15 pages.
Green et al., "Systems, Methods and Articles to Provide Content in Networked Environment," Office Action mailed Oct. 7, 2014, for U.S. Appl. No. 13/956,020, 15 pages.
King et al., "Content Injection System and Methodology," Office Action mailed Jul. 7, 2010, for U.S. Appl. No. 11/985,143, 12 pages.
King et al., "Content Injection System and Methodology," Amendment filed Jan. 7, 2011, for U.S. Appl. No. 11/985,143, 11 pages.
King et al., "Content Injection System and Methodology," Supplemental Response filed Jan. 20, 2011, for U.S. Appl. No. 11/985,143, 13 pages.
King et al., "Content Injection System and Methodology," Office Action mailed Mar. 29, 2011, for U.S. Appl. No. 11/985,143, 15 pages.
King et al., "Content Injection System and Methodology," Amendment filed May 27, 2011, for U.S. Appl. No. 11/985,143, 21 pages.
King et al., "Content Injection System and Methodology," Office Action mailed Feb. 21, 2012, for U.S. Appl. No. 11/985,143, 14 pages.
King et al., "Content Injection System and Methodology," Amendment filed Jul. 6, 2012, for U.S. Appl. No. 11/985,143, 25 pages.
King et al., "Content Injection System and Methodology," Notice of Allowance mailed Oct. 15, 2012, for U.S. Appl. No. 11/985,143, 16 pages.
King et al., "Content Injection System and Methodology," U.S. Appl. No. 60/860,573, filed Nov. 21, 2006, 7 pages.
Green et al., "Systems, Methods and Articles to Automatically Expose and Place Material in Streams of Programming," Office Action mailed Jan. 28, 2015, for U.S. Appl. No. 13/679,828, 55 pages.
King et al., "Content Injection System and Methodology," Office Action mailed Feb. 25, 2015, for U.S. Appl. No. 13/744,129, 13 pages.
International Search Report, mailed Aug. 10, 2015, for PCT/US2014/068876, 3 pages.
Written Opinion, mailed Aug. 10, 2015, for PCT/US2014/068876, 6 pages.
Geen et al., "Systems and Methods to Identify Video Content Types," Final Office Action, mailed Aug. 22, 2016, for U.S. Appl. No. 14/679,755, 23 pages.
Green et al., "Content Management and Provisioning System," U.S. Appl. No. 62/172,693, filed Jun. 8, 2015, 43 pages.
Green et al., "Systems and Methods to Identify Video Content Types,"Amendment, filed Jun. 7, 2016, for U.S. Appl. No. 14/679,755, 16 pages.
Green et al., "Systems and Methods to Identify Video Content Types," Preliminary Amendment filed Apr. 6, 2015, for U.S. Appl. No. 14/679,755, 10 pages.
Green et al., "Systems and Methods to Identify Video Content Types," Office Action. mailed Mar. 10, 2016, for U.S. Appl. No. 14/679,755, 26 pages.

(56) References Cited

OTHER PUBLICATIONS

Green et al., "Systems, Methods and Articles to Automatically Expose and Place Material in Streams of Programming," Amendment filed Jun. 25, 2015, 2015, for U.S. Appl. No. 13/679,828, 23 pages.
Hacker, "MP3: The Definite Guide," Sebastopol, CA, O'Reilly & Associates, Inc., First Edition, Mar. 2000, 378 pages.
International Search Report and Written Opinion, mailed Jun. 29, 2015, for corresponding International Application No. PCT/US2015/025279, 15 pages.
"Alarm-Allocation," *Microsoft Computer Dictionary*, Fifth Edition, Microsoft Press, 2002, p. 23.
"Determinism," *Brittanica Concise Encyclopedia*, Encyclopedia Brittanica, 2006, p. 537, 6 pages.
Baum, "2: The Mind Is a Computer Program," *What is Thought?*, The MIT Press, 2004, pp. 33-65, 38 pages.
Finney et al., "Predicting Partial Paths from Planning Problem Parameters," *Robotics, Science and Systems III*, Burgard et al. (eds.), The MIT Press, 2008, pp. 41-48, 11 pages.
Green et al., "Systems, Methods and Articles to Automatically Expose and Place Material in Streams of Programming," Office Action mailed Oct. 19, 2016, for U.S. Appl. No. 13/679,828, 18 pages.
International Preliminary Report on Patentability, issued Nov. 15, 2016, for corresponding International Application No. PCT/US2015/025279, 10 pages.
Krader, *Noetics: The Science of Thinking and Knowing*, Peter Lang Publishing, 2010, pp. 551-553, 5 pages.
Searle, *Mind—A Brief Introduction*, Oxford University Press, 2004, pp. 62-73, 16 pages.

* cited by examiner

SYSTEMS AND METHODS TO DELIVER A PERSONALIZED MEDIACAST WITH AN UNINTERRUPTED LEAD-IN PORTION

BACKGROUND

This disclosure generally relates to the automated provision of content to content consumers in a networked environment in a modified form from content broadcast or Webcast by content providers, and more particularly to insertion of alternative content segments into a sequence of content segments.

DESCRIPTION OF THE RELATED ART

Content providers such as radio stations and networks, television stations and networks (collectively, "broadcasters"), and Webcasters provide programming including programming content segments (e.g. music, talk, news, sports, weather, etc.) and non-programming content segments (e.g. advertisements, legal notices, etc.). Content providers' delivery of content via traditional "over the air" or terrestrial broadcast is often supplemented with Webcasts. In some instances, the Webcasts may be transmitted substantially contemporaneous with the broadcast. While content providers may employ repeaters and the like, broadcasts are typically limited in range to a geographic region.

Programming, for example broadcast or Webcast programming, often includes non-programming content or advertisements interspersed with the subject matter of the programming content which is the principal or main subject of the programming offered by the content provider. Programming content segments are often interspersed with non-programming content segments that are sometimes referred to as "ad breaks" since the non-programming content segments are often composed principally of paid advertising. Content providers typically sell advertising time to generate revenue to fund operation, as well as generate profits, where the content provider is a commercial entity rather than a nonprofit entity. Given that most broadcasts are local in nature or extent, broadcasters often carry advertisements and other material which is of a somewhat local or parochial interest. For example, a local chain may place advertisements with a local broadcaster since the audience targeted by the local chain is also often local and local advertising tends to be less expensive than regional or national advertising.

Often, content providers provide an alternative source of the programming, for example, providing a Webcast or even a podcast of the programming. The audience for the alternative source of programming may be significantly different from the audience for the broadcast. For example, the audience for the alternative source of programming may be more geographically diverse, or may be more comfortable with technologies such as streaming of content to desktop computers or even Smartphone devices. As such, the non-programming content interspersed in a broadcast or Webcast may not be particularly well suited, applicable or of interest to the audience of the alternative source of programming.

Content providers are increasingly using content delivery networks (CDNs) to cache content throughout a network. CDNs are typically a system of computers, often configured as servers, and may be geographically dispersed with respect to one another. CDNs are typically operated by third party entities. CDNs may improve access, for example allowing lowest cost routing and reducing latency. CDNs may also provide a measure of redundancy.

New approaches that automate the various activities related to providing requested content, customized or otherwise modified with or by the insertion of new or replacement materials, for instance, replacement programming content and replacement non-programming content to provide a personalized mediacast to each mediacast content consumer receiving the broadcast or Webcast are therefore quite desirable.

BRIEF SUMMARY

A content provider, for instance a broadcaster or Webcaster, may accommodate delivery of personalized broadcasts or Webcasts (collectively "personalized mediacasts") to audience members (collectively "mediacast content consumers"). In a personalized mediacast, each mediacast content consumer is provided the ability to replace selected portions of the programming content (e.g., content that is the principal or main content or subject of the broadcast or Webcast) provided by the broadcaster or Webcaster with new or replacement programming content. The programming content may take a variety of forms. For example, a radio station's primary content may be local news, weather, sports, songs, talk segments, comedy sketches or dramas. A television station's primary content may include televisions shows, including dramas, comedies, movies, or news segments. A Webcaster's primary content may include reviews of various devices, news reports, etc. Some or all of the programming content may be live. For example, a disc jockey may introduce a song or artist or may talk about past shows or concerts. News, weather, traffic, or sports are also often reported live. In some instances, the programming content may be recorded live, that is without interruptions, second takes or editing. For example, standup comedy may be recorded live. In still other instances, some or all of the programming content may be recorded. For example, interviews or documentaries may be pre-recorded, including use of retakes and/or editing. The programming content should not be confused with non-programming content, that is material that is not the primary or main content or subject of the broadcasts or Webcasts. Non-programming content may take a variety of forms, the most ubiquitous being paid advertisements or commercials.

Various systems and methods are described herein which provide personalized mediacasts which includes at least some programming content that is selected based on an end user or content consumer's expressed or discernible preferences, in addition to some content from a broadcast or Webcast. The content consumer specific programming content in the personalized mediacast may substitute for, replace or otherwise incorporate some of the programming content from the broadcast or Webcast. Various systems and methods are capable of interspersing live programming with content consumer specific on-demand programming, As described herein, the various systems and methods may advantageously employ buffering in interspersing live programming with content consumer specific on-demand programming.

Thus, the end user or content consumer can exercise a degree of control over programming content delivered to their media device. This contrasts with more conventional approaches which essentially replicates the broadcast or Webcast in a unicast fashion. This also contrasts with more recent approaches which may replace local advertisements in a broadcast with more generic advertisements in a streaming of the broadcast.

The various systems and methods may optionally buffer programming, or portions thereof. Such may advantageously allow substitution or replacement of broadcast or Webcast programming with new or replacement programming with little or no concern about matching lengths or durations of new or replacement programming segments with the lengths or durations of programming segments being replaced. For example, if new or replacement content is still being stream when a non-replaceable content segment of a broadcast begins, the non-replaceable content is buffered until the new or replacement content segment is finished. The non-replaceable content is then delivered or play from the buffer. Likewise, if non-replaceable content is still being delivered or streamed from the buffer when a marker or metadata indicates that a replaceable content segment is beginning in the broadcast or Webcast, the delivery or playing of the non-replaceable content from the buffer is finish. Such may inherently reduce synchronicity between the broadcast or Webcast and the personalized mediacast.

The various systems and methods may optionally provide personalized mediacasts which include at least some non-programming content (e.g., advertisements, commercials) that is selected based on an end user or content consumer's expressed or discernible preferences. Such may be in place of, or in addition to, some non-programming content from the broadcast or Webcast. Such content consumer specific non-programming content may be selected based on a variety of criteria for instance geo-targeting, device targeting, or demographic targeting.

A number of embodiments may employ a steaming delivery approach, for example buffering of portions of a broadcast.

For example, a method of operation in a content personalization system, the system may include at least one processor and at least one nontransitory processor-readable medium communicatively coupled to the at least one processor, the method may be summarized as including in response to a request to start a unicast delivery of a sequence of broadcast content: causing delivery of lead-in programming content via unicast delivery, by at least one component of the content personalization system; determining whether a satisfaction condition is reached after a start of the causing of delivery of the lead-in programming content, by at least one component of the content personalization system; buffering at least some subsequent broadcast content of the sequence of broadcast content, by at least one component of the content personalization system; in response to reaching the satisfaction condition, monitoring for at least one of an end of a segment of the lead-in programming content which is being caused to be delivered or a start of a segment of the lead-in programming content which is being caused to be delivered, by at least one component of the content personalization system; and in response to detection of at least one of the end or the start of the lead-in programming content segment, causing delivery of at least a portion of the buffered broadcast content via unicast delivery, by at least one component of the content personalization system.

The method of operation may further include retrieving the lead-in programming content from a store of programming content, by at least one component of the content personalization system. Causing delivery of lead-in programming content via unicast delivery may include causing delivery of programming content that is free of advertising content. Causing delivery of lead-in programming content via unicast delivery may include providing a streaming feed of programming content that is free of advertising content by at least one content delivery server computer system. The method Determining whether a satisfaction condition is reached after a start of the causing of delivery of the lead-in programming content may include both determining whether a duration after the start has occurred exceed a threshold duration and determining whether a total number of lead-in programming content segments caused to be delivered after the start has exceed a threshold number. Determining whether a satisfaction condition is reached after a start of the causing of delivery of the lead-in programming content may include determining whether a duration after the start has occurred exceed a threshold duration. Determining whether a satisfaction condition is reached after a start of the causing of delivery of the lead-in programming content may include determining whether a total number of lead-in programming content segments caused to be delivered after the start has exceeded a threshold number. The method may further include monitoring the broadcast content of the sequence of broadcast content for at least one of a start or a finish of at least one content segment, by at least one component of the content personalization system, and wherein the buffering at least some subsequent broadcast content of the sequence of broadcast content may be responsive at least in part to detection of the start or the finish of at least one content segment in the sequence of broadcast content. Monitoring the broadcast content of the sequence of broadcast content for at least one of a start or a finish of at least one content segment may include monitoring the broadcast content for a start of any type of content segment. Monitoring the broadcast content of the sequence of broadcast content for at least one of a start or a finish of at least one content segment may include monitoring the broadcast content for the start or the finish of at least one of a programming or nonprogramming content segment, the programming content segment comprising programming content and the nonprogramming content segment comprising advertising content. Monitoring the broadcast content of the sequence of broadcast content for a start of at least one content segment may include monitoring the broadcast content for the start or the finish of a programming content segment. Monitoring the broadcast content of the sequence of broadcast content for a start of at least one content segment may include monitoring the broadcast content for the start or the finish of a nonprogramming content segment that consists of advertising content. Monitoring the broadcast content of the sequence of broadcast content for a start of at least one content segment may include monitoring the broadcast content for an inaudible marker. The method may further include selecting a portion of the buffered subsequent broadcast content to deliver and wherein causing delivery of at least a portion of the buffered broadcast content via unicast delivery may include causing delivery of at least the portion of the buffered broadcast content starting from a start of the selecting a portion of the buffered subsequent broadcast content. Selecting a portion of the buffered subsequent broadcast content to deliver may include selecting an earliest complete content segment of the portion of the buffered broadcast content. Selecting a portion of the buffered subsequent broadcast content to deliver may include selecting a most recent complete content segment of the portion of the buffered broadcast content. The buffering at least some subsequent broadcast content of the sequence of broadcast content may be responsive to the request to start the unicast delivery or to causing the delivery of lead-in programming material, and causing delivery of at least a portion of the buffered broadcast content via unicast delivery may include causing delivery of at least the portion of the buffered broadcast content starting from a start of a buffered content segment. The buffering at least some subsequent broadcast content of the sequence of broadcast content may be responsive to the request to start the unicast delivery or to causing the delivery of lead-in programming material, and causing delivery of at least a portion of the buffered broadcast content via unicast delivery may include causing delivery of at least the portion of the buffered broadcast content starting from a start of a buffered programming content segment. The buffering at least some subsequent broadcast content of the sequence of broadcast content may be responsive to the request to start the unicast delivery or to causing the delivery of lead-in programming material, and causing delivery of at least a portion of the buffered broadcast content via unicast delivery may include causing delivery of at least the portion of the buffered broadcast content starting from a start of a buffered nonprogramming content segment. Buffering at least some subsequent broadcast content may include buffering a number of programming content segments of the broadcast at least until a defined condition is detected, the programming content segments free of advertising content. Buffering at least some subsequent broadcast content may include buffering a number of nonprogramming content segments of the broadcast at least until a defined condition is detected, the nonprogramming content segments consisting of advertising content. Buffering at least some subsequent broadcast content may include buffering all subsequent broadcast content at least until an end buffering condition is detected. Buffering all subsequent broadcast content at least until a defined condition is detected may include buffering both programming and nonprogramming content segments of the broadcast at least until an end buffering condition is detected. The method may further include detecting the end buffering condition, by at least one component of the content personalization system; and ceasing buffering of the subsequent broadcast content in response to detection of the end buffering condition, by at least one component of the content personalization system. Detecting the end buffering condition may include detecting at least one of a start or an end of at least one content segment in the sequence of broadcast content. The unicast delivery may be a personalized mediacast, and causing delivery of at least a portion of the buffered broadcast content via unicast delivery may include causing delivery of at least a portion of the buffered broadcast content with replacement nonprogramming content segments. The unicast delivery may be a personalized mediacast, and causing delivery of at least a portion of the buffered broadcast content via unicast delivery may include causing delivery of at least a portion of the buffered broadcast content via unicast delivery with replacement programming content segments.

A content personalization system may be summarized as including at least one processor; at least one nontransitory processor-readable medium communicatively coupled to the at least one processor, the at least one nontransitory processor-readable medium including one or more processor executable instruction sets that when executed by the at least one processor cause the at least one processor to provide a content personalization system and to: responsive to receipt of a request to start a unicast delivery of a sequence of broadcast content: cause delivery of lead-in programming content via unicast delivery; determine whether a satisfaction condition is reached after a start of the causing of delivery of the lead-in programming content; buffer at least some subsequent broadcast content of the sequence of broadcast content; responsive to reaching the satisfaction condition, monitor for at least one of an end of a segment of the lead-in programming content which is being caused to be delivered or a start of a segment of the lead-in programming content which is being caused to be delivered; and responsive to detection of at least one of the end or the start of the lead-in programming content segment, cause delivery of at least a portion of the buffered broadcast content via unicast delivery.

The machine executable instructions may further cause the at least one processor to: retrieve the lead-in programming content from a store of programming content. The machine executable instructions that cause the at least one processor to cause delivery of lead-in programming content via unicast delivery may further cause the at least one processor to: cause delivery of programming content free of advertising content. The machine executable instructions that cause the at least one processor to cause delivery of lead-in programming content via unicast delivery may further cause the at least one processor to: provide a streaming feed of programming content that is free of advertising content. The machine executable instructions that cause the at least one processor to determine whether a satisfaction condition is reached after a start of the causing of delivery of the lead-in programming content may further cause the at least one processor to: determine whether a duration after the start has occurred exceed a threshold duration; and determine whether a total number of lead-in programming content segments caused to be delivered after the start has exceed a threshold number. The machine executable instructions that cause the at least one processor to determine whether a satisfaction condition is reached after a start of the causing of delivery of the lead-in programming content may further cause the at least one processor to: determine whether a duration after the start has occurred exceed a threshold duration. The machine executable instructions that cause the at least one processor to determine whether a satisfaction condition is reached after a start of the causing of delivery of the lead-in programming content may further cause the at least one processor to: determine whether a total number of lead-in content segments caused to be delivered after the start has exceeded a threshold number. The machine executable instructions that cause the at least one processor to buffer at least some subsequent broadcast content of the sequence of broadcast content may further cause the at least one processor to: monitor the broadcast content of the sequence of broadcast content for at least one of a start or a finish of at least one content segment; and responsive at least in part to detection of the start or the finish of at least one content segment in the sequence of broadcast content, buffer at least some subsequent broadcast content of the sequence of broadcast content. The machine executable instructions that cause the at least one processor to monitor the broadcast content of the sequence of broadcast content for at least one of a start or a finish of at least one content segment may cause the at least one processor to: monitor the broadcast content for a start of any type of content segment. The machine executable instructions that cause the at least one processor to monitor the broadcast content of the sequence of broadcast content for at least one of a start or a finish of at least one content segment may further cause the at least one processor to: monitor the broadcast content for the start or the finish of at least one of a programming or nonprogramming content segment, the programming content segment comprising programming content and the nonprogramming content segment comprising advertising content. The machine executable instructions that cause the at least one processor to monitor the broadcast content of the sequence of broadcast content for a start of at least one content segment may further cause the at least one processor to: monitor the broadcast content for the start or the finish of a programming content segment. The machine executable instructions that cause the at least one processor to monitor the broadcast content of the sequence of broadcast content for a start of at least one content segment may further cause the at least one processor to: monitor the broadcast content for the start or the finish of a nonprogramming content segment that consists of advertising content. The machine executable instructions that cause the at least one processor to monitor the broadcast content of the sequence of broadcast content for a start of at least one content segment may further cause the at least one processor to: monitor the broadcast content for an inaudible marker. The machine executable instructions that cause the at least one processor to cause delivery of at least a portion of the buffered broadcast content via unicast delivery may further cause the at least one processor to: select a portion of the buffered subsequent broadcast content to deliver; and cause delivery of at least the portion of the buffered broadcast content starting from a start of the selected portion of the buffered subsequent broadcast content. The machine executable instructions that cause the at least one processor to select a portion of the buffered subsequent broadcast content to deliver may further cause the at least one processor to: select an earliest complete content segment of the portion of the buffered broadcast content. The machine executable instructions that cause the at least one processor to select a portion of the buffered subsequent broadcast content to deliver may further cause the at least one processor to: select a most recent complete content segment of the portion of the buffered broadcast content. The machine executable instructions that cause the at least one processor to buffer at least some subsequent broadcast content of the sequence of broadcast content may further cause the at least one processor to: responsive to the receipt of the request to start the unicast delivery or delivery of lead-in programming material, cause the at least one processor to buffer at least some subsequent broadcast content of the sequence of broadcast content; and cause delivery of at least the portion of the buffered broadcast content starting from a start of a buffered content segment. The machine executable instructions that cause the at least one processor to buffer at least some subsequent broadcast content of the sequence of broadcast content may further cause the at least one processor to: responsive to the receipt of the request to start the unicast delivery or delivery of lead-in programming material, cause the delivery of at least a portion of the buffered broadcast content via unicast delivery; and cause delivery of at least the portion of the buffered broadcast content starting from a start of a buffered programming content segment. The machine executable instructions that cause the at least one processor to buffer at least some subsequent broadcast content of the sequence of broadcast content may further cause the at least one processor to: responsive to the receipt of the request to start the unicast delivery or delivery of lead-in programming material, cause the delivery of at least a portion of the buffered broadcast content via unicast delivery; and cause delivery of at least the portion of the buffered broadcast content starting from a start of a buffered nonprogramming content segment. The machine executable instructions that cause the at least one processor to buffer at least some subsequent broadcast content may further cause the at least one processor to: buffer a number of programming content segments of the broadcast at least until detection of a defined condition, the programming content segments free of advertising content. The machine executable instructions that cause the at least one processor to buffer at least some subsequent broadcast content may further cause the at least one processor to: buffer a number of nonprogramming content segments of the broadcast at least until detection of a defined condition, the nonprogramming content segments consisting of advertising content. The machine executable instructions that cause the at least one processor to buffer at least some subsequent broadcast content may further cause the at least one processor to: buffer all subsequent broadcast content at least until detection of an end buffering condition. The machine executable instructions that cause the at least one processor to buffer all subsequent broadcast content at least until detection of a defined condition may further causes the at least one processor to: buffer both programming and nonprogramming content segments of the broadcast at least until detection of an end buffering condition. The system may further include detecting the end buffering condition, by at least one component of the content personalization system; and ceasing buffering of the subsequent broadcast content in response to detection of the end buffering condition, by at least one component of the content personalization system. The machine executable instructions that cause the at least one processor to detect the end buffering condition may further cause the at least one processor to: detect at least one of a start or an end of at least one content segment in the sequence of broadcast content. The unicast delivery may be a personalized mediacast, and wherein the machine executable instructions that cause the at least one processor to cause delivery of at least a portion of the buffered broadcast content via unicast delivery may further cause the at least one processor to: cause delivery of at least a portion of the buffered broadcast content with replacement nonprogramming content segments. The unicast delivery may be a personalized mediacast, and wherein the machine executable instructions that cause the at least one processor to cause delivery of at least a portion of the buffered broadcast content via unicast delivery may further cause the at least one processor to: cause delivery of at least a portion of the buffered broadcast content via unicast delivery with replacement programming content segments.

A method of operation in a system may be summarized as including in response to a request to start a personalized delivery of a sequence of predefined content including programming content and nonprogramming content: initially causing delivery of only programming content segments for at least one of a defined interval of time or a defined number of segments of the programming content; monitoring the sequence of predefined content for at least one of a start or an end of at least one content segment; in response to detection of the start or the end of at least one content segment in the sequence of predefined content, buffering at least some content segments of the sequence of predefined content; and in response to detection of at least one of an end or a start of a segment of the initially caused to be delivered programming content segments after the defined interval of time or the defined number of segments, causing delivery of at least a portion of the buffered content segments.

The programming content may be advertising free and the nonprogramming content may include advertising, and initially causing delivery of only programming content segments for at least one of a defined interval of time or a defined number of segments of the programming content may include causing delivery of music for at least one of the defined interval of time or the defined number of segments to guarantee an initial advertising free experience.

A method of operation in a content personalization system, the content personalization system may include at least one processor and at least one nontransitory processor-readable medium communicatively coupled to the at least one processor may be summarized as including in response to a request to skip a content segment in a personalized delivery of a sequence of broadcast content: causing delivery of filler content via the personalized delivery, by at least one component of the content personalization system; monitoring the broadcast content of the sequence of broadcast content for a start of at least one content segment, by at least one component of the content personalization system; in response to detection of the start of at least one content segment in the sequence of broadcast content, buffering at least some subsequent broadcast content of the sequence of broadcast content, by at least one component of the content personalization system; in response to reaching the satisfaction condition, monitoring for at least one of an end of a segment of the filler content which is being caused to be delivered or a start of a segment of the filler content which is being caused to be delivered, by at least one component of the content personalization system; and in response to detection of at least one of the end or the start of the filler segment, causing delivery of at least a portion of the buffered broadcast content via unicast delivery, by at least one component of the content personalization system.

The method may further include detecting an end buffering condition, by at least one component of the content personalization system; and ceasing buffering of the subsequent broadcast content in response to detection of the end buffering condition, by at least one component of the content personalization system. Detecting the end buffering condition may include detecting at least one of a start or an end of at least one content segment in the sequence of broadcast content The method may further include determining whether the content segment to which the request to skip pertains is a programming content segment, by at least one component of the content personalization system, before causing the delivery of filler content via the personalized delivery; and wherein causing the delivery of filler content via the personalized delivery may include causing the delivery of filler programming content via the personalized delivery. The method may further include determining whether the content segment to which the request to skip pertains is a nonprogramming content segment, by at least one component of the content personalization system, before causing the delivery of filler content via the personalized delivery; and wherein causing the delivery of filler content via the personalized delivery may include causing the delivery of filler nonprogramming content via the personalized delivery. Causing the delivery of filler nonprogramming content via the personalized delivery may include causing the delivery of replacement advertising content via the personalized delivery. The method may further include: in response to an additional request to skip a content segment in a personalized delivery of a sequence of broadcast content: determining whether the content segment to which the additional request to skip pertains is a nonprogramming content segment, by at least one component of the content personalization system, before causing the delivery of filler content via the personalized delivery; and continuing to cause the delivery of the content segment to which the additional request to skip pertains via the personalized delivery, by at least one component of the content personalization system. The method may further include retrieving the filler content from a store of filler content, by at least one component of the content personalization system. Monitoring the broadcast content of the sequence of broadcast content for a start of at least one content segment may include monitoring the broadcast content for a start of any type of content segment. Monitoring the broadcast content of the sequence of broadcast content for a start of at least one content segment may include monitoring the broadcast content for a start of at least one of a programming or nonprogramming content segment, the programming content segment comprising programming content and the nonprogramming content segment comprising advertising content. Monitoring the broadcast content of the sequence of broadcast content for a start of at least one content segment may include monitoring the broadcast content for a start of a programming content segment. Monitoring the broadcast content of the sequence of broadcast content for a start of at least one content segment may include monitoring the broadcast content for a start of a nonprogramming content segment that consists of advertising content. Monitoring the broadcast content of the sequence of broadcast content for a start of at least one content segment may include monitoring the broadcast content for an inaudible marker. Buffering at least some subsequent broadcast content may include buffering a number of programming content segments of the broadcast at least until a defined condition is detected, the programming content segments free of advertising content. Buffering at least some subsequent broadcast content may include buffering a number of nonprogramming content segments of the broadcast at least until a defined condition is detected, the nonprogramming content segments consisting of advertising content. Buffering at least some subsequent broadcast content may include buffering all subsequent broadcast content at least until an end buffering condition is detected. Buffering all subsequent broadcast content at least until a defined condition is detected may include buffering both programming and nonprogramming content segments of the broadcast at least until an end buffering condition is detected. The method may further include detecting the end buffering condition, by at least one component of the content personalization system; and ceasing buffering of the subsequent broadcast content in response to detection of the end buffering condition, by at least one component of the content personalization system. Detecting the end buffering condition may include detecting at least one of a start or an end of at least one content segment in the sequence of broadcast content.

A number of embodiments may employ a chunk based delivery approach, for example generating manifests for use with one or more content delivery networks (CDNs).

For example, a method of operation in a content personalization system, the system comprising at least one processor and at least one nontransitory processor-readable medium communicatively coupled to the at least one processor may be summarized as including in response to a request to start a unicast delivery of a sequence of broadcast content, generating one or more manifests by at least one component of the content personalization system, the one or more manifests including information which during execution initially causes delivery of uninterrupted programming content via unicast delivery at least until a satisfaction condition is reached after a start of the causing of delivery of the uninterrupted programming content, and which subsequently causes delivery of at least a portion of the sequence of broadcast content via unicast delivery; and providing the one or more manifests by the content personalization system to a device for use in execution. Generating one or more manifests by at least one component of the content personalization system may include generating one or more manifests which include information that initially causes delivery of uninterrupted programming content which is not part of the sequence of broadcast content of a broadcast. Generating one or more manifests by at least one component of the content personalization system may include identifying at least one programming content segment that was previously broadcast before the request to start the unicast deliver of the sequence of broadcast content, and including location information in the one or more manifests that specifies a location from which the identified at least one programming content segment that was previously broadcast is retrievable.

The method may further include causing a caching of the at least one programming content segment that was previously broadcast by at least one portion of a content delivery network for later retrieval. Generating one or more manifests by at least one component of the content personalization system may include identifying at least one lead-in programming content segment, and including location information in the one or more manifests that specifies a location from which the identified at least one lead-in programming content segment is retrievable.

The method may further include causing a caching of the at least one lead-in programming content segment by at least one portion of a content delivery network for later retrieval. Generating one or more manifests by at least one component of the content personalization system may include including location information in the one or more manifests that specifies a location from which at least one programming content segment that is free of advertising content is retrievable. Providing the one or more manifests to a device for use in execution may include providing the one or more manifests to an end user device for use in execution of instructions via a media player executing on the end user device.

The method of operation may further include identifying a defined number of a plurality of programming content segments, and wherein generating one or more manifests by at least one component of the content personalization system includes generating one or more manifests by at least one component of the content personalization system which includes location information that specifies a location from which the identified plurality of programming content segments is retrievable.

The method of operation may further include identifying a first one of a defined number of a plurality of programming content segments, and wherein generating one or more manifests by at least one component of the content personalization system includes generating a first one of the manifests by at least one component of the content personalization system which includes location information that specifies a location from which the first one of the identified plurality of programming content segments is retrievable; and subsequently identifying a second one of the defined number of the plurality of programming content segments, and wherein generating one or more manifests by at least one component of the content personalization system includes generating a second one of the manifests by at least one component of the content personalization system which includes location information that specifies a location from which the second one of the identified plurality of programming content segments is retrievable.

The method of operation may further include identifying a first one of a defined number of a plurality of programming content segments, and wherein generating one or more manifests by at least one component of the content personalization system includes generating a first one of the manifests by at least one component of the content personalization system which includes location information that specifies a location from which the first one of the identified plurality of programming content segments is retrievable; and determining whether a threshold number of a programming content segments has been reached, and wherein generating one or more manifests by at least one component of the content personalization system includes repeatedly generating respective ones of the manifests by at least one component of the content personalization system which include respective location information that specifies a respective location from which the successive ones of the identified plurality of programming content segments is retrievable until the threshold number of the programming content segments is reached.

The method of operation may further include identifying a first one of a plurality of programming content segments, and wherein generating one or more manifests by at least one component of the content personalization system includes generating a first one of the manifests by at least one component of the content personalization system which includes location information that specifies a location from which the first one of the identified plurality of programming content segments is retrievable; and subsequently identifying a second one of the plurality of programming content segments, and wherein generating one or more manifests by at least one component of the content personalization system includes generating a second one of the manifests by at least one component of the content personalization system which includes location information that specifies a location from which the second one of the identified plurality of programming content segments is retrievable.

The method of operation may further include identifying a first one of a plurality of programming content segments, and wherein generating one or more manifests by at least one component of the content personalization system includes generating a first one of the manifests by at least one component of the content personalization system which includes location information that specifies a location from which the first one of the identified plurality of programming content segments is retrievable; and determining whether a defined period has been reached, and wherein generating one or more manifests by at least one component of the content personalization system includes repeatedly generating respective ones of the manifests by at least one component of the content personalization system which include respective location information that specifies a respective location from which the successive ones of the identified plurality of programming content segments is retrievable until the defined period is reached.

The method of operation may further include identifying an initial segment of broadcast content, and wherein generating one or more manifests by at least one component of the content personalization system includes generating at least one of the manifests which includes location information that specifies a location from which the initial segment of broadcast content is retrievable.

The method of operation may further include identifying at least one subsequent segment of broadcast content, the subsequent segment of broadcast content temporally following the initial segment of broadcast content in the sequence of broadcast content, and wherein generating one or more manifests by at least one component of the content personalization system includes generating at least one of the manifests which includes location information that specifies a respective location from which the at least one subsequent segment of broadcast content is retrievable. Identifying a subsequent segment of broadcast content may include identifying a plurality of subsequent segments of broadcast content which each successively temporally immediately follow one another, in the sequence of broadcast content. In response to a skip command, for instance a skip command originated by a user, identifying a subsequent segment of broadcast content may include identifying a subsequent segment of broadcast content which temporally follows a most recent segment of broadcast content in the sequence of broadcast content specified in a most recent one of the one or more manifests, and generating one or more manifests may include generating a new manifest that includes information which during execution causes unicast delivery of the identified subsequent segment of broadcast content which temporally follows the most recent segment of broadcast content in the sequence of broadcast content. Identifying an initial segment of broadcast content may include identifying a programming content segment. Identifying an initial segment of broadcast content may include identifying a nonprogramming content segment. Identifying an initial segment of broadcast content may include identifying a content segment which maximizes revenue. Identifying an initial segment of broadcast content may include identifying a first complete content segment which occurred immediately following the request to start the unicast delivery. Identifying an initial segment of broadcast content may include identifying a complete content segment that minimizes a time delay between the unicast delivery and the broadcast. In response to a skip command, identifying a subsequent segment of uninterrupted programming content and generating one or more manifests may include generating a new manifest that includes information which during execution causes unicast delivery of the identified subsequent segment of uninterrupted programming content before completion of a current uninterrupted programming content, and providing the new manifest before completion of the current uninterrupted programming content.

A content personalization system may be summarized as including at least one processor; and at least one nontransitory processor-readable medium communicatively coupled to the at least one processor, the at least one nontransitory processor-readable medium which stores at least one of processor-executable instructions or processor-executable data, execution of which causes the at least one processor to: in response to a request to start a unicast delivery of a sequence of broadcast content, generate one or more manifests, the one or more manifests including information which during execution of the one or more manifests initially causes delivery of uninterrupted programming content via unicast delivery at least until a satisfaction condition is reached after a start of the causing of delivery of the uninterrupted programming content, and which subsequently causes delivery of at least a portion of the sequence of broadcast content via unicast delivery; and provide the one or more manifests by the content personalization system to a device for use in execution of the one or more manifests. The at least one processor may generate one or more manifests which include information that initially causes delivery of uninterrupted programming content which is not part of the sequence of broadcast content of a broadcast. To generate the one or more manifests, the at least one processor may identify at least one programming content segment that was previously broadcast before the request to start the unicast deliver of the sequence of broadcast content, and includes location information in the one or more manifests that specifies a location from which the identified at least one programming content segment that was previously broadcast is retrievable. The at least one processor may further cause a caching of the at least one programming content segment that was previously broadcast by at least one portion of a content delivery network for later retrieval. To generate one or more manifests the at least one processor may identify at least one lead-in programming content segment, and may include location information in the one or more manifests that specifies a location from which the identified at least one lead-in programming content segment is retrievable.

The at least one processor may further causes a caching of the at least one lead-in programming content segment by at least one portion of a content delivery network for later retrieval. To generate one or more manifests the at least one processor may include location information in the one or more manifests that specifies a location from which at least one programming content segment that is free of advertising content is retrievable. To provide the one or more manifests to a device for use in execution, the at least one processor may cause provision of the one or more manifests to an end user device for use in execution of instructions via a media player executing on the end user device.

The content personalization system wherein the at least one processor may further identify a defined number of a plurality of programming content segments, and to generate the one or more manifests the at least one processor may include location information that specifies a location from which the identified plurality of programming content segments is retrievable in the one or more manifests. The content personalization system wherein the at least one processor may further identify a first one of a defined number of a plurality of programming content segments, and to generate one or more manifests the at least one processor may generate a first one of the manifests that includes location information that specifies a location from which the first one of the identified plurality of programming content segments is retrievable; and subsequently may identify a second one of the defined number of the plurality of programming content segments, and generates a second one of the manifests that includes location information that specifies a location from which the second one of the identified plurality of programming content segments is retrievable. The content personalization system wherein the at least one processor may further identify a first one of a defined number of a plurality of programming content segments, and to generate one or more manifests the at least one processor may generate a first one of the manifests that includes location information that specifies a location from which the first one of the identified plurality of programming content segments is retrievable; and may determine whether a threshold number of a programming content segments has been reached, and to generate one or more manifests, repeatedly may generate respective ones of the manifests that each include respective location information that specifies a respective location from which the successive ones of the identified plurality of programming content segments is retrievable until the threshold number of the programming content segments is reached.

The content personalization system wherein the at least one processor may further identify a first one of a plurality of programming content segments, and to generate one or more manifests the at least one processor may generate a first one of the manifests that includes location information that specifies a location from which the first one of the identified plurality of programming content segments is retrievable; and subsequently may identify a second one of the plurality of programming content segments, and to generate one or more manifests the at least one processor may generate a second one of the manifests that includes location information that specifies a location from which the second one of the identified plurality of programming content segments is retrievable.

The content personalization system wherein the at least one processor may further identify a first one of a plurality of programming content segments, and to generate one or more manifests the at least one processor may generate a first one of the manifests that includes location information that specifies a location from which the first one of the identified plurality of programming content segments is retrievable; and may determine whether a defined period has been reached, and to generate one or more manifests the at least one processor repeatedly may generate respective ones of the manifests each of which include respective location information that specifies a respective location from which the successive ones of the identified plurality of programming content segments is retrievable until the defined period is reached.

The content personalization system wherein the at least one processor may further identify an initial segment of broadcast content, and to generate one or more manifests the at least one processor may generate at least one of the manifests that includes location information that specifies a location from which the initial segment of broadcast content is retrievable.

The content personalization system wherein the at least one processor may further identify at least one subsequent segment of broadcast content, the subsequent segment of broadcast content temporally following the initial segment of broadcast content in the sequence of broadcast content, and to generate one or more manifests the at least one processor may generate at least one of the manifests that includes location information that specifies a respective location from which the at least one subsequent segment of broadcast content is retrievable. To identify a subsequent segment of broadcast content the at least one processor may identify a plurality of subsequent segments of broadcast content which each successively temporally immediately follow one another, in the sequence of broadcast content. In response to a skip command, the at least one processor may identify a subsequent segment of broadcast content which temporally follows a most recent segment of broadcast content in the sequence of broadcast content specified in a most recent one of the one or more manifests, and may generate a new manifest that includes information which during execution causes unicast delivery of the identified subsequent segment of broadcast content which temporally follows the most recent segment of broadcast content in the sequence of broadcast content. To identify an initial segment of broadcast content the at least one processor may identify a programming content segment. To identify an initial segment of broadcast content the at least one processor may identify a nonprogramming content segment. To identify an initial segment of broadcast content the at least one processor may identify a content segment which maximizes revenue. To identify an initial segment of broadcast content the at least one processor may identify a first complete content segment which occurred immediately following the request to start the unicast delivery. To identify an initial segment of broadcast content the at least one processor may identify a complete content segment that minimizes a time delay between the unicast delivery and the broadcast. In response to a skip command, the at least one processor may identify a subsequent segment of uninterrupted programming content, and may generate a new manifest that includes information which during execution causes unicast delivery of the identified subsequent segment of uninterrupted programming content before completion of a current uninterrupted programming content, and providing the new manifest before completion of the current uninterrupted programming content.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
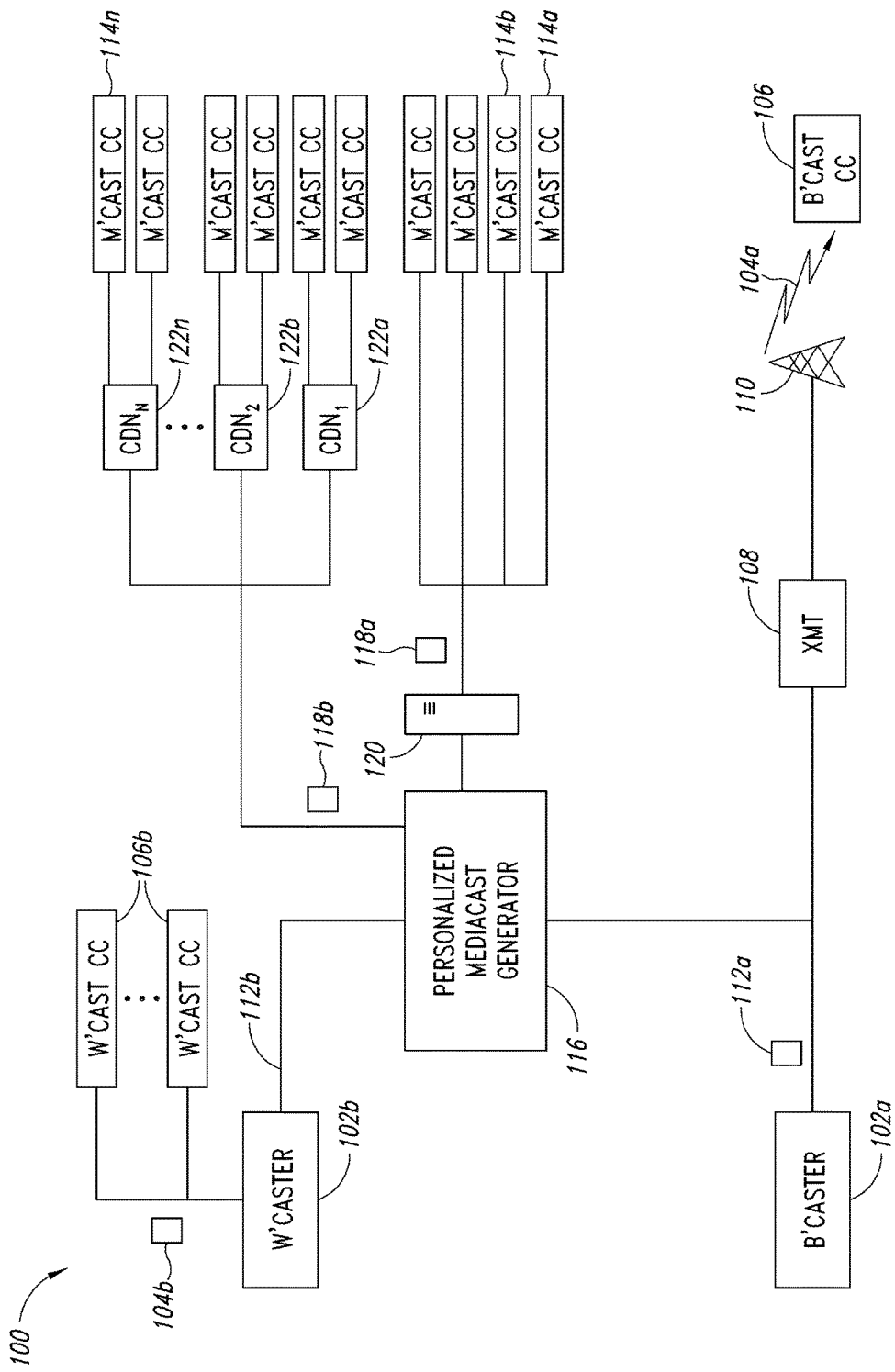
FIG. 1 is a schematic diagram of a networked environment, including a broadcaster or Webcaster, a number of broadcast or Webcast content consumers, a personalized mediacast generation system operable to generate a plurality of personalized mediacasts, and an optional content delivery network (CDN) to deliver the personalized mediacasts to respective mediacast content consumers; according to one illustrated embodiment, in which replacement programming content segments are selected based upon one or more mediacast content consumer selection criterion.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, broadcast systems including radio and television broadcast systems, as well as networks and other communications channels have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein the terms broadcast or Webcast programming refer to a sequence of content intend to be broadcast or Webcast by a broadcaster or Webcaster. The broadcast or Webcast programming may include programming content and non-programming content. As used herein, programming content refers to content which is the primary or main subject of the broadcast or Webcast, examples include songs for a music format radio station or talk segments for a talk radio format radio station. As used herein, non-programming content refers to content which is not the primary or main subject of the broadcast or Webcast, examples include advertisements or commercials. The programming content and/or the non-programming content may be either non-replaceable or replaceable, as identified by an entity, for example a broadcaster or Webcaster, and indicated in metadata or a marker at least logically associated with the content. Non-replaceable content is content that is not to be replaced, examples include news segments or sports segments. Replaceable content is content that may be replaced, examples include a block of songs for a music format radio station or a talk segment for a talk format radio station. As used herein, the term new or replacement programming and non-programming content segments refers to content used to generate a personalized mediacast, in addition to the broadcast or Webcast programming. Such may include programming content and non-programming content. Such may be substituted for replaceable programming or replaceable non-programming content in generating a personalized mediacast or otherwise incorporated therein. Alternatively, new or replacement programming and non-programming content segments such may be used in addition to replaceable programming or replaceable non-programming content in generating personalized mediacasts. As used herein manifest content refers to a set of entries that specify locations or specific properties of content or media fragments, specifying a linear or sequential order. A used herein manifest consumer device refers to a mediacast content consumer device (e.g., media player executing on a processor-based device) that requests and utilizes manifest content. As used herein dynamic manifest refers to a manifest file that is generated upon a request of a mediacast content consumer device. As used herein content or media fragment refers to a digital media 'file' into which content has been broken, typically having a duration of 2-10 seconds. Presently, content or media fragments are primarily based on fragmented mp4 (FMP4) or MPEG TS (M2TS).

The headings and Abstract of the Disclosure provided herein are for convenience only and do not interpret the scope or meaning of the embodiments.

System Overview—Delivery of Programming to Content Consumers

FIG. 1 shows an environment 100 including a radio broadcaster or television broadcaster 102a delivering a broadcast 104a to a plurality of broadcast content consumers (illustrated collectively) 106a via a broadcast transmitter 108 and antenna 110. The environment 100 may additionally, or alternatively, include a Webcaster 102b that provides Webcasts 104b to a plurality of Webcast consumers 106b via servers and various networks (e.g., Internet).

The broadcast 104a or Webcast 104b (collectively 104) consists of broadcaster or Webcaster programming, which includes a variety of programming content and a variety of non-programming content, which may be divided up into segments. Programming content segments are typically portions of the programming that are the principal or main subjects of the broadcast or Webcast, and may be used to identify or characterize the broadcaster or Webcaster. Examples of programming content include songs or music, news, weather, traffic, talk shows, comedy sketches, audio content, video content, personalities, or the like. Non-programming content segments are the remaining portions of the programming which are not the principal or main subjects of the broadcast or Webcast. Examples of non-programming content include paid advertisements or commercials, legally required announcements (e.g., station identification announcements), and public service announcements. All broadcast or Webcast content consumers 106 receive identical programming 112 comprising a seamless flow of programming and non-programming content segments, the specific content and order or which is chosen by the broadcaster 102a or Webcaster 102b (collectively 102).

Many broadcasters or Webcasters 102 also would like to provide all or a portion of their programming to mediacast content consumers 114a, 114b-114n (ten illustrated, three called out, collectively 114) via alternative channels such as Webcasts, podcasts, streaming and similar delivery methods. Such alternative channels typically provide for on demand delivery, for example as a unicast streaming, or in some instances as a multicast streaming to the media content consumers 114. The alternative channels typically permit geographically diverse mediacast content consumers 114 to access the programming content using communications technologies other than local over the air (i.e., "OTA" and/or terrestrial) broadcast transmission or transmission via local media distributors such as television networks.

To accommodate the diverse tastes and interests of the respective mediacast content consumers 114, the programming 112 may be further apportioned into replaceable programming content segments and non-replaceable programming content segments. Replaceable programming content segments include any portion of the programming identified by the broadcaster, Webcaster or other entity as being eligible for replacement by mediacast content consumer specific programming content. For example, musical programming supplied by a broadcaster or Webcaster may be identified as replaceable programming content segment. Non-replaceable programming content may include any portion of the programming identified by the broadcaster or Webcaster or other entity as not eligible for replacement by mediacast content consumer specific programming. Typical examples of non-replaceable programming content include talk radio segments, news, sports, weather, and financial segments within the programming supplied by the broadcaster or Webcaster. In some instances, non-replaceable programming content may include songs or music. For example, one or two songs at a start and/or an end of a programming content segment may be identified as non-replaceable. This will allow a disc jockey providing live narration to discuss the songs or artist or events related to the song or artist (e.g., upcoming show) at the beginning and/or end of a programming content segment. Such will make a personalized broadcast sound very similar to a live radio broadcast.

Optionally, the non-programming content segments (e.g., commercials, advertisements) of the broadcast or Webcast provided by the broadcaster or Webcaster may be apportioned into replaceable non-programming content segments and non-replaceable non-programming content segments. Replaceable non-programming content segments can include advertisements or open air "spots" carried by the programming supplied by the broadcaster or Webcaster that may have limited or no value to the mediacast content consumers 114. Examples include advertisements for products and services available in the broadcaster or Webcaster's home market, but unavailable in markets where many or even all of the mediacast content consumers 114 may be located. Non-replaceable non-programming content segments can include legally required station identification announcements, public service announcements, emergency broadcasting network tests, and the like. Non-replaceable non-programming content segments can additionally or alternatively include advertisements or commercials with generic appeal or related to a wider market, for instance a national market. Non-replaceable non-programming content segments can additionally or alternatively include advertisements or commercials for which Web distribution has been guaranteed, for instance guaranteed by the broadcaster or Webcaster.

As depicted in FIG. 1, a personalized mediacast generation system 116 may be coupled to receive programming 112a, 112b (collectively 112) that constitutes the broadcast or Webcast. The personalized mediacast generation system 116 may be configured to generate, produce or otherwise provide personalized mediacasts 118a, 118b (two shown, collectively 118) for respective ones of the mediacast content consumers 114.

While illustrated as a single personalized mediacast generation system 116 communicatively coupled to both a broadcaster 102a and Webcaster 102b, many implementations will employ two or more separate personalized mediacast generation systems 116, for example a respective personalized mediacast generation system 116 for each of the broadcaster(s) and/or Webcaster(s). All or a portion of the personalized mediacast generation system 116 may be separately or co-located. All or a portion of the personalized mediacast generation system 116 may be co-located at the broadcaster or Webcaster facilities. All or a portion of the personalized mediacast generation system 116 may be located separately from the broadcaster or Webcaster facilities. All or a portion of the personalized mediacast generation system 116 may be implemented "in the cloud" as a virtualized system or component. All or a portion of the personalized mediacast generation system 116 may be co-located at the mediacast content consumer 114.

The personalized mediacasts 118 include at least some of the programming content 112 of the broadcast or Webcast, as well as some mediacast content consumer specific programming content that is selected based on an end user or mediacast content consumer's expressed or discernible preferences (i.e., content consumer replacement programming content selection criterion).

In some implementations, the personalized mediacasts 118 include non-programming content, for instance advertisements or commercials. The non-programming content may include non-programming content from the broadcast or Webcast 104. The non-programming content may include new or replacement non-programming content, which did not appear in the broadcast or Webcast 104. Such new or replacement non-programming content may substitute for or replace in the personalized mediacast 118, in whole or in part, non-programming content from the broadcast or Webcast 104. Such new or replacement non-programming content may be selected to target a specific mediacast content consumer 114 for which the personalized mediacast 118 is intend or personalized. Alternatively, the new or replacement non-programming content may be selected to target a more generic audience or have wider interest than the non-programming content in the broadcast or Webcast 104. Alternatively, the new or replacement non-programming content may even be selected to target a specific demographic.

Each of the various types of content segments may include one or more beginning of segment markers, end of segment markers, rejoin markers, break markers or the like, that indicate the beginning or end of the respective content segment. Such markers typically take the form of metadata logically associated with the content segments. The marker or metadata is useful in providing a machine detectable indication that a particular type of content segment in the broadcast or Webcast programming is commencing or ending. Thus, the marker or metadata facilitates the automated generation of a personalized mediacast with new or replacement programming content segments and/or new or replacement non-programming content segments combined with the non-replaceable programming content segments supplied by the broadcaster or Webcaster. As explained in more detail herein, the marker or metadata may also be part of a trigger condition for the buffering of content, for instance non-replaceable content segments, and/or the subsequent unbuffering, delivery or playing of the buffered content.

As illustrated in FIG. 1, the personalized mediacast generation system 116 may transmit or deliver the personalized mediacasts 118 to respective mediacasts content consumers 114 via one or more networks (e.g., Internet, local area networks, wide area networks, wired networks, wireless networks). The personalized mediacast generation system 116 may include, or may employ, one or more server computer systems to transmit or deliver the personalized mediacasts 118.

Additionally or alternatively, the personalized mediacast generation system 116 ay optionally employ one or more content delivery networks (CDNs) 122a-122n (three illustrated, collectively 122) to cache, store, or distribute all or a portion of the personalized mediacasts 118. Although the broadcaster or Webcaster 102 may have access to sufficient infrastructure to support the delivery of hundreds or thousands of personalized mediacasts 118 directly to each of the mediacast content consumers 114, in many instances the broadcaster or Webcaster 102 may alternatively route the personalized mediacasts 118 for at least a portion of the mediacast content consumers 114 through a CDN 122. A CDN 122 supplies the necessary infrastructure in the form of various network servers, switches, routers and the like useful in delivering the personalized mediacasts 118 to each of the content consumers 114. CDNs 122 can be regionally located in closer proximity to the mediacast content consumers 114 and can be linked to the broadcaster or Webcaster via one or more high speed or high bandwidth connections to minimize the latency and improve the overall mediacast experience of each of the mediacast content consumers 114. In some instances, the CDNs 122 provide network redundancy to improve the reliability of the connection between the mediacast content consumers 114 and the broadcaster or Webcaster 122.

Personalized Mediacast Generation System

Figure 2:
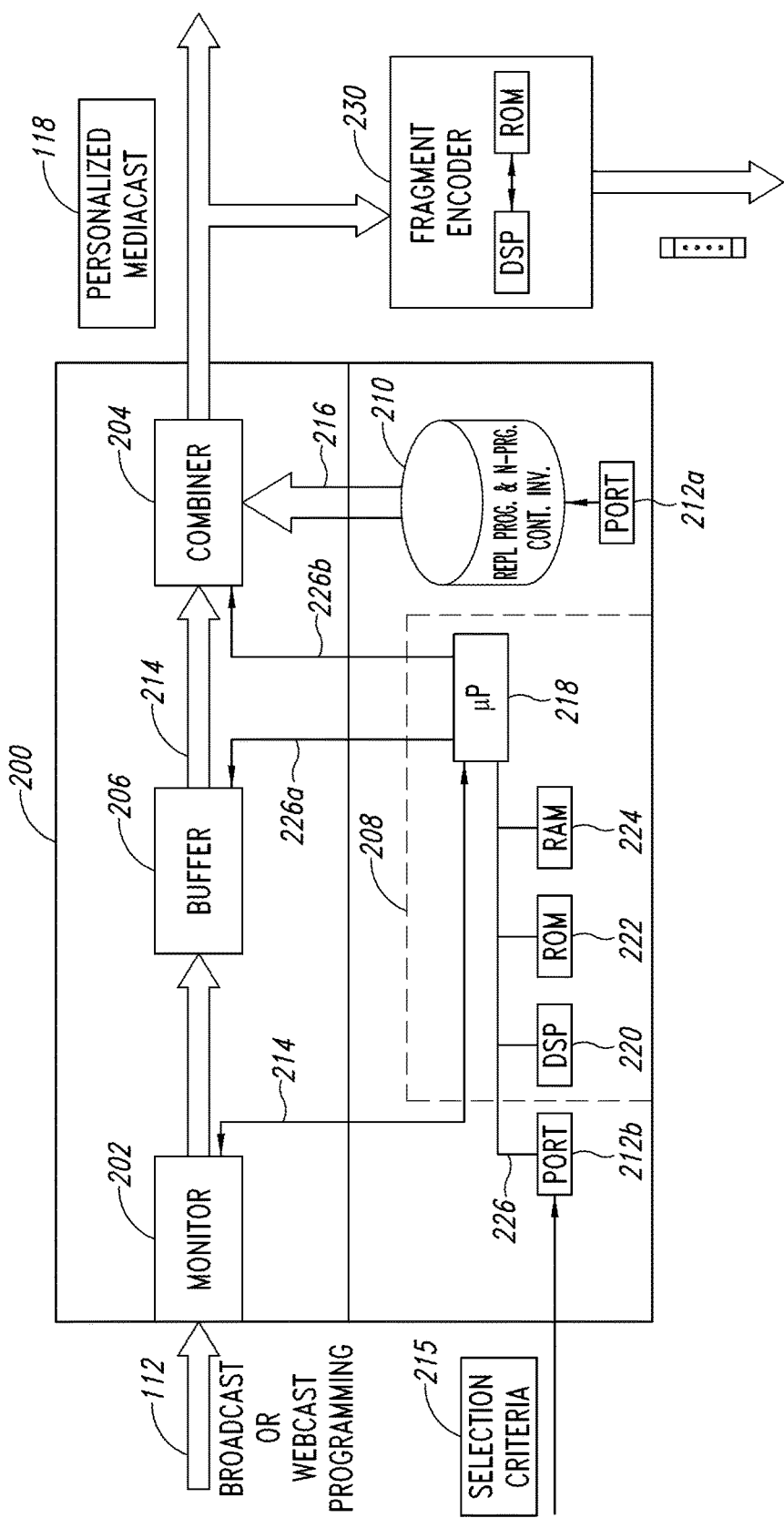
FIG. 2 is a schematic diagram of a personalized mediacast generation system including an inserter coupled to detect replaceable programming and non-programming content segments in broadcasts or Webcasts, optionally insert replacement programming and non-programming content segments for the replaceable content to generate a personalized mediacast and an optional fragment encoder coupled to encode the personalized mediacast as content or media fragments, according to one illustrated embodiment.

FIG. 2 shows an example of a personalized mediacast generation system 200, according to one illustrated embodiment.

The personalized mediacast generation system 200 includes a monitor 202 to detect the occurrence of markers or metadata in the programming and a combiner 204 operable to selective combine portions of the broadcast or Webcast programming 112 (FIG. 1) with new or replacement content. The personalized mediacast generation system 200 may also include a buffer 206, a control subsystem 208, and a nontransitory computer- or processor-readable medium 210, each directly or indirectly communicatively coupled with the monitor 202 and combiner 204. As explained in more detail below, the buffer 206 is communicatively coupled, configured and/or controlled to temporarily buffer or store broadcast or Webcast programming content and selectively release, deliver or unbuffer the programming content on occurrence of certain conditions. The control subsystem is communicatively coupled and configured to control the operation of the personalized mediacast generation system 200, including the various components thereof. The nontransitory computer- or processor-readable medium 210 stores new or replacement programming content segments and/or new or replacement non-programming content segments for use in combining with portions of the broadcast or Webcast programming 112 (FIG. 1) to create the personalized mediacasts 118 (FIG. 1).

The personalized mediacast generation system 200 is communicatively coupled to receive original broadcast or Webcast programming 112 from a broadcaster or Webcaster 102. For example, the personalized mediacast generation system 200 may be communicatively coupled to receive an audio feed (e.g., digital or analog) from a sound board of a radio broadcaster or a video feed from a video board of a television broadcaster.

An optional communications port 212a, permits the receipt of new or replacement programming content segments and/or new or replacement non-programming content segments from an external source, for example from an external advertiser, external advertising marketplace, external replacement programming content provider and the like. An optional communications port 212b allows receipt of commands, instructions, data, and programming. For example, various types of selection criterion 215 may be received via communications port 212b. While two ports 212a, 212b (collectively 212) are illustrated, the personalized mediacast generation system 200 may include fewer or greater number of ports 212.

As noted above, a primary function of the personalized mediacast generation system 200 is to detect metadata or markers, for example rejoin markers. As described above, the metadata or markers signify the beginning and/or ending of the different content segments. The beginning and ending of at least certain content segments are conditions that may wholly or partially control an operational state of the combiner 204, and optionally of the buffer 206. The occurrence of such may for example, satisfy one condition for triggering the replacement of replaceable programming content segments with replacement programming to generate or create the personalized mediacasts 118. The occurrence of such may for example, satisfy one condition for triggering the replacement of replaceable non-programming content segments with new or replacement non-programming content segments to generate or create the personalized mediacasts 118. In either situation, a second condition may need to be satisfied, that is that a current content segment be completed before switching between the broadcast or Webcast and some repository of new or replacement content. Such, for example, triggers the creation of a plurality of personalized mediacasts 118, each containing new or replacement programming content segments selected, for example, based upon a mediacast content consumer selection criterion which may be supplied by the mediacast content consumer or discernible about the mediacast content consumer. Likewise, the personalized mediacasts 118 may include new or replacement non-programming content segments, for example, selected based upon one or more mediacast content consumer demographics, locations, etc., to create a personalized mediacast 118 uniquely tailored to an individual mediacast content consumer 114.

In some implementations, the monitor 202 detects metadata or markers or similar indicators designating a transition in programming content. The monitor 202 may, for example, detect the start or end of replaceable programming or replaceable non-programming content segments in the originating broadcast or Webcast programming 112. The monitor 202 may, for example, detect the start or end of replaceable programming content segments, for instance, entertainment content (e.g., songs or block of songs) in the originating broadcast or Webcast programming 112. Many types of broadcast or Webcast programming 112 include such metadata or markers or other indicators to designate the start and/or end of certain segments, for instance, marking the start or end of replaceable non-programming content segments or the start or end of replaceable or non-replaceable programming content segments. In some instances, the metadata or markers or other indicators simply mark the occurrence of the start or end of a segment. In other instances, the metadata or markers or other indicators include information or data about the respective content segment. For example, start metadata, or marker or other indicator may include information that specifies a duration of the subsequent content segment. The metadata or markers or other indicators may additionally or alternatively include other information. The monitor 202 scans the broadcast or Webcast programming 112 for metadata or markers or other indicators and produces an output or signals on a signal line 214 in response to detection of the same. The monitor 202 may also extract any information or data included in, or with, the indicator marker, for instance, an indication of the duration of the subsequent segment, providing such to the control subsystem 208, for example via signal line 214.

The buffer 206 is downstream from the monitor 202 and may buffer original broadcast or Webcast programming 112 when necessary or desirable. For example, such may allow time-shifting of content segments contained in the originating broadcast or Webcast programming 112, which may increase flexibility of the personalized mediacast generation system 200. For example, where a duration of new or replacement programming or non-programming content segments either individually or cumulatively match a duration of the replaceable programming or non-programming content segments that they are to replace, the duration of the original broadcast or Webcast programming 112 stored by the buffer 206 may remain constant or not change. Where the duration of new or replacement programming or non-programming content segments either individually or cumulatively exceed a duration of the replaceable programming or non-programming content segments that they are to replace, the original broadcast or Webcast programming 112 stored by the buffer 206 may grow or increase. Where a duration of new or replacement programming or non-programming content segments is less than a duration of the corresponding replaceable programming or non-programming content segments either individually or cumulatively that they are to replace, the broadcast or Webcast programming stored by the buffer 206 may shrink or be reduced. Notably, while the contents of the buffered may be played out during non-replaceable content segments of the broadcast, the buffer content is reduced by playing content from the buffer during replaceable content segments since there is no simultaneous storing to the buffer during these periods. The buffer may function as a queue, receiving new content segments at one end of the queue, while playing previously received content segments from the other end of the queue. The buffer 206 may advantageously allow selection of new or replacement programming and non-programming content segments having durations without particular regard to trying to match a duration of the replaceable programming and non-programming content segments that they are to replace.

The duration of any asynchronicity between the originating broadcast or Webcast programming 112 and the personalized mediacast 118 may be permitted to "float"—in other words, the selection of replacement programming and non-programming segments may be performed without specific regard to the duration of the new or replacement programming or non-programming segments or the duration of the replaceable programming or non-programming segments being replaced. In at least some implementations, new or replacement programming and non-programming content segments are not selected until metadata or a marker is detected in the originating broadcast or Webcast programming 112 by the monitor 202. Upon detection by the monitor 202 of certain metadata or markers indicative of a start of a non-replaceable content segment in the broadcast or Webcast programming 112, buffering of the non-replaceable originating broadcast or Webcast programming 112 to the buffer 206 can be started. Upon detection by the monitor 202 of certain metadata or markers indicative of an end of a non-replaceable content segment (e.g., programming content, non-programming content) in the broadcast or Webcast programming 112, delivery of a current new or replacement content segment to the combiner 204 may be allowed to finish, then the buffered content may be delivered from the buffer 206 to the combiner 204.

The combiner 204, also sometimes referred to as an alternative content inserter, is coupled downstream of the buffer 206. The combiner 204 selectively combines portions of the broadcast or Webcast programming 112 (e.g., non-replaceable content segment) with new or replacement programming and non-programming content segments to generate, create or otherwise produce the personalized mediacasts 118. For example, the combiner 204 may combine material from the new or replacement programming and non-programming content segment inventory 210 with non-replaceable programming and non-programming content segments of the originating broadcast or Webcast programming 112. For instance, replaceable programming content segments (e.g., songs or blocks of songs) appearing in the originating broadcast or Webcast programming 112 may be replaced with replacement programming content segments (e.g., songs or music selected based at least in part on mediacast content consumer specifications). In some instances, the new or replacement programming and non-programming content segments may be targeted or personalized for a particular mediacast consumer. In some instances, the new or replacement non-programming content may be more appropriate for wider audience than the replaceable non-programming content in the broadcast or Webcast which is being replaced. In some instances, the new or replacement non-programming content may be targeted to a specific mediacast content consumer or audience than the replaceable non-programming content in the broadcast or Webcast which is being replaced. Thus, the personalized mediacast 118 transmit, for instance via the Worldwide Web, may be more personalized for the specific mediacast content consumer as compared to the broadcast or Webcast programming 112 which is transmitted via conventional radio or television broadcasts.

The combiner 204 can take a variety of forms, as simple as a switch that selectively couples a downstream component or output of the personalized mediacast generation system 200 alternatively between a first input 214 (e.g., from buffer 206) that carries the originating broadcast or Webcast programming 112 and a second input 216 such as the insertion material inventory 210 that carries the replacement programming and non-programming content segments.

The control subsystem 208 may take a variety of forms. Typically, the control subsystem 208 will include one or more controllers, for example, microprocessors 218, DSPs 220, ASICs, PGAs, microcontrollers or the like. The control subsystem 208 will also typically include one or more nontransitory nonvolatile memories such as ROM or FLASH memory 222 and/or one or more volatile memories such as RAM 224. One or more communications ports 212, for example, parallel communications ports (e.g., Ethernet port) or serial communications ports (e.g., Universal Serial Bus ports) may be considered part of the control subsystem 208 or may be considered separate therefrom. The one or more communications ports 212 may allow wired and/or wireless communications with an alternative source of replacement programming and non-programming content segments. The one or more communications ports 212 may allow wired and/or wireless communications to receive instructions, commands, data or programming (e.g., firmware upgrades).

The various components of the control subsystem 208 may be coupled via one or more buses 226 (only one shown), for example, one or more power buses, communications buses, instruction buses, address buses, data buses, etc.

The control subsystem 208 is configured or programmed to control the operation of the personalized mediacast generation system 200. The control subsystem 208 is communicatively coupled to receive via signal line 214 one or more signals or data packets upon detection of a metadata or a marker or other indicator by the monitor 202. The one or more signals or data packets may be indicative of the start, end, duration, or any combination thereof of a replaceable programming content segment, replaceable non-programming content segment, or non-replaceable programming content segment in the broadcast or Webcast programming 112. The one or more signals or data packets may also be indicative of other information, for instance, the type of content segment, content of the content segment, format of the content segment or language of the content segment.

The control subsystem 208 may, for example, determine to insert a new or replacement programming content segment upon detecting metadata or a marker indicative of a start of a replaceable programming content segment in the broadcast or Webcast programming 112. The new or replacement programming content segment may, for example, be selected based on some mediacast content consumer specific information (i.e., content consumer replacement programming content selection criterion), supplied by a specific mediacast content consumer 114 (FIG. 1) or otherwise discernible about the specific mediacast content consumer 114.

The control subsystem 208 provides control signals to the buffer 24 via a buffer control line 226a to control the buffering or caching of originating broadcast or Webcast programming 112 by the buffer 206. The control subsystem 606 provides control signals to the combiner 204 via combiner control line 226b to control the combining of new or replacement programming and/or non-programming content segments with non-replaceable programming and/or non-programming content segments of the broadcast or Webcast programming 112. The control signals may cause the buffer 206 to selectively store or buffer originating broadcast or Webcast programming 112 while the combiner 204 is combining or inserting or placing replacement programming or non-programming content segments to generate or create the personalized mediacast 118.

The personalized mediacast generation system 200 may select replacement programming content segments based on content consumer supplied selection criterion values associated with: a song, a musical artist, a performing artist, a dramatic artist, a musical group, an album, a musical work, a theatric work, a film work, or a television work. The personalized mediacast generation system 200 may select replacement non-programming content segments based on selection criterion values associated with: demographic information regarding the audience, demographic information regarding the target audience for the advertisement, and/or maximize advertising revenue generated by the advertisement insertions.

In one or more implementations, one or more optional fragment encoders 230 may be positioned downstream of the personalized mediacast generation system 200. Such may be particularly useful where the personalized mediacasts will be delivered via "chunk based" delivery, for example via one or more CDNs 122 (FIG. 1).

The personalized mediacast generation system 200 may be similar, or even identical, in structure and/or operation to the content injection system described in U.S. patent application publication No. 2008/0120638 published May 22, 2008 or U.S. patent application Ser. No. 61/561,186 filed Nov. 17, 2011. That content injection system advantageously employs selective buffering or caching so that replacement programming or non-programming content segments do not need to be exactly the same length or duration as the replaceable programming or non-programming content segments they supplant. Additionally, or alternatively, the personalized mediacast generation system 200 may in some respects be similar or identical in structure and/or operation to that described in U.S. patent application publication No. 2007/0074243. Additionally, or alternatively, the personalized mediacast generation system 200 may in some respects be similar or identical in structure and/or operation to that described in U.S. Pat. No. 6,577,716.

New or Replacement of Programming Content Segments

Generally, replacement programming content segments are selected based at least in part upon one or more content consumer replacement programming content selection criterion 215 (FIG. 2). The content consumer replacement programming content selection criterion 215 may be communicated by each of the respective mediacast content consumers 114 (FIG. 1), for example to the broadcaster or Webcaster 102 or to some other entity. Alternatively, or additionally, the content consumer replacement programming content selection criterion 215 may be discernible from other information (e.g., various selections by a specific mediacast content consumer 114 or other information about the mediacast content consumer 114).

The content consumer replacement programming content selection criterion 215 can include a value indicative of a type of programming content desired by the mediacast content consumer. For example, the content consumer replacement programming content selection criterion 215 can include a value indicative of one or more of at least one of: a song, a musical artist, a performing artist, a dramatic artist, a musical group, an album, a musical work, a theatric work, a film work, a television work, a comedian, a comedy, a talk show host, a talk show segment, etc.

In some embodiments, the mediacast content consumer 114 can access only a limited repository of replacement programming content segments based upon a playlist or artist list supplied or defined by the specific broadcaster or Webcaster 102. Such may be based upon pre-approved or pre-determined replacement programming content selected by the broadcaster or Webcaster 102, for example in keeping with a genre (e.g., jazz, alternative rock, oldies, talk) appropriate for the broadcaster or Webcaster 102.

For example, a classic rock radio broadcaster 102 may broadcast a replaceable content segment containing music curated by the broadcaster 102—for example a Rolling Stones song, a Beatles song, a Led Zeppelin song and a Jefferson Airplane song. The monitor 202 (FIG. 2) detects metadata or a marker indicating a beginning of a replaceable content segment. A specific mediacast content consumer 114 may have previously indicated a preference for music by The Moody Blues® or music that sounds like The Moody Blues®. For example, the specific mediacast content consumer may have communicated, directly or indirectly, a replacement programming content selection criterion 215 containing a value indicating a desire to hear music by or similar to The Moody Blues®, for instance to the broadcaster 102 or some proxy system. In response, upon detecting the replaceable programming content segment metadata or marker, the combiner 204 (FIG. 2) accesses replacement programming content repository 210 (FIG. 2) that includes music by The Moody Blues®, or music that sounds like The Moody Blues® according to a judgment or assessment by an automated algorithm used by the broadcaster 102 or partners of the broadcaster 102 used to select the replacement programming content. The combiner 204 then begins transmitting the replacement programming content segment to specific mediacast content consumer 114, essentially combining the replacement programming content segment with previous content segments (e.g., non-replaceable content segments) to create the personalized mediacast 118.

The replacement programming content segment is seamlessly interleaved with the remaining portion of the programming forming the personalized mediacast 118 delivered to the specific mediacast content consumer 114. Such may continue until the specific mediacast content consumer 114 either transmits another replacement programming content selection criterion 215 or terminates the personalized mediacast 118. Thus, each subsequent replaceable programming content segment of the broadcast or Webcast programming 112 will be seamlessly replaced with replacement programming content segments featuring or sounding similar to The Moody Blues®. Note that in the absence of a replacement programming content selection criterion 215, the specific mediacast content consumer 114 will continue to receive the original broadcast or Webcast programming 112, including the replaceable programming content. In a similar manner, each of the respective content consumers 114 can receive appropriate or personalized replacement programming content segments based on their respective programming content selection criterion 215.

New or Replacement of Non-Programming Content Segments

Generally, replacement non-programming content segments are selected based at least in part upon one or more replacement non-programming content selection criterion selected or supplied by or more of: 1) the mediacast content consumer, 2) the broadcaster or Webcaster, and/or 3) a third party such as an advertiser or advertising agency. The third party may, for example, take the form of an advertiser, an advertiser network, or an advertisement broker.

The one or more replacement non-programming content segments can be selected based upon a value associated directly or indirectly with the mediacast content consumer 16, for example, a property or characteristic of the mediacast content consumer. In some instances, the replacement non-programming content segment may be selected at least in part based upon a market demographic represented by one or more market demographic values associated with the respective one of the plurality of mediacast content consumers 16 (e.g., age, gender, home zip code) or any other value that characterizes the mediacast content consumer 16 based upon, for example, a personal attribute) or a geographic value associated with the respective one of the plurality of mediacast content consumers 16, for example a geographic value that represents a current estimated geographic location of the mediacast content consumer.

Thus, the new or replacement non-programming content segments may be selected for or targeted to a specific mediacast content consumer 114 (FIG. 1). For instance, the replacement non-programming content segment may be selected at least in part based upon a respective mediacast content consumer self-reported attribute value associated with the replacement non-programming content segment by a third party. Also for instance, the replacement non-programming content segment may be selected at least in part based upon a prior behavior of the mediacast content consumer 114 (FIG. 1). For example, such may be based on a respective mediacast content consumer 114 (FIG. 1) prior purchase history value associated with the replacement non-programming content segment by a third party; For example, an advertisement for a new brand of sports watches may be of particular interest to prior purchasers of a sports watch or prior purchasers of other types of sports equipment. The replacement non-programming content segments may be selected based at least in part upon a prior purchase value associated with the respective one of the plurality of mediacast content consumers 114 (FIG. 1)).

Alternatively, the new or replacement non-programming content segments may be selected for or targeted to some demographic of mediacast content consumers. For example, a replacement non-programming content segment advertisement for motor oil may be targeted at a male demographic between the ages of 25 and 49 while a replacement non-programming content segment advertisement promoting membership in the American Association of Retired Persons (AARP®) may be targeted at a male and female demographic between the ages of 49 and 65. The replacement non-programming content segments may be selected based at least in part upon a market demographic value associated with the replacement non-programming content segment by a third party.

For instance; the new or replacement non-programming content segments may be selected for or targeted based at least in part on a result of a survey of non-programming content segments associated with other mediacast content consumers within a delineated geographic area of the respective one of the plurality of mediacast content consumers; a result of a survey of programming content segments associated with other mediacast content consumers with whom the respective one of the plurality of mediacast content consumers has indicated an association; a result of a survey of purchases associated with other mediacast content consumers with whom the respective one of the plurality of mediacast content consumers has indicated an association; and at least one self-reported value associated with respective mediacast content consumers. Such may take advantage of various social networking platforms (e.g., FACEBOOK®, CLASSMATES®, LINKED INC)) to draw logical connections or associations between a specific mediacast content consumer and other end users. This advantageously allows information collected, either explicitly or implicitly, about those end users to be used as a proxy for the specific mediacast content consumer 114 (FIG. 1). For instance, preferences, browsing history and/or shopping history of various end users who are logically connected or associated with a specific mediacast content consumer 114 (FIG. 1) may be used to determine which non-programming content to target to that specific mediacast content consumer 114.

Additionally or alternatively, the new or replacement non-programming content segments may be selected for or targeted based at least in part on a geographic value (e.g., targeted geographic area or region). For instance, an Internet Protocol address associated with a respective one of the plurality of mediacast content consumers may be employed to determine or at least estimate a home geographical location or a current geographical location of the respective mediacast content consumer 114 (FIG. 1). The particular geographic area may be logically associated with demographic information, for example wealth, spending habits, etc., of the general population of that geographic area.

In other instances, the replacement non-programming content segment may be selected based at least in part upon one or more financial aspects associated with the non-programming content segment. For example, the replacement non-programming content segment may be selected based at least in part on the income provided to the broadcaster or Webcaster for running the advertisement. The replacement non-programming content segments may be selected based at least in part upon an income value associated with the replacement non-programming content segment; a public service value associated with the replacement non-programming content segment; and a legal obligation value associated with the replacement non-programming content segment.

Relative Synchronization of Mediacasts with Respect to Broadcaster or Webcaster Programming Recall programming content segments are considered either replaceable or non-replaceable. Non-replaceable content segments may include one or more time sensitive features, for example news at the top of the hour and at 30 minutes after the hour, a disc jockey talking about a song or artist that was just played or that is about to be played, a real time traffic report, a real time phone call from a listener or to a personality, etc. Thus, the systems and method herein are capable of operating with live content and live broadcasting. All content consumers, whether broadcast, Webcast or mediacast content consumers, may rely upon the timeliness of the news segments, i.e., the segments should occur as close as possible if not at the top of the hour and at 30 minutes after the hour. Minimizing asynchronicity between the broadcast, Webcast and the plurality of mediacasts delivered to the plurality of mediacast content consumers 29 is therefore desirable.

Figure 3:
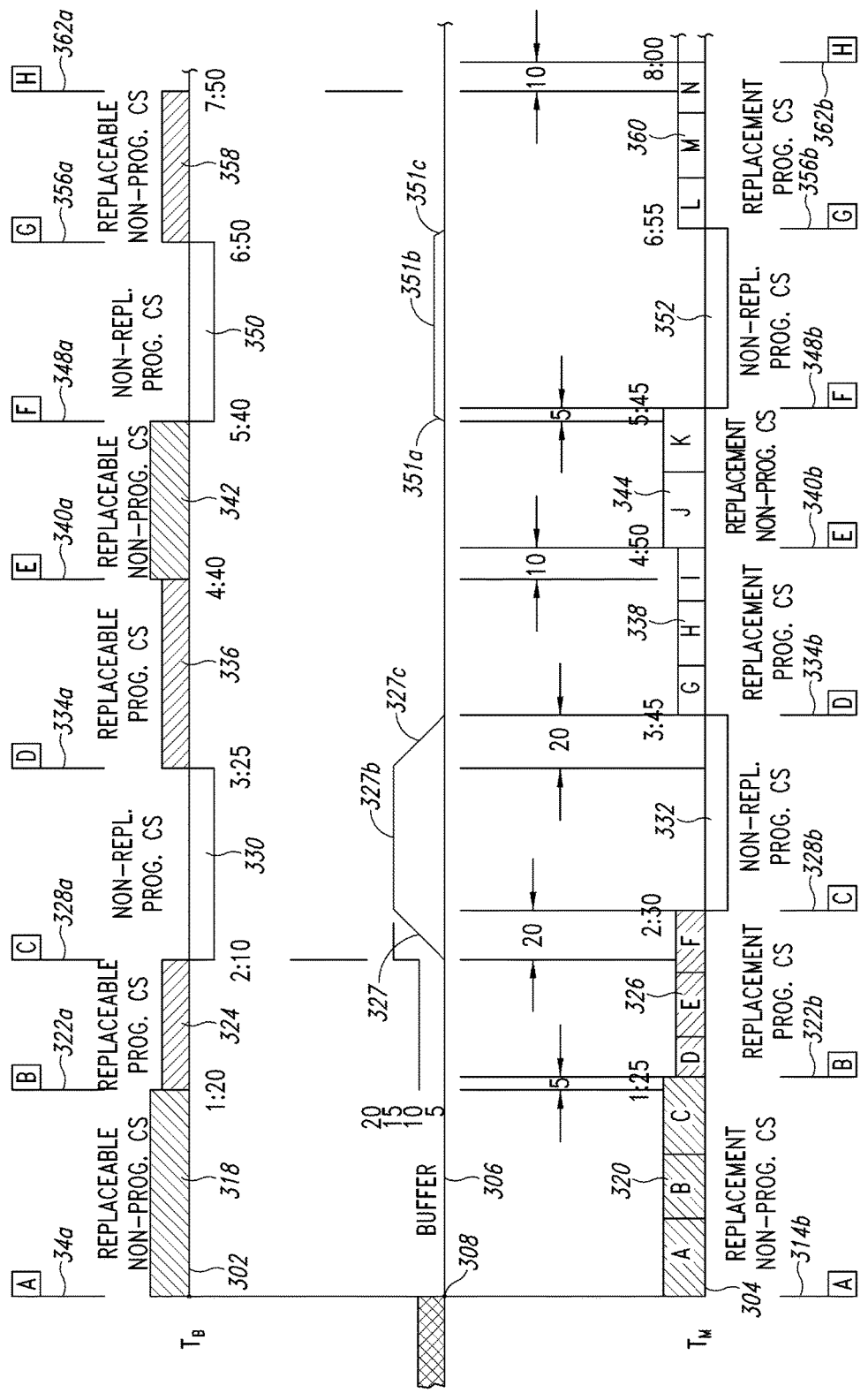
FIG. 3 is a timing diagram of a networked environment depicting the temporal relationship between programming provided as a broadcast or Webcast and an example personalized mediacast delivered to a mediacast content consumer; and specifically illustrating increasing and decreasing asynchronicity between the programming and the personalized mediacast, according to one illustrated embodiment.

FIG. 3 shows an example broadcast timeline ($T_B$) 302 and an example personalized mediacast timeline ($T_M$) 304. Asynchronicity between portions of the broadcast or Webcast programming 302 and the corresponding portions of the personalized mediacast 304 may be attributed to differences in duration or length between replaceable content segments or material and the replaceable content segments or materials which they replace. Such may be due to individual differences in length or duration, and/or due to differences in cumulative length or duration. The personalized mediacast generation system 116 (FIGS. 1 and 2) accommodates these differences in length or duration via buffering of the broadcast or Webcast programming 112 or portions thereof. This buffering is depicted on the buffering timeline 306.

While buffering is generally illustrated and described in the description as occurring at the personalized mediacast generation system 116, such may occur elsewhere (e.g., CDN 122, mediacast content consumer 114). The buffering timeline 306 represents only one example of a sequence of content segments. In some implementations a difference sequence of content segments may occur. For example, a replaceable or non-replaceable non-programming content segment may occur immediately following a non-replaceable programming content segment. Also for example, some types of content segments may not occur and/or other types of content segments may occur, Based on the description herein, a skilled artesian will be able to apply the general principals described herein to sequences of content segments other than that specifically illustrated in FIG. 3.

Point 308 represents a point in time where the broadcast programming 302 and the personalized mediacast 304 are in time synchronization $T_B=T_M=0$.

At time $T_B=T_M=0$, metadata or a marker 314a indicating the beginning of a replaceable non-programming content segment is detected in the broadcast programming 302. The broadcaster 102 (FIG. 1) provides 1:20 of replaceable non-programming content segment 318. The replaceable non-programming content segment 318 may, for example, consist of a plurality of advertisements or commercials.

While the broadcaster 102 broadcasts the 1:20 of replaceable non-programming content segment 318 to the broadcast content consumers 106 (FIG. 1), the personalized mediacast generation system 116 substitutes a first replacement non-programming content segment 320A into the personalized mediacast 204. The first replacement non-programming content segment 320A may, for example, consist of a first advertisement or commercial, which is likely different from the advertisements or commercials of the broadcast programming 302, for example an advertisement or commercial selected based on various non-programming selection criterion.

Having not detected metadata or a marker prior to the end of the first replacement non-programming content segment 320A, the personalized mediacast generation system 116 substitutes a second replacement non-programming content segment 320B into the personalized mediacast 204. Such may, for example, consist of a second advertisement or commercial, again selected based on various non-programming selection criterion.

Again, having not detected metadata or a marker prior to the end of the second replacement non-programming content segment 320B, the personalized mediacast generation system 116 substitutes a third replacement non-programming content segment 320C into the personalized mediacast 204. Such may, for example, consist of a third advertisement or commercial, again selected based on various non-programming selection criterion.

Prior to reaching the end of the third replacement non-programming content segment 320C, the personalized mediacast generation system 116 (e.g., monitor 202) detects metadata or marker 322a indicating the start of a replaceable programming content segment 324, for example at 1:20 in the broadcast programming 202. The personalized mediacast generation system 116 continues to substitute the third replacement non-programming content segment 320C until its end is reached, at 1:25.

Once the end of the third replacement non-programming content segment 320C is reached, at 1:25, personalized mediacast generation system 116 substitutes replacement programming content segments 326 to form the personalized mediacast 304. Thus, two conditions had to be satisfied, the first being that metadata or a marker indicated that a replaceable portion of the broadcast programming 302 had been reached, and the second being that the current content segment being substituted or inserted has finished.

In this example, the broadcaster 102 (FIG. 1) transmits 0:50 of replaceable programming content 224 to the broadcast content consumers 114 (FIG. 1). The replaceable programming content 224 may, for example, consist of a plurality of songs by various artists on the broadcaster's playlist or which are consistent with the broadcaster's genre. While the illustrated example uses certain periods, actual implementations will of course use different periods. For example, replaceable content segments may, for instance, include blocks of three to six songs, which may average 2:30, or some other duration. Thus, the total replaceable programming content period may, for example be between 10 and 15 minutes, rather than the much more abbreviated period (0:50) illustrated.

While the broadcaster 112 (FIG. 1) broadcasts replaceable programming content 224, personalized mediacast generation system 116 substitutes a first replacement programming content segment 326D to generate the personalized mediacast 204. The first replacement programming content segment 226D may, for example, take the form of a song, likely different from the songs of the replaceable programming content 224, for instance a song selected based on mediacast content consumer programming selection criterion.

Having not detected metadata or a marker prior to the end of the replacement programming content segment 326D, the personalized mediacast generation system 116 substitutes a second replacement programming content segment 326E to generate the personalized mediacast 204. The second replacement programming content segment 226E may, for example, take the form of a song, likely different from the songs of the replaceable programming content 224, for instance a song selected based on mediacast content consumer programming selection criterion.

Again, having not detected metadata or a marker prior to the end of the second replacement programming content segment 326E, the personalized mediacast generation system 116 substitutes a third replacement programming content segment 326F to generate the personalized mediacast 118 (FIG. 1). The third replacement programming content segment 226F may, for example, take the form of a song, likely different from the songs of the replaceable programming content 224, for instance a song selected based on mediacast content consumer programming selection criterion.

Prior to reaching the end of the third replacement programming content segment 326F, the personalized mediacast generation system 116 (e.g., monitor) detects metadata or a marker 328a indicating the start of a non-replaceable programming content segment 330, at 2:10 in the broadcast programming 302. The personalized mediacast generation system 116 continues to substitute the third replacement non-programming content segment 326F until its end is reached, at 2:30, The non-replaceable programming content segment 330 is an important part of the broadcast, so cannot be lost. The non-replaceable programming content segment 330 may, for example, comprises news, sports, weather, or traffic reporting, announcer or host discussions, or other content that would be relevant to a wider, geographically diverse audience. Since the non-replaceable programming content segment 330 is marked or identified as being non-replaceable, and since the start of the non-replaceable programming content segment 330 is detected before the personalized mediacast generation system 116 is finished with the third replacement programming content segment 326F, the personalized mediacast generation system 116 starts buffering the non-replaceable programming content segment 330 at 2:10 in the broadcast programming 302. Such is indicated by the gradually increasing slope 327a of buffer time line 306.

Once the end of the third replacement non-programming content segment 326F is reached, at 2:30, the personalized mediacast generation system 116 starts transferring the buffered content from the buffer 206 (FIG. 2) as non-replaceable programming content segment 332 to generate the personalized mediacast 204. At the same time, the personalized mediacast generation system 116 continues to buffer incoming portions of the non-replaceable programming content segment 330 to the buffer 206 (FIG. 2). Thus, the buffer 206 is playing off a front end, while storing to the back end, in a queue like fashion. This is indicated by the essentially flat portion 327b of the buffer time line 306, which assumes the incoming content arrives at the same rate as the outgoing content. Such may or may not be the case in any particular implementation, and may even vary from time to time in a single implementation.

Notably, the non-replaceable programming content segment 232 portion of the personalized mediacast 304 lags the corresponding non-replaceable programming content segment 230 portion of the broadcast programming 302 by 0:20. However, this asynchronicity between the broadcast programming 302 and the personalized mediacast 304 is unnoticed by either the mediacast content consumer 114 (FIG. 1) due to the seamless substitution or insertion of the replacement programming and non-programming content by the personalized mediacast generation system 116.

At 3:25 the personalized mediacast generation system detects metadata or marker 334a in the broadcast programming 302, which is indicative of the start of a replaceable programming content segment 336 in the broadcast programming 302. The personalized mediacast generation system 116 (FIG. 1) continues playing out of the buffer 206 (FIG. 2) until all of the non-replaceable programming content segment 332 has been incorporated into the personalized mediacast 304, at 3:45. This is illustrated as gradually decreasing slope 327c of the buffer time line 306. This empties the last 20 seconds of the buffer, which cuts into the replaceable programming content segment 336 effectively shortening such.

In this illustration, the broadcaster 112 (FIG. 1) transmits 1:15 of replaceable programming content 336 to the broadcast content consumers 106 (FIG. 1). Once the non-replaceable programming content segment 330 has been played from the buffer, the personalized mediacast generation system 116 (FIG. 1) substitutes a first replacement programming content segment 338G to generate the personalized mediacast 304. The first replacement programming content segment 338G may, for example, consist of a song, likely different from the songs of the replaceable programming content 336, for instance a song selected based on mediacast content consumer programming selection criterion.

Having not detected metadata or a marker prior to the end of the first replacement programming content segment 338G, the personalized mediacast generation system 116 (FIG. 1) substitutes a second replacement programming content segment 338H to generate the personalized mediacast 304. The second replacement programming content segment 338H may, for example, consist of a song, likely different from the songs of the replaceable programming content 336, for instance a song selected based on mediacast content consumer programming selection criterion.

Again, having not detected metadata or a marker prior to the end of the replacement programming content segment 238H, the personalized mediacast generation system 116 (FIG. 1) substitutes a third replacement programming content segment 238I into the personalized mediacast 304. The third replacement programming content segment 338H may, for example, consist of a song, likely different from the songs of the replaceable programming content 336, for instance a song selected based on mediacast content consumer programming selection criterion.

Prior to reaching the end of the third replacement programming content segment 338I, the personalized mediacast generation system 116 (FIG. 1) detects metadata or marker 340a, indicating a start of a replaceable non-programming content segment 342 at 4:40 in the broadcast programming 302. The replaceable non-programming content segment 342 may, for example, comprise a number of advertisements or commercials. The illustrated replaceable non-programming content segment 342 is 1;00 minute in length or duration.

Notably, the replacement non-programming content segment 338I ends 0:10 after the personalized mediacast generation system 116 detects the metadata or marker 340a. Recall that the total asynchronicity was 0:20 prior to the current segment. Thus, the asynchronicity has been reduced by 0:10. This occurs inherently through the buffering of certain broadcast programming content which is triggered by detection of metadata or makers, and the unbuffering of buffered content which is triggered by two conditions, that is the occurrence of a next content segment in the broadcast programming, which is indicated by detection of appropriate metadata or markers, and the completion of the substitution of the current replacement content. It can be seen that the system advantageously is able to thereby manage the buffering of broadcast programming content for each of the personalized mediacasts 304 without requiring knowledge of the duration of the replaceable segment within the broadcast programming 302 or knowledge of the duration of the replacement segments used to generate each personalized mediacast 304.

At 4:50 personalized mediacast generation system 116 (FIG. 1) detects metadata or marker 340b, which indicates the end or completion of the third replacement programming content segment 338I. In response, the personalized mediacast generation system 116 (FIG. 1) substitutes a first replacement non-programming content segment 344J to generate the personalized mediacast 304.

Having not detected metadata or a marker prior to the end of the first replacement programming content segment 344J, the personalized mediacast generation system 116 (FIG. 1) substitutes a second replacement non-programming content segment 344K to generate the personalized mediacast 304.

Prior to reaching the end of the second replacement non-programming content segment 344K, the personalized mediacast generation system 116 (FIG. 1) detects metadata or marker 348a, indicating the start of a non-replaceable programming content segment 350 at 5:40 in the broadcast programming 302. The personalized mediacast generation system 116 (FIG. 1) continues to substitute the replacement programming content segment 344K until the replacement programming content segment 344K is complete. During this time personalized mediacast generation system 116 (FIG. 1) buffers the non-replaceable programming content segment 350. Such is indicated by the gradually increasing slope 351a of the buffer time line 306. Notably, two conditions had to be satisfied to trigger the buffering, that is 1) detection of non-replaceable content; and 2) an uncompleted substitution of replacement content, The personalized mediacast generation system 116 (FIG. 1) detects metadata or marker 348b, indicating the replacement programming content segment 344K is complete. This occurs at 5:45, 0:05 after the detection of the metadata or marker 348a. In response, the personalized mediacast generation system 116 (FIG. 1) begins unbuffering or playing or transferring the buffered content out of the buffer 206 (FIG. 2) to generate the personalized mediacast 304. Meanwhile, the personalized mediacast generation system 116 (FIG. 1) continues to buffer portions of the non-replaceable programming content segment 350 as those portions arrive. This simultaneous buffer and unbuffering is illustrated as a flat portion 351b of the buffer time line 306.

Recall that the total asynchronicity was 0:10 prior to the current segment. Thus, the asynchronicity has been reduced by 0:05 to 0:05. The non-replaceable programming content segment 352 portion of the personalized mediacast 304 lags the corresponding non-replaceable programming content segment 350 portion of the broadcast programming 302 by 0:05.

The personalized mediacast generation system 116 (FIG. 1) detects metadata or marker 356a which is indicative of a start of a replaceable non-programming content segment 358, at 6:50. The replaceable non-programming content segment 358 may, for example, take the form of one or more advertisements or commercials. The replaceable non-programming content segment 358 is illustrated as having a length or duration of 1:00 minute. During this time, the personalized mediacast generation system 116 (FIG. 1) is emptying the remaining buffered content, illustrated by the gradually decreasing slope 351c of the buffer time line 306.

The personalized mediacast generation system 116 (FIG. 1) detects metadata or marker 356b which indicates an end of the unbuffering or playing out of the buffered non-replaceable programming content segment 350. In response, the personalized mediacast generation system 116 (FIG. 1) substitutes a first replacement programming content segment 360L to generate the personalized mediacast 304. The first replacement programming content segment 360L may, for example, comprises one or more songs, which may be selected based on mediacast content consumer programming selection criterion. Thus, in contrast to previous substitutions or replacements, in this instance one type of content (i.e., non-programming content) is being replaced by a different type of content (i.e., programming content).

Having not detected metadata or a marker prior to the end of the first replacement programming content segment 360L, the personalized mediacast generation system 116 (FIG. 1) substitutes a second replacement programming content segment 360M to generate the personalized mediacast 304. The second replacement programming content segment 360M may, for example, comprises one or more songs, which may be selected based on mediacast content consumer programming selection criterion. Thus, in contrast to previous substitutions or replacements, in this instance one type of content (i.e., non-programming content) is being replaced by a different type of content (i.e., programming content).

Again, having not detected metadata or a marker prior to the end of the replacement programming content segment 360M, the personalized mediacast generation system 116 (FIG. 1) substitutes a third replacement programming content segment 360N to generate the personalized mediacast 304. The third replacement programming content segment 360N may, for example, comprises one or more songs, which may be selected based on mediacast content consumer programming selection criterion. Thus, in contrast to previous substitutions or replacements, in this instance one type of content (i.e., non-programming content) is being replaced by a different type of content (i.e., programming content).

Prior to reaching the end of the third replacement programming content segment 360N, the personalized mediacast generation system 116 (e.g., monitor 202) detects metadata or marker 362a indicating the start of another segment at 7:50 in the broadcast programming 302. The third replacement non-programming content segment 360N ends 0:10 after the personalized mediacast generation system 116 (FIG. 1) detects metadata or marker 362a. Thus, the current asynchronicity (i.e., the duration of the original broadcast being buffered) is 0:05.

As illustrated above, the personalized mediacast generation system 116 may inherently fluctuate around a certain asynchronicity between the broadcast programming 302 and the personalized mediacast 304. This advantageously prevents accumulation of large amounts of asynchronicity over time. This inherent tendency to self adjust is, at least in part, a result of requiring two conditions to be satisfied before substituting or inserting replacement content, 1) metadata or a marker indicates that a replaceable portion of the broadcast programming 302 had been reached, and 2) the current content segment being substituted or inserted has finished. This allows buffered content to be played out, and a following replaceable content segment be automatically shortened to reduce the asynchronicity, even without any knowledge or concern about the length of the individual pieces of content being substituted during the replaceable content segment. Such provides a particularly elegant solution, allowing complete freedom in content selection, while inherently limiting cumulative asynchronicity. Both replaceable programming and replaceable non-programming segments may be used to reduce the asynchronicity.

Of note, the example illustrated in FIG. 3 assumes that the length or duration of content segments are not known until an end of the respective content segment is reached. In other implementations, the length or duration may be known at the start of a content segment. For example, such may be encoded in the associated metadata or marker. A skilled artisan will be able to apply the concepts described herein to the situation where the length or duration is known at the start, which is an inherently easier task than implementing without such knowledge. In such situations, the new or replacement content may be selected based in part on how closely a fit in length or duration it has to a length or duration of a content segment that it will replace. Such may be determined on an individual basis (e.g., replacement song versus song to be replaced), a cumulative basis (e.g., series of replacement songs versus total length of multi-song segment during which multiple songs are played in the broadcast), or both. For instance, if it is known that there is one 3 minute segment, six 30 second advertisements may be selected, or four 30 second advertisements along with one 1 minute advertisement. Having this knowledge of course simplifies buffering, at the expense of matching lengths or durations.

In an alternative, it may be desirable to ensure that some content segments are not reduced in duration or length. For example, replaceable non-programming content segments may be used to run advertisements or commercials. Reduction of the duration of such may reduce revenue opportunity for a broadcaster or Webcaster 102. Thus, in some implementations some of replaceable segments are not used to reduce asynchronicity. In such implementations the personalized mediacast generation system 116 may extend a length or duration of a replacement content segment sufficiently to assure that such is at least as long as a length or duration of the corresponding content segment in the broadcast or Webcast. In some instance, the replacement content segment will be longer, for example where a piece of replacement content must be completely played out so extends the transition to non-replaceable content. Other replaceable content segments (e.g., replaceable programming content segments) may be used to reduce asynchronicity. Such may even be implemented dynamically. For example, the personalized mediacast generation system 116 determines whether an asynchronicity exceeds some threshold value, If the asynchronicity does not exceed the threshold value, the personalized mediacast generation system 116 lengthens the replacement content segment in the personalized mediacast to ensure it is at least as long as the corresponding replaceable content segment in the broadcast programming. If the asynchronicity does exceed the threshold value, the personalized mediacast generation system 116 uses the replacement content segment in the personalized mediacast to reduce the asynchronicity between the personalized mediacast and the broadcast programming.

Further, as used herein and in the claims, the term substitute and variations of such are not limited to one for one substitutions, but generally refer to a partial or even total replacement of some content for some other content to generate the personalized mediacast 118 (FIG. 1).

Replacement Non-Programming Content, Data Structures and Storage Media

Various nontransitory media discussed above may store information such as data in one or more data structures. Data structures may take a variety of forms, for replacement programming and non-programming content segment inventory, records associated with relational databases, a database itself, lookup tables, etc. The data structures may store a variety of different information or data.

A data structure may store replacement non-programming content segments such as advertisement related information in the form of a record with a variety of fields. In addition to the replacement non-programming content segments the data structure may store replacement programming content segments such as entertainment content related information also in the form of a record with a variety of fields.

The data structure may store a replacement non-programming content segment identifier that uniquely identifies the replacement non-programming content segment. The data structure may store a medium identifier that identifies a type of medium in which the replacement non-programming content segment may run. The medium identifier may, for example, specify one or more of radio, television, Web, etc. mediums. The data structure may store a duration indication that specifies the duration of the associated replacement non-programming content segments. The data structure may store advertiser replacement non-programming content segment identifier that uniquely identifies an advertiser to which the replacement non-programming content segments are related or owned. The data structure may store a markets identifier that identifies one or more geographic markets (e.g., NYC, Pacific Northwest, Seattle) or other markets (e.g., high technology, industrial supply) to which the replacement non-programming content segments are targeted. The data structure may store a language identifier that identifies a language (e.g., English, Spanish) of the replacement non-programming content segments.

The data structure may store general population demographic information that specifies the demographics of the mediacast content consumers 114 (FIG. 1) to which the replacement non-programming content segments are targeted. The general population demographic information may include a large variety of information, for example, gender(s) (e.g., male, female, both), age(s) (e.g., 21-30 year olds), incomes (e.g., over $50,000 per year). Other or different generalized population demographic information may be employed.

The data structure may store specific demographic information that specifies the demographics of all or a portion of the mediacast content consumer audience, or individual mediacast content consumers 114 to which the replacement non-programming content segments are targeted or may be of particular interest. Such may be useful where information for particular mediacast content consumers 114 have been collected, for instance, automatically collected or collected via self-reporting by those mediacast content consumers. The specific demographic information may include a large variety of information. The specific demographic information may, for example, indicate a current location of a mediacast content consumer 114. The current location may be a fairly specific geographic location (e.g., Zip or other postal code), which may be discernible, for example, from an Internet address, telephone area code and prefix, or from cellular location information. The current location may represent a type of location, for example, fixed or mobile, which may, for instance, be discerned from an Internet address or device type (e.g., Smartphone operating on cellular system versus operating on WI-FI, satellite radio, DSL line). The specific demographic information may, for example, provide an indication of the mediacast content consumer device used by the mediacast content consumer 114. For instance, the device type may indicate a general device type (e.g., computer, tablet, Smartphone), or a more specific device type (e.g., manufacturer and model). Such may be determined, for example, by querying or polling the mediacast content consumer device. The specific demographic information may, for example, indicate a bandwidth or service level available to an individual. Available bandwidth or service level may be discernible from the type of communications infrastructure involved, (e.g., cellular, WI-FI, DSL, cable modem) or device type.

The specific demographic information may, for example, include self reported demographic information. Such may include information that is not readily discernible without self reporting. The self reported specific demographic information may, for example, indicate a gender of a particular mediacast content consumer 114. The self reported specific demographic information may, for example, indicate an actual age of the mediacast content consumer 114 (e.g., 47 years old). The self reported specific demographic information may, for example, indicate an income of a mediacast content consumer 114 (e.g., $50,000 per year). The self reported specific demographic information may, for example, indicate an occupation of the mediacast content consumer 114 (e.g., engineer, salesperson). The self reported specific demographic information may, for example, indicate interests of an mediacast content consumer 114 (e.g., pilot, snorkeling, leisure reading). The self reported specific demographic information may, for example, indicate media preferences of a mediacast content consumer 16 (e.g., certain periodicals, television or radio shows or stations).

A data structure may store replacement non-programming content segments in the form of a record with a variety of fields. The data structure may store a replacement non-programming content segment identifier that uniquely identifies a replacement non-programming content segment. The data structure may store replacement non-programming content segments. The advertisement content may take a variety of forms, for example, audio files, video files, WebPages, banners, popup, or pop files. The advertisement content may be formed in any of a large variety of formats, for example, AVI, DivX, MPEG, SVCD, VCD, WMV, XVCD, XSVCD, MP3 files, MP4 files, HTML files, XML, Flash®, AAC, .mov, H.264, MKV files, etc.

A data structure may store replaceable non-programming content segment related information in the form of a record with a variety of fields. The data structure may store a replaceable non-programming content segment opportunity identifier that uniquely identifies a replaceable non-programming content segment placement opportunity. Such may correspond to an available segment or sub segment of programming. The data structure may store a medium identifier that identifies a type of medium in which the replacement non-programming content segments may run. The medium identifier may, for example, specify one or more of radio, television, Web, etc. mediums. The data structure may store a duration indication that specifies the duration (e.g., 15 seconds, 30 seconds, 60 seconds) of the available replaceable non-programming content segment opportunity. The data structure may store a date or time identifier that uniquely identifies a date and/or time of the available replaceable non-programming content segment placement opportunity. Such may specify date by day of year, by day of week, or season. Time may be specified in any desired time zone, for example, a time zone in which the originating broadcast or Webcast programming will be broadcast. The data structure may store a guaranteed indication that specifies whether a content provider ensures that a replacement non-programming content segment if placed for the respective available replaceable non-programming content segment opportunity is guaranteed to be broadcast, assuming the advertisement meets any guidelines or conditions applied by the respective content provider to advertising in its programming. The data structure may store a content provider identifier that specifies a content provider identifier that uniquely identifies a content provider (e.g., KUOW, WNEW, ABC, WABC, TBS) which will be broadcasting or otherwise transmitting the programming. The data structure may store a markets identifier that identifies one or more geographic markets (e.g., NYC, Pacific Northwest) or other markets (e.g., high technology, industrial supply) to which the replacement non-programming content segment is targeted. The data structure may store a language identifier that identifies a language (e.g., English, Spanish) of the programming associated with the available replaceable non-programming content segment opportunity. It is likely that an advertiser will employ the same language for an replacement non-programming content segment as the language of the main programming since the audience may be expected to understand that language. The data structure may store general population demographic information that specifies the demographics of the generally audience(s) to which the programming and/or the content provider's broadcasting or Webcasting is targeted. The general population demographic information may include a large variety of information, for example, gender(s) (e.g., male, female, both), age(s) (e.g., 21-30 year olds), incomes (e.g., over $50,000 per year). Other or different generalized population demographic information may be employed.

The data structure may store specific demographic information that specifies the demographics of all or a portion of the mediacast content consumer audience, or individual mediacast content consumers 114 to which the broadcaster or Webcaster's programming or the content provider's broadcasting or Webcasting is targeted. Such may be useful where information for particular mediacast content consumers in an audience have been collected, for instance, automatically collected or collected via self-reporting by those mediacast content consumers 114. The specific demographic information may include a large variety of information.

The specific demographic information may, for example, indicate a current location of a mediacast content consumer 114 (FIG. 1). The current location may be a fairly specific geographic location, which may be discernible, for example, from an Internet address, telephone area code and prefix, or from cellular location information. The current location may represent a type of location, for example, fixed or mobile, which may, for instance, be discerned from an Internet address or device type (e.g., Smartphone operating on cellular system versus operating on WI-FI, satellite radio, DSL line). The specific demographic information may, for example, indicate a device type employed by a mediacast content consumer 114. For instance, the device type may indicate a general device type (e.g., computer, tablet, Smartphone), or a more specific device type (e.g., manufacturer and model). Such may be determined, for example, by querying or polling the device. The specific demographic information may, for example, indicate a bandwidth or level of service available to a mediacast content consumer 114. Available bandwidth may be discernible from the type of communications infrastructure involved, (e.g., cellular, WI-FI, DSL, cable modem) and/or device type.

The specific demographic information may, for example, include self reported demographic information. Such may include information that is not readily discernible without self reporting. The self reported specific demographic information may, for example, indicate a gender of a mediacast content consumer 114. The self reported specific demographic information may, for example, indicate an actual age of the mediacast content consumer 114 (e.g., 47 year old). The self reported specific demographic information may, for example, indicate an income of a mediacast content consumer 114 (e.g., $50,000 per year). The self reported specific demographic information may, for example, indicate an occupation of the mediacast content consumer 114 (e.g., engineer, salesperson). The self reported specific demographic information may, for example, indicate interests of a mediacast content consumer 114 (e.g., pilot, snorkeling, leisure reading). The self reported specific demographic information may, for example, indicate media preferences of a mediacast content consumer 114 (e.g., certain periodicals, television or radio shows or stations).

Replacement Programming Content, Data Structures and Storage Media

A data structure may store replacement programming content segments such as entertainment related information (e.g., talk shows, music, pre-recorded live content, etc.) in the form of a record with a variety of fields. The data structure may store a replacement programming content segment identifier that uniquely identifies the replacement programming content segment. The data structure may store a medium identifier that identifies a type of medium in which the replacement programming content segment may run. The medium identifier may, for example, specify one or more of radio, television, Web, etc. mediums. The data structure may store a duration indication that specifies the duration of the associated replacement programming content segments. The data structure may store a replacement non-programming content segment identifier that uniquely identifies the artist, group, or performer to which the replacement non-programming content segments are related or attributed. The data structure may store a market identifier that identifies one or more geographic markets (e.g., NYC, Pacific Northwest, Seattle) or other market segments (e.g., conservative talk, progressive talk, entertainment industry, etc.) to whom the replacement programming content segments are targeted or may be of potential interest. The data structure may store a language identifier that identifies the primary language content (e.g., English, Spanish) of the replacement programming content segments.

The data structure may store general population demographic information that specifies the demographics of the mediacast content consumers 114 to whom the replacement programming content segments may be of interest. The general population demographic information may include a large variety of information, for example, gender(s) (e.g., male, female, both), age(s) (e.g., 21-30 year olds), income(s) (e.g., over $50,000 per year). Other or different generalized population demographic information may be employed.

The data structure may store specific demographic information that specifies the demographics of all or a portion of the mediacast content consumer audience, or individual mediacast content consumers 114 to whom the replacement programming content segments are targeted or may be of particular interest. Such may be useful where information for particular mediacast content consumers 114 have been collected, for instance, automatically collected or collected via self-reporting by those mediacast content consumers. The specific demographic information may include a large variety of information. The specific demographic information may, for example, indicate a current location of a mediacast content consumer. The specific demographic information may be based in whole or in part upon the proximity of one mediacast content consumer 114 to other mediacast content consumers 114 (enabling, for example, the delivery of replacement programming content segments based upon what other mediacast content consumers in the area are receiving). The current location may be a fairly specific geographic location, which may be discernible, for example, from an Internet address, telephone area code and prefix, or from cellular location information. The current location may represent a type of location, for example, fixed or mobile, which may, for instance, be discerned from an Internet address or device type. The specific demographic information may, for example, provide an indication of the mediacast content consumer device used by the mediacast content consumer 114. For instance, the device type may indicate a general device type (e.g., computer, tablet, Smartphone), or a more specific device type (enabling, for example, delivery of high definition replacement programming content segments on devices amenable to HD format while conserving bandwidth by delivery standard definition replacement programming content segments on devices incapable of rendering an HD format). Such may be determined, for example, by querying or polling the mediacast content consumer device. The specific demographic information may, for example, indicate a bandwidth or service level available to an individual. Available bandwidth or service level may be discernible from the type of communications infrastructure involved, (e.g., cellular, WI-FI, DSL, cable modem) or device type.

Other items that could be stored in the replacement programming content records include song-specific information or data such as tempo, tonal qualities, current popularity, related artists, related songs, and/or genres.

In some instances, replacement programming content segments are selected based at least in part upon the mediacast content consumer replacement programming content selection criterion 215 (FIG. 2) communicated by each of the respective mediacast content consumers 114 to the broadcaster or Webcaster 102 (FIG. 1). The content consumer replacement programming content selection criterion 215 can include a value indicative at least one of: a song, a musical artist, a performing artist, a dramatic artist, a musical group, an album, a musical work, a theatric work, a film work, or a television work, comedy or sketch, etc. In some embodiments, the mediacast content consumer 114 can access only a limited repository of replacement programming content segments based upon a broadcaster or Webcaster supplied playlist that may be based upon pre-approved or pre-determined replacement programming content selected by the broadcaster or Webcaster, for example in keeping with a genre or artist consistent with the playlist or brand of the broadcaster or Webcaster.

A data structure may store replacement programming content segments in the form of a record with a variety of fields. The data structure may store a replacement programming content segment identifier that uniquely identifies a replacement programming content segment. The data structure may store replacement programming content segments. The replacement programming content segments may take a variety of forms, for example, audio files, video files, WebPages, banners, popup, or pop files. The replacement programming content segments may be formed in any of a large variety of formats, for example, AVI, DivX, MPEG, SVCD, VCD, WMV, XVCD, XSVCD, MP3 files, MP4 files, HTML files, XML, Flash®, AAC, .mov, H.264, MKV files, etc. In at least some embodiments the data structure can incorporate legal requirements regarding the transmission of replacement programming content segments in order to comply with national or international law, for example the Digital Millennium Copyright Act (DMCA) within the United States. The above examples of data structures and examples of specific types of information are intended to be illustrative and not limiting. In some instances, additional information may be employed and some of the illustrated information omitted. Also, different data structures may be employed and/or the information may be stored in different data structures or different ways. For example, a separate content provider specific data structure may be employed to store information related to respective content providers. Also for example, a separate advertiser data structure may be employed to store information related to respective advertisers.

Specific Examples of Operation

Figure 4A:
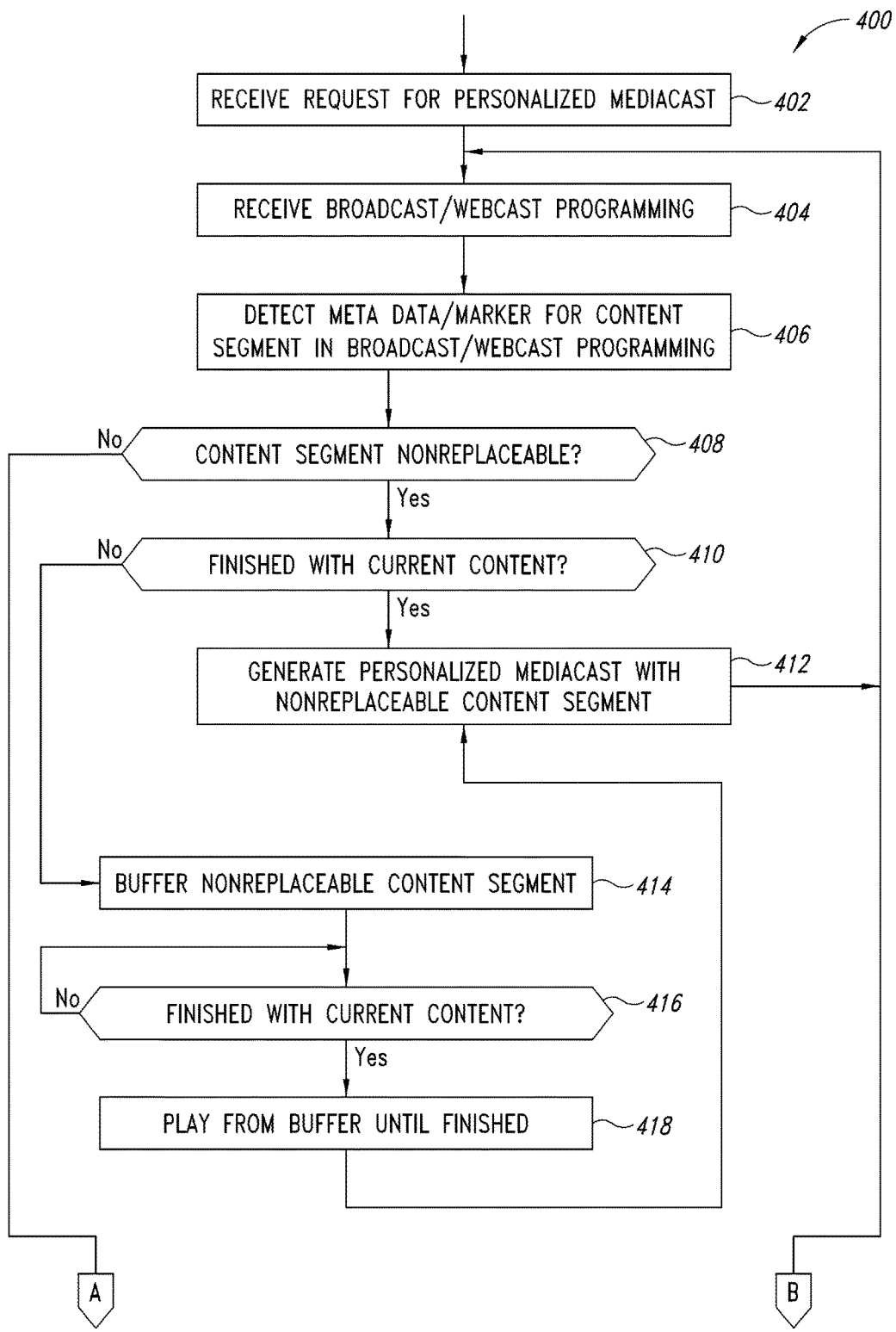
FIGS. 4A and 4B show a method of operating a personalized mediacast generation system to provide a plurality of personalized mediacasts to a respective plurality of mediacast content consumers in a networked environment, according to one illustrated embodiment.
Figure 4B:
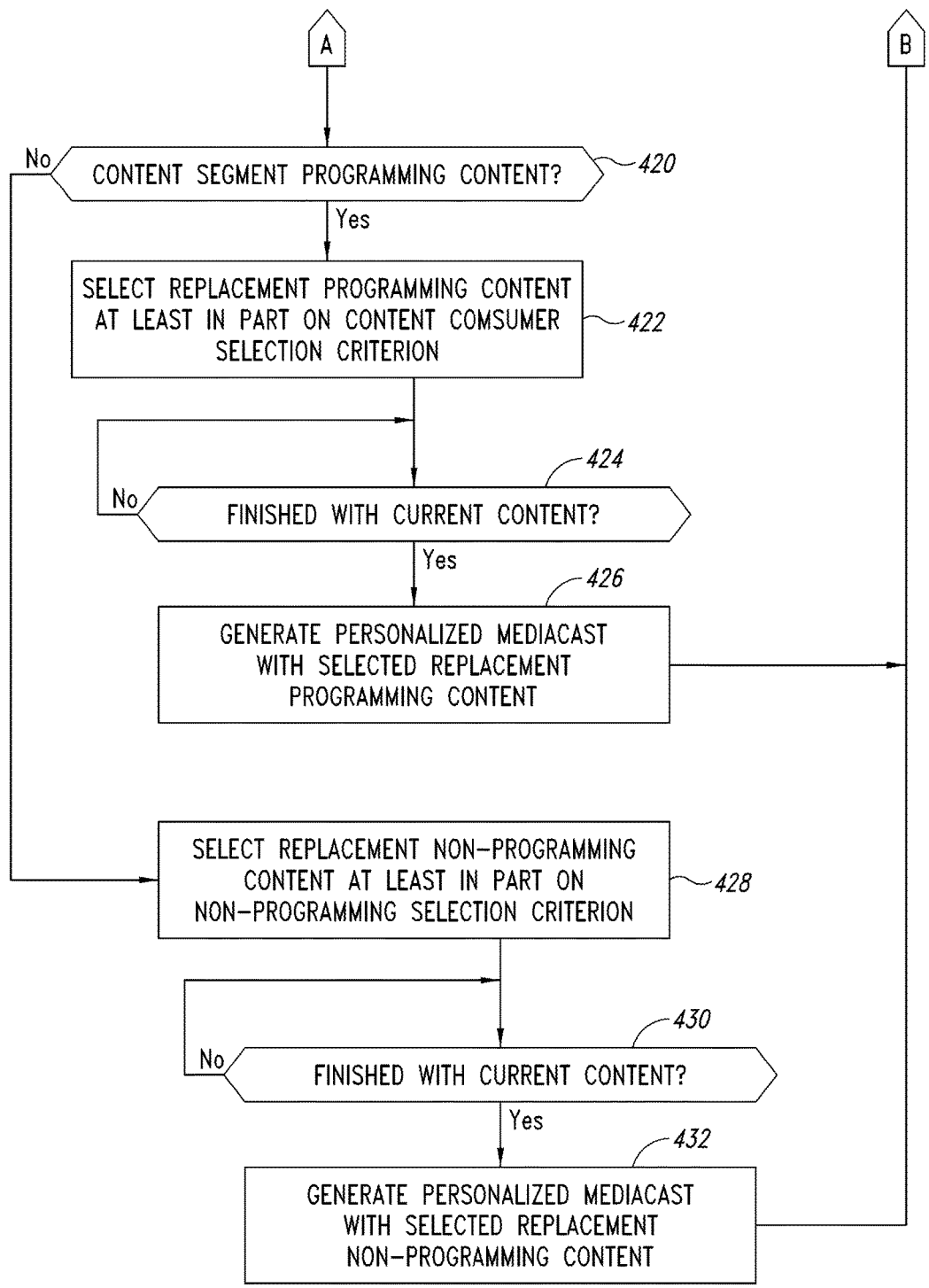

FIGS. 4A and 4B show a method 400 of operating one or more components of a personalized mediacast generation system to provide personalized mediacasts 118 (FIG. 1) to mediacast content consumers 114 in a networked environment 100, according to one illustrated embodiment.

At 402, a component receives a request for a personalized mediacast. The request may, for example be received directly or indirectly from a mediacast content consumer 114. Included with each of the plurality of mediacast content requests can be one or more content consumer selection criterion. The content consumer selection criterion includes one or more values indicative of replacement programming content desired by the mediacast content consumer 114. Such may include values of a type of programming content that interests the mediacast content consumer 114, for instance values indicative of a performer or artist, band, song, album, title, show, comedian, genre, etc.

Optionally, the content consumer selection criterion may include one or more values indicative of replacement non-programming content relevant to the mediacast content consumer 114. Such may, for example, include demographic values associated with the mediacast content consumer 114.

Broadcast or Webcast programming 112 (FIG. 1) typically includes a plurality of replaceable programming content segments, replaceable non-programming content segments, and non-replaceable programming content segments. For example, local or regional advertising content contained within the original broadcast or Webcast programming 112 may be identified as replaceable non-programming content while the primary subject matter, content or entertainment within the original broadcast or Webcast programming 112 may be identified as either replaceable or non-replaceable programming content segments. Such may be identified by metadata or a marker or other indicator associated with the respective content segment, for example embedded within the content segment itself or within the broadcast or Webcast programming 112 (FIG. 1).

At 404, the personalized mediacast generation system 116 (FIG. 1) receives the original broadcast or Webcast programming 112. The original broadcast or Webcast programming 112 typically includes sequential replaceable and non-replaceable programming and non-programming content segments, which may appear in any order. Metadata or a marker is typically associated with each content segment contained within the original broadcast or Webcast programming 112. The associated metadata or marker may identify a start and/or end of a content segment and/or a duration thereof. The associated metadata or maker may also specify whether a given content segment is replaceable or non-replaceable. The associated metadata or marker may also specify whether a given content segment is programming content (e.g., music) or non-programming content (e.g., advertisements). Thus, the metadata or maker may specify whether a given content segment is 1) replaceable programming content, 2) non-replaceable programming content, 3) replaceable non-programming content, or 4) non-replaceable non-programming content.

At 406, the personalized mediacast generation system 116 (FIG. 1) detects metadata or a marker indicative of a start of a content segment. Many techniques for detecting metadata or markers may be employed.

At 408, the personalized mediacast generation system 116 (FIG. 1) determines whether the content segment in the broadcast or Webcast programming 112 is Non-replaceable. In particular, the personalized mediacast generation system 116 may determine such from the metadata or marker associated with the respective content segment in the broadcast or Webcast 112. Non-replaceable content is typically content that is important to the broadcast. Such may, for example, include news, sports reports, host commentary, etc. Notably, this act or operation does not need to distinguish between programming content and non-programming content since the personalized mediacast generation system 116 may treat both in the same manner, so long as the content is considered Non-replaceable.

If the personalized mediacast generation system 116 determines that the content segment is Non-replaceable, then the personalized mediacast generation system 116 determines whether a current or most recent content has been processed or is finished at 410. As best illustrated in FIG. 3, the personalized mediacast generation system 116 may not have finished with previous content when a new content segment starts in a broadcast or Webcast 112. Thus, the personalized mediacast generation system 116 checks to determine that such is finished.

If the personalized mediacast generation system 116 determines whether that the current or most recent content has been processed or is finished, then the personalized mediacast generation system 116 (FIG. 1) generates a portion of the personalized mediacast with the content of the Non-replaceable content segment at 412. For example, the personalized mediacast generation system 116 may stream the non-replaceable content to the mediacast content consumer 114. Alternatively, the personalized mediacast generation system 116 may cause the non-replaceable content to be provided to the mediacast content consumer 114 indirectly, for example via caching such with a CDN 122. Further, the personalized mediacast generation system 116 may encode, or cause the encodation, of the non-replaceable content as fragments, and store or cause such to be stored, allowing retrieval according to a manifest which the personalized mediacast generation system 116 may also generate and supply to the mediacast consumer 114. In some implementations such may be accomplished by controlling a switch (e.g., audio, video) to selectively communicatively couple an output between two or more inputs or sources. The inputs may take the form of two or more communicative paths, for instance serial paths or parallel paths. The sources may include, a broadcast or Webcast feed, one or more repositories of replacement content, and/or the buffer. The repositories of replacement content may, for example, include one repository for new or replacement programming content, and another repository for new or replacement non-programming content. Control then returns to 404 to process further content segments.

If the personalized mediacast generation system 116 determines whether that the current or most recent content has been processed or is finished, then the personalized mediacast generation system 116 (FIG. 1) starts buffering the non-replaceable content at 414. This prevents non-replaceable content from the broadcast or Webcast from being lost while prior content is still being substituted, played, inserted or otherwise included in generating the personalized mediacast 118.

As discussed above, there are various techniques for buffering or otherwise not requiring the duration of replacement programming and non-programming content segments to equal the duration of replaceable programming and non-programming content segments replaced. Yet in some instances, it may be beneficial to at least approximate a match in duration. In other instances, it may be desirable to find a match be a lag or lead of the content in the personalized mediacast 118 (FIG. 1) relative to the original broadcast or Webcast programming 112 to reduce or minimize or even eliminate any asynchronicity existent between some or all of the personalized mediacasts 118 and the original broadcast or Webcast programming 112.

At 416, the personalized mediacast generation system 116 again determines whether the current or most recent content has been processed or is finished. If not, the determination at 416 is repeated until the current or most recent content has been processed or is finished. This implements a wait loop. The personalized mediacast generation system 116 may execute a wait act or operation as part of the wait loop, pausing between determinations to allow time for completion of the process. In the mean time the replacement content is being played, delivered or combined into the personalized mediacast.

If the personalized mediacast generation system 116 determines that the current or most recent content has been processed or is finished, then personalized mediacast generation system 116 starts transmitting or playing buffered content (i.e., unbuffering) from the buffer at 418.

The personalized mediacast generation system 116 uses the content from the buffer to generate the personalized mediacast at 412. Generation of the personalized mediacast is discussed above in reference to 412.

If the personalized mediacast generation system 116 determines at 408 that the content segment is replaceable, then the personalized mediacast generation system 116 determines whether the content segment is a programming content segment at 420. In particular, the personalized mediacast generation system 116 may determine such from the metadata or marker associated with the respective content segment in the broadcast or Webcast 112. Programming content is typically the primary or main subject of the broadcast. Such may, for example, include music, comedy sketches, talk segments, etc. Notably, this act or operation distinguishes between programming content and non-programming content since the personalized mediacast generation system 116 may treat each differently, for example selecting new or replacement content differently.

At 422, the personalized mediacast generation system 116 (FIG. 1) selects replacement programming content based at least in part on content consumer selection criterion associated the respective content consumer for whom the personalized mediacast 118 is being generated. The content consumer selection criterion may be selected by the mediacast content consumer themselves. For example, the mediacast content consumer may provide indications of programming content in which they are interested. Such can take a large variety of forms, for example an identity of a song, an artist or band or other performer (e.g., comedian, host), a show, a sketch or a video, In some implementations, rather than being supplied directly by the mediacast content consumer 114, the content consumer selection criterion may be discerned indirectly from various pieces of information logically associated with the specific mediacast content consumer. Such information may, for example, be representative of a particular device (e.g., computer, Smartphone, tablet, netbook, ultraportable, or similar electronic device associated with the mediacast content consumer 16) or individual. Various types of information (e.g., browsing history, purchasing or buying history, self reported, demographic, geographical) are discussed throughout this disclosure and will not be repeated here in the interest of brevity.

At 424, the personalized mediacast generation system 116 determines whether a current or most recent content has been processed or is finished. As best illustrated in FIG. 3, the personalized mediacast generation system 116 may not have finished with previous content when a new content segment starts in a broadcast or Webcast 112. Thus, the personalized mediacast generation system 116 checks to determine that such is finished.

If the personalized mediacast generation system 116 determines that the current or most recent content has not been processed or is finished at 424, then the determination at 424 is repeated until the current or most recent content has been processed or is finished. This implements a wait loop. The personalized mediacast generation system 116 may execute a wait act or operation as part of the wait loop, pausing between determinations to allow time for completion of the process.

If the personalized mediacast generation system 116 determines that the current or most recent content has been processed or is finished, then at 426 the personalized mediacast generation system 116 (FIG. 1) generates a portion of the personalized with the new or replacement programming content selected at 422. Various methods to implement such have been discussed, for instance in reference to 412 above, so will not be repeated here in the interest of brevity. In this case, a switch may selectively communicatively couple an output to a repository of new or replacement programming content. Control then returns to 404 to process further content segments.

If the personalized mediacast generation system 116 determines at 420 that the content segment is not programming content, then the personalized mediacast generation system 116 selects replacement non-programming content based at least in part on non-programming content selection criterion at 428.

The non-programming content selection criterion may be selected or supplied by one or more different entities. For example, the non-programming content selection criterion may be selected or supplied by advertisers, advertising agencies, advertising networks, Also for example, the non-programming content selection criterion may be selected or supplied by broadcasters, As a further example, the non-programming content selection criterion may be selected or supplied by the mediacast content consumer. For example, the mediacast content consumer may provide indications of non-programming content (e.g., advertisements) in which they are interested.

Various types of non-programming content selection criterion for targeting non-programming content (e.g., advertisements) to individual or groups of mediacast content consumers are discussed throughout this disclosure and will not be repeated here in the interest of brevity.

At 430, the personalized mediacast generation system 116 determines whether a current or most recent content has been processed or is finished. As best illustrated in FIG. 3, the personalized mediacast generation system 116 may not have finished with previous content when a new content segment starts in a broadcast or Webcast 112. Thus, the personalized mediacast generation system 116 checks to determine that such is finished.

If the personalized mediacast generation system 116 determines that the current or most recent content has not been processed or is finished at 430, then the determination at 430 is repeated until the current or most recent content has been processed or is finished. This implements a wait loop. The personalized mediacast generation system 116 may execute a wait act or operation as part of the wait loop, pausing between determinations to allow time for completion of the process.

If the personalized mediacast generation system 116 determines that the current or most recent content has been processed or is finished, then at 432 the personalized mediacast generation system 116 (FIG. 1) generates a portion of the personalized with the new or replacement non-programming content selected at 428. Various methods to implement such have been discussed, for instance in reference to 412 above, so will not be repeated here in the interest of brevity. In this case, a switch may selectively communicatively couple an output to a repository of new or replacement non-programming content. Control then returns to 404 to process further content segments.

While not illustrated in FIGS. 4A and 4B, the personalized mediacast generation system 116 may optionally dynamically generate, or cause to be generated, a respective manifest for each request for a personalized mediacast. The personalized mediacast generation system 116 may additionally or alternatively, optionally fragment or cause to be fragmented the content constituting the personalized mediacast. The personalized mediacast generation system 116 may additionally or alternatively, optionally cause the fragments to be cached, for example by one or more CDNs.

Uninterrupted Lead-In Segments

In some implementations, a broadcaster or Webcaster may provide a media content consumer with a stream having a defined composition for a defined period of time when the media content consumer begins receiving the broadcast or Webcast 112. For example, a broadcaster may commit to delivering at least 10 minutes of programming content (e.g., news, talk, music, or other media content) when the mediacast content consumer 114 initially connects or begins receiving the broadcast or Webcast. This programming content may, or may not, be skippable or replaceable.

Orchestrating the delivery of personalized mediacasts to any number of mediacast content consumers 114 may require the generation of numerous personalized mediacasts 118 each with respective buffering. For example, any number of media content consumers may join the broadcast or Webcast programming 112 at any point in time (e.g., at the beginning or during a programming content segment or a non-programming content segment). In such instances, to accommodate the provision of a particular type of media content for a defined duration, the broadcaster or Webcaster will likely buffer at least a portion of the broadcast or Webcast for subsequent playback to the media content consumer.

Figure 5:
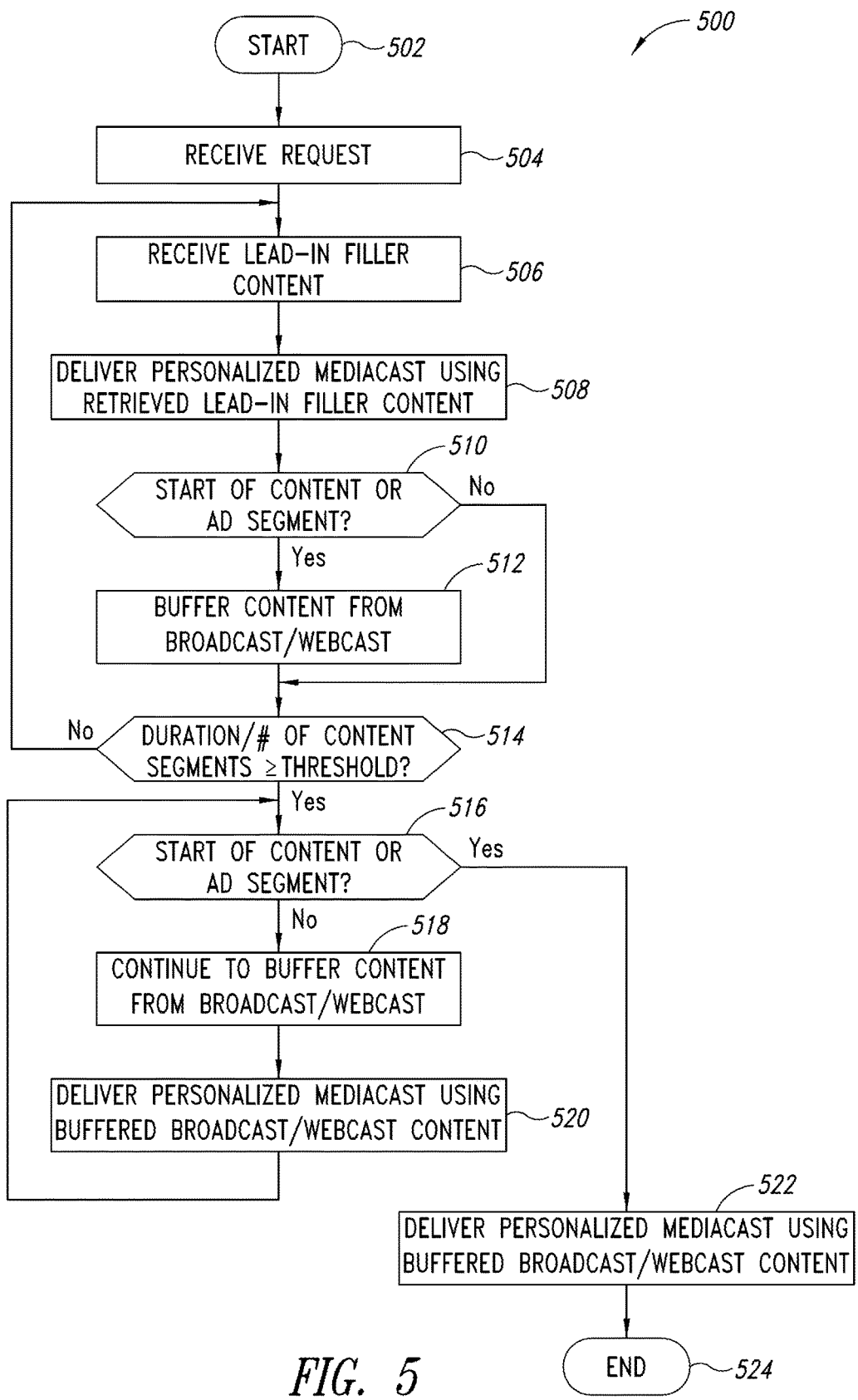
FIG. 5 is a high-level flow diagram of a method of providing a personalized mediacast having an uninterrupted lead-in segment, according to one non-limiting illustrated embodiment.

FIG. 5 provides a method 500 for a broadcaster or Webcaster to deliver an uninterrupted lead-in content block to respective mediacast content consumers 114 via personalized mediacast generation system 200. A media content consumer 114 can indicate a desire to receive broadcast or Webcast programming 112, for example by directing a Web browser to a particular Uniform Resource Locator ("URL") address. In at least some instances, the broadcaster or Webcaster can provide each media content consumer 114 with a personalized mediacast that commences with an uninterrupted content block of lead-in content. The uninterrupted block of lead-in content may for example, be for a defined time interval, or for a defined number of content segments (e.g., 5 songs). For example, upon tuning to an "Oldies" Webcast, the media content consumer 114 may receive 10 minutes of lead-in content (e.g., uninterrupted music content from the 50's, 60's and 70's) prior to receiving the broadcast or Webcast programming 112 containing a variety of programming and non-programming content segments. In another example, upon tuning to the "Oldies" Webcast, the media content consumer 114 may receive lead-in content for a variable time period (e.g., for a time period equal to 5 uninterrupted songs from the 50's, 60's, and 70's) prior to receiving the broadcast or Webcast programming 112 containing a variety of programming and non-programming content segments. The broadcaster or Webcaster 102 may define or otherwise select the uninterrupted period or uninterrupted number of content segments. Alternatively, the uninterrupted period or uninterrupted number may be randomly generated or even selected by the mediacast content consumer 114.

The term "lead-in content" is not intended to be limiting, and is used to refer to content selected to be initially provided to the mediacast content consumer 114 on joining, in lieu of the original, "live," or real-time broadcast or Webcast programming content 112. The lead-in content is typically selected from a library of programming content consistent with the format (e.g., alternative rock, country, news, talk radio, classical, comedy, situation comedy, music video, drama, sports) of the broadcaster (e.g., radio and/or television) or Webcaster 102. The lead-in content may include programming content from previous broadcasts or Webcasts. In some instances, lead-in content or lead-in programming content may be referred to as filler contents, since such lead-in content may be considered as filling in a portion of the broadcast which the system may be delaying.

The broadcaster or Webcaster 102 can buffer all or a portion of the original, "live," or real-time programming content that occurs contemporaneous with the delivery of the uninterrupted block of lead-in content. Upon completion of the delivery of the lead-in content, the personalized mediacast generation system 200 can transition to the broadcast or Webcast programming commencing with the start of a content segment contained in the buffered broadcast or Webcast programming content. Alternatively, should the delivery of the lead-in content conclude coincident with the start of a content segment in the original, "live," or real-time broadcast or Webcast programming, the personalized mediacast generation system 200 can transition to the original, "live," or real-time broadcast or Webcast programming commencing with the start of the content segment. The method 500 of delivering a defined lead-in segment to a broadcast or Webcast commences at 502.

At 504, the personalized mediacast generation system 200 receives a request from a media content consumer 114 to commence a personalized mediacast 118. Such a request may take the form of a user selecting a START icon or the equivalent on a Web page or on an application executed by a portable computing device such as a wearable computer (e.g., Google® Glass®) or executed by a smartphone.

At 506, upon receipt of the request from the media content consumer 114, the personalized mediacast generation system 200 retrieves lead-in content for delivery to the media content consumer 114. In some instances, the retrieved lead-in content may include at least a portion of a previously recorded program (e.g., a radio host "talk" segment when the media content consumer selects the delivery of talk radio). In some instances, the retrieved lead-in content may include media selected from the broadcaster or Webcaster's play list or media library (e.g., a selection of jazz music when the media content consumer selects the delivery of a jazz Webcast), consistent with the format or genre of the broadcaster or Webcaster.

In some instances, the broadcaster or Webcaster can determine the quantity of uninterrupted lead-in content provided to the mediacast content consumer 114. In such instances, the broadcaster or Webcaster may define a time period (e.g., 10 minutes) during which the personalized mediacast generation system 200 provides uninterrupted lead-in content to the mediacast content consumer 114. In such instances, the broadcaster or Webcaster may define a number of uninterrupted lead-in content segments (e.g., 5 content segments) provided by the personalized mediacast generation system 200. In some instances, the broadcaster or Webcaster may select at least a portion of the programming content segments and/or at least a portion of the non-programming content segments provided to the mediacast content consumer 114 during the lead-in period.

At 508, the personalized mediacast generation system 200 delivers the lead-in content to the media content consumer remote device. Such delivery may occur via one or more tethered connections, for example via an Ethernet connection to a desktop computer directed to a mediacast provider URL. Such delivery may occur via one or more wireless connections, for example via a $4^{th}$ generation global system for mobile communications ("GSM") cellular connection.

At 510, contemporaneous with delivery of the lead-in content to the mediacast content consumer 114, the personalized mediacast generation system 200 monitors the original, "live," or real-time broadcast or Webcast programming 112 to detect the start of a programming content segment or the start of a non-programming content segment. In some implementations, metadata or other similar digital markers may designate the start of a content segment in the broadcast or Webcast programming 112. If the personalized mediacast generation system 200 fails to detect the start of a programming content segment or the start of a non-programming content segment, the personalized mediacast generation system 200 determines whether the lead-in content duration and/or the quantity of lead-in content has exceeded a defined threshold at 514.

At 512, the personalized mediacast generation system 200 buffers the original, "live," or real-time broadcast or Webcast programming provided by the broadcaster or Webcaster. Such buffering commences at the start of a content segment in the original, "live," or real-time broadcast or Webcast programming content 112 during the delivery of the lead-in content to the mediacast content consumer 114. In some instances, such buffering continues (e.g., at 518) until the personalized mediacast 118 transitions to the original, "live," or real-time broadcast or Webcast programming content 112 provided by the broadcaster or Webcaster. This allows eventual playback or delivery of the broadcast or Webcast 112 to the respective mediacast content consumer 114 subsequent to the delivery of the uninterrupted block of lead-in content. In some implementations, the personalized mediacast generation system 200 can store the buffered content in one or more buffers 206. Notably, the personalized mediacast generation system 200 may detect an end of a previous content segment that is itself an indication of a start of a subsequent content segment.

In some instances, no content segment start indicators may occur in the original, "live," or real-time broadcast or Webcast programming during the delivery of the uninterrupted lead-in content segment to the mediacast content consumer 114. In such instances, the uninterrupted block of lead-in content continues until a content segment start indicator is detected in the original, "live," or real-time broadcast or Webcast programming.

In at least some instances, the broadcaster or Webcaster 102 selects the amount of the original, "live," or real-time broadcast or Webcast programming content 112 buffered at 512. For example, if the defined uninterrupted lead-in period is set for 10 minutes, the broadcaster or Webcaster may elect to begin buffering the broadcast or Webcast programming content 112 at the start of the first full content segment that occurs after commencing delivery of the uninterrupted lead-in content to the mediacast content consumer 114. For example, the start of a content segment in the original broadcast/webcast, like the beginning of a song, beginning of an ad break, or beginning of a talk segment may occur 30 seconds after commencing delivery of 10 minutes of uninterrupted lead-in content to a mediacast content consumer 114. In such an instance, the personalized mediacast generation system 200 would buffer or cache as content "blocks" 9 minutes and 30 seconds of the original, "live," or real-time broadcast or Webcast programming. In another example, the broadcaster or Webcaster may elect to begin buffering broadcast or Webcast programming content 112 at the start of the first full content segment that occurs at a defined time (e.g., 5 minutes) after commencing delivery of the uninterrupted lead-in content to the mediacast content consumer 114. In such an instance, if the start of a content segment is detected at 5 minutes and 30 seconds after commencing delivery of the lead-in content to the mediacast content consumer 114, the personalized mediacast generation system 200 would buffer 4 minutes and 30 seconds of the original, "live," or real-time broadcast or Webcast programming.

At 514, the personalized mediacast generation system 200 determines whether the lead-in content has exceeded a defined threshold. For example the personalized mediacast generation system 200 may determine whether a time interval (e.g., lead-in content provided to media content consumer has exceeded 10 minutes) or a defined number of lead-in content segments (e.g., five programming media content segments, each containing a single song) have been provided to the media content consumer 114. In at least some instances, the lead-in content segments may not exactly fill a defined time interval. For example, three lead-in content segments, each corresponding to a respective single song, may require a total of 10 minutes and 18 seconds to complete. In such an instance, the personalized mediacast generation system 200 permits the three lead-in content segments to complete. If the personalized mediacast generation system 200 determines the lead-in content has not exceeded a defined time interval and/or a defined number of lead-in content segments at 514, the personalized mediacast generation system 200 continues to retrieve additional lead-in content at 506 and deliver the lead-in content at 508.

If at 514, the personalized mediacast generation system 200 determines the lead-in content has exceeded a defined time interval and/or a defined number of lead-in content segments, the personalized mediacast generation system 200 determines whether the original and/or "live" broadcast or Webcast programming 112 is at the start of a programming content segment or the start of a non-programming content segment at 516.

If, at 516, it is determined that the original and/or "live" broadcast or Webcast programming 112 is not at the start of a programming or non-programming content segment, the personalized mediacast generation system 200 at 518 continues to buffer the original and/or "live" broadcast or Webcast programming 112 commenced at 512.

At 520, the personalized mediacast generation system 200 commences delivery of buffered content to the media content consumer 114. In at least some instances, the personalized mediacast generation system 200 delivers the previously buffered broadcast or Webcast programming 112. In some instances, the personalized mediacast generation system 200 continues to deliver the buffered broadcast or Webcast programming 112. In at least some implementations, the delivery of cached or buffered content is continued until the personalized mediacast 118 attains an at least approximate temporal synchronization with the original, "live," or real-time broadcast or Webcast programming content 112.

In some instances, the broadcaster or Webcaster 102 can determine the starting point in the buffered original, "live," or real-time broadcast or Webcast programming content 112 used to provide the personalized mediacast 118 at the conclusion of delivery of the uninterrupted lead-in content at 514. For example, the uninterrupted lead-in content may include ten minutes of programming content such as music, news, or talk radio, and hence be denominated as lead-in programming content. Traditionally, such programming content contributes little, if any, operating profit to the broadcaster or Webcaster 102. Consequently, the broadcaster or Webcaster 102 may desire to provide non-programming content such as revenue generating advertising at the conclusion of the uninterrupted lead-in content. In such instances, the broadcaster or Webcaster may elect to transition from the lead-in content to the start of non-programming content segments buffered with the original, "live," or real-time broadcast or Webcast programming content 112 while providing the lead-in content. Although revenue generation is used as an example criteria for selecting the transition point from the lead-in content, other criteria may be specified by the broadcaster or Webcaster 112 (e.g., transition from the lead-in content to a non-programming "station identification" content segment).

In other instances, the mediacast content consumer 118 can determine the starting point in the buffered the original, "live," or real-time broadcast or Webcast programming content 112 used to provide the personalized mediacast 118 at the conclusion of delivery of the uninterrupted lead-in content at 514. For example, in some instances, the mediacast content consumer may elect to transition at the start of a programming or non-programming content segment selected close to the beginning of the buffered portion. Such a selection reduces the portion of the original, "live," or real-time broadcast or Webcast programming content 112 missed during the uninterrupted lead-in content, but potentially increases the time required to transition to the non-buffered original, "live," or real-time broadcast or Webcast programming content 112. Alternatively, the mediacast content consumer may elect to transition at the start of a programming or non-programming content segment selected close to the conclusion of the buffered portion. Such a selection increases the portion of the original, "live," or real-time broadcast or Webcast programming content 112 missed during the uninterrupted lead-in content, but potentially reduces the time required to transition to the non-buffered original, "live," or real-time broadcast or Webcast programming content 112.

If it is determined that the exit from the uninterrupted lead-in content coincides with the start of a programming content segment or the start of a non-programming content segment at 516, the personalized mediacast generation system 200 can essentially allow the mediacast content consumer 114 to rejoin the "in-progress" broadcast or Webcast 112 since no appreciable gap exists between the conclusion of the uninterrupted lead-in content and the original, "live," or real-time broadcast or Webcast programming content 112. In such instances, the original, "live," or real-time broadcast or Webcast programming content 112 buffered at 512 does not form a portion of the personalized mediacast 118 and may be deleted.

At 522, responsive to detecting the exit from the uninterrupted lead-in content coincides with the start of a programming content segment or the start of a non-programming content segment at 516, the personalized mediacast generation system 200 can transition the personalized mediacast 118 to the original, "live," or real-time broadcast or Webcast programming content 112. Thus, the personalized mediacast generation system 200 can generate the personalized mediacast 118 by delivering real time, or near-real time broadcast or Webcast programming content 112 to the mediacast content consumer 114. The method 500 of providing uninterrupted lead-in content to a mediacast content consumer 114 concludes at 524.

Figure 6:
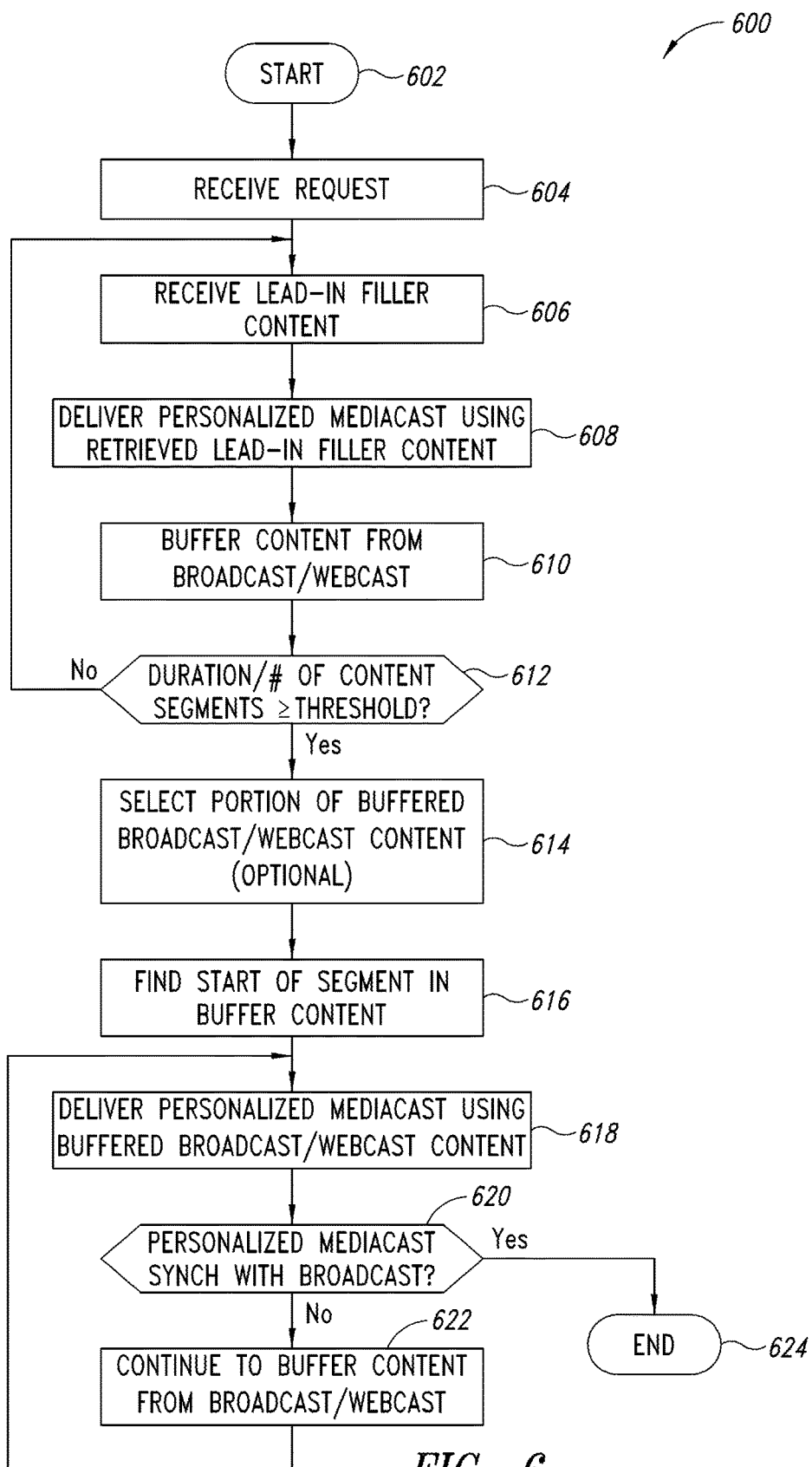
FIG. 6 is a high-level flow diagram of another method of providing a personalized mediacast having an uninterrupted lead-in segment, according to one non-limiting illustrated embodiment.

FIG. 6 shows another method 600 for a broadcaster or Webcaster to deliver an uninterrupted lead-in content segment or block to each of any number of media content consumers via personalized mediacast generation system 200. A media content consumer 114 can indicate a desire to receive broadcast or Webcast programming 112, for example by directing a Web browser to a particular Uniform Resource Locator ("URL") address. In at least some instances, the broadcaster or Webcaster 112 can provide each media content consumer 114 with a personalized mediacast that commences with an uninterrupted block of lead-in content. The uninterrupted block of lead-in content may for example, be for a defined time interval, or for a defined number of content segments (e.g., 5 songs). For example, upon tuning to an "Oldies" Webcast, the media content consumer 114 may receive 10 minutes of lead-in content (e.g., uninterrupted music content from the 50's, 60's and 70's) prior to receiving the broadcast or Webcast programming 112 containing a variety of programming and non-programming content segments. In another example, upon tuning to the "Oldies" Webcast, the media content consumer 114 may receive lead-in content for a variable time period (e.g., for a time period equal to 5 uninterrupted songs from the 50's, 60's, and 70's) prior to receiving the broadcast or Webcast programming 112 containing a variety of programming and non-programming content segments. The broadcaster or Webcaster 102 may define or otherwise select the uninterrupted period or uninterrupted number of content segments. Alternatively, the uninterrupted period or uninterrupted number may be randomly generated or even selected by the mediacast content consumer 114.

The broadcaster or Webcaster 102 can buffer all or a portion of the original, "live," or real-time programming content that occurs contemporaneous with the delivery of the uninterrupted block of lead-in content. Upon completion of the delivery of the lead-in content, the personalized mediacast generation system 200 can transition to the broadcast or Webcast programming commencing with the start of a content segment contained in the buffered broadcast or Webcast programming content. Alternatively, should the delivery of the lead-in content conclude coincident with the start of a content segment in the original, "live," or real-time broadcast or Webcast programming, the personalized mediacast generation system 200 can transition to the original, "live," or real-time broadcast or Webcast programming commencing with the start of the content segment. The method 600 of delivering a defined lead-in segment to a broadcast or Webcast commences at 602.

At 604, the personalized mediacast generation system 200 receives a request from a media content consumer 114 to commence a personalized mediacast 118. Such a request may take the form of a user selecting a START icon or the equivalent on a Web page or on an application executed by a portable computing device such as a wearable computer (e.g., Google® Glass®) or executed by a smartphone.

At 606, upon receipt of the request from the media content consumer 114, the personalized mediacast generation system 200 retrieves lead-in content for delivery to the media content consumer 114. In some instances, the retrieved lead-in content may include at least a portion of a previously recorded program (e.g., a radio host "talk" segment when the media content consumer selects the delivery of talk radio). In some instances, the retrieved lead-in content may include media selected from the broadcaster or Webcaster's play list or media library (e.g., a selection of jazz music when the media content consumer selects the delivery of a jazz Webcast), consistent with the format or genre of the broadcaster or Webcaster.

In some instances, the broadcaster or Webcaster can determine the quantity of uninterrupted lead-in content provided to the mediacast content consumer 114. In such instances, the broadcaster or Webcaster may define an interval (e.g., 10 minutes) during which the personalized mediacast generation system 200 provides uninterrupted lead-in content to the mediacast content consumer 114. In such instances, the broadcaster or Webcaster may define a number of uninterrupted lead-in content segments (e.g., 5 content segments) provided by the personalized mediacast generation system 200. In some instances, the broadcaster or Webcaster may select at least a portion of the programming content segments and/or at least a portion of the non-programming content segments provided to the mediacast content consumer 114 during the lead-in period.

At 608, the personalized mediacast generation system 200 delivers the lead-in content to the media content consumer remote device. Such delivery may occur via one or more tethered connections, for example via an Ethernet connection to a desktop computer directed to a mediacast provider URL. Such delivery may occur via one or more wireless connections, for example via a $4^{th}$ generation global system for mobile communications ("GSM") cellular connection.

At 610, the personalized mediacast generation system 200 buffers the original, "live," or real-time broadcast or Webcast programming provided by the broadcaster or Webcaster. Such buffering commences at a point in the original, "live," or real-time broadcast or Webcast programming 112 contemporaneous with the delivery of the lead-in content to the mediacast content consumer 114. Such buffering of the broadcast or Webcast programming 112 can begin at any point of a programming content segment or a non-programming content segment (i.e., the buffering of the broadcast or Webcast programming 112 during the lead-in segment does not have to coincide with the start of a programming content segment or a non-programming content segment). In some instances, such buffering continues (e.g., at 518) until the personalized mediacast 118 transitions to the original, "live," or real-time broadcast or Webcast programming content 112 provided by the broadcaster or Webcaster. This allows eventual playback or delivery of the broadcast or Webcast 112 to the respective mediacast content consumer 114 subsequent to the delivery of the uninterrupted block of lead-in content. In some implementations, the personalized mediacast generation system 200 can store the buffered content in one or more buffers 206.

In at least some instances, the broadcaster or Webcaster 102 selects the amount of the original, "live," or real-time broadcast or Webcast programming content 112 buffered at 610. For example, if the defined uninterrupted lead-in period is set for 10 minutes, the broadcaster or Webcaster may elect to begin buffering the broadcast or Webcast programming content 112 immediately upon commencing delivery of the uninterrupted lead-in content to the mediacast content consumer 114. In such an instance, the personalized mediacast generation system 200 would buffer an amount of the original, "live," or real-time broadcast or Webcast programming equivalent in duration to the duration of the uninterrupted, lead-in segment. In another example, the broadcaster or Webcaster may elect to begin buffering broadcast or Webcast programming content 112 at the start at a defined time (e.g., 5 minutes) after commencing delivery of the uninterrupted lead-in content to the mediacast content consumer 114. In such an instance, the personalized mediacast generation system 200 would begin buffering the original, "live," or real-time broadcast or Webcast programming 112 five minutes after commencing the delivery of the uninterrupted, lead-in content.

At 612, the personalized mediacast generation system 200 determines whether the lead-in content has exceeded a defined threshold. For example the personalized mediacast generation system 200 may determine whether a time interval (e.g., lead-in content provided to media content consumer has exceeded 10 minutes) or a defined number of lead-in content segments (e.g., five programming media content segments, each containing a single song) have been provided to the media content consumer 114. In at least some instances, the lead-in content segments may not exactly fill a defined time interval. For example, three lead-in content segments, each corresponding to a respective single song, may require a total of 10 minutes and 18 seconds to complete. In such an instance, the personalized mediacast generation system 200 permits the three lead-in content segments to complete. If the personalized mediacast generation system 200 determines the lead-in content has not exceeded a defined time interval and/or a defined number of lead-in content segments at 612, the personalized mediacast generation system 200 continues to retrieve additional lead-in content at 606 and deliver the lead-in content to the mediacast content consumer 118 at 608.

If at 612, the personalized mediacast generation system 200 determines the lead-in content has exceeded a defined time interval and/or a defined number of lead-in content segments, the personalized mediacast generation system 200 optionally selects a portion of the buffered original, "live," or real-time broadcast or Webcast programming 112 at 614.

At 614, the personalized mediacast generation system 200 may optionally select a portion of the broadcast or Webcast programming 112 buffered at 610 for commencing delivery of the buffered broadcast or Webcast programming 112 content to the mediacast content consumer 114. In some instances, the broadcaster or Webcaster 102 can determine the starting point in the buffered the original, "live," or real-time broadcast or Webcast programming content 112 used to provide the personalized mediacast 118 at the conclusion of delivery of the uninterrupted lead-in content at 612. For example, the uninterrupted lead-in content may include ten minutes of programming content such as music, news, or talk radio. Traditionally, such programming content contributes little, if any, operating profit to the broadcaster or Webcaster 102. Consequently, the broadcaster or Webcaster 102 may desire to provide non-programming content such as revenue generating advertising at the conclusion of the uninterrupted lead-in content. In such instances, the broadcaster or Webcaster may elect to transition from the lead-in content to the start of non-programming content segments buffered with the original, "live," or real-time broadcast or Webcast programming content 112 while providing the lead-in content. Although revenue generation is used as an example criteria for selecting the transition point from the lead-in content, other criteria may be specified by the broadcaster or Webcaster 112 (e.g., transition from the lead-in content to a non-programming "station identification" content segment). In some instances, the broadcaster or Webcaster 102 may select to transition to the original, "live," or real-time broadcast or Webcast programming content 112 based on the placement of a particular programming content segment or non-programming content segment in the buffered original, "live," or real-time broadcast or Webcast programming content 112. For example, the broadcaster or Webcaster 102 may select to transition "at the start of the first non-programming content segment" in the buffered original, "live," or real-time broadcast or Webcast programming content 112. In another example, the broadcaster or Webcaster may select to transition "at the start of the last non-programming content segment" in the buffered original, "live," or real-time broadcast or Webcast programming content 112.

In other instances, the mediacast content consumer 118 can determine the starting point in the buffered the original, "live," or real-time broadcast or Webcast programming content 112 used to provide the personalized mediacast 118 at the conclusion of delivery of the uninterrupted lead-in content at 612. For example, in some instances, the mediacast content consumer may elect to transition at the start of a programming or non-programming content segment selected close to the beginning of the buffered portion. Such a selection reduces the portion of the original, "live," or real-time broadcast or Webcast programming content 112 missed during the uninterrupted lead-in content, but potentially increases the time required to transition to the non-buffered original, "live," or real-time broadcast or Webcast programming content 112. Alternatively, the mediacast content consumer may elect to transition at the start of a programming or non-programming content segment selected close to the conclusion of the buffered portion. Such a selection increases the portion of the original, "live," or real-time broadcast or Webcast programming content 112 missed during the uninterrupted lead-in content, but potentially reduces the time required to transition to the non-buffered original, "live," or real-time broadcast or Webcast programming content 112.

At 616, the personalized mediacast generation system 200 locates the start of a content segment in the buffered broadcast or Webcast programming 112 content to transition the personalized mediacast 118 from the uninterrupted lead-in content to the buffered original, "live," or real-time broadcast or Webcast programming content 112. In some instances, the personalized mediacast generation system 200 selects the start of the first complete broadcast or Webcast programming 112 content segment buffered at 610. Alternatively, the personalized mediacast generation system 200 selects the start of the broadcast or Webcast programming 112 content segment optionally selected at 614.

At 618, the personalized mediacast generation system 200 commences delivery of buffered content to the media content consumer 114. In at least some instances, the personalized mediacast generation system 200 delivers the previously buffered broadcast or Webcast programming 112.

At 620, the personalized mediacast generation system 200 determines whether the buffered broadcast or Webcast programming 112 content has synchronized with the original, "live," or real-time broadcast or Webcast programming content 112.

At 622, if the personalized mediacast generation system 200 determines that the personalized mediacast is not synchronized with the original, "live," or real-time broadcast or Webcast programming content 112, the personalized mediacast generation system 200 continues to generate the personalized mediacast using content buffered at 610. Such buffering and subsequent playback of the original, "live," or real-time broadcast or Webcast programming content 112 will occur until the personalized mediacast 118 synchronizes with the original, "live," or real-time broadcast or Webcast programming content 112 at which time the personalized mediacast generation system 200 transitions the personalized mediacast to the original, "live," or real-time broadcast or Webcast programming content 112. The method 600 of providing uninterrupted lead-in content to a mediacast content consumer 114 using a personalized mediacast generation system 200 concludes at 624.

Figure 7:
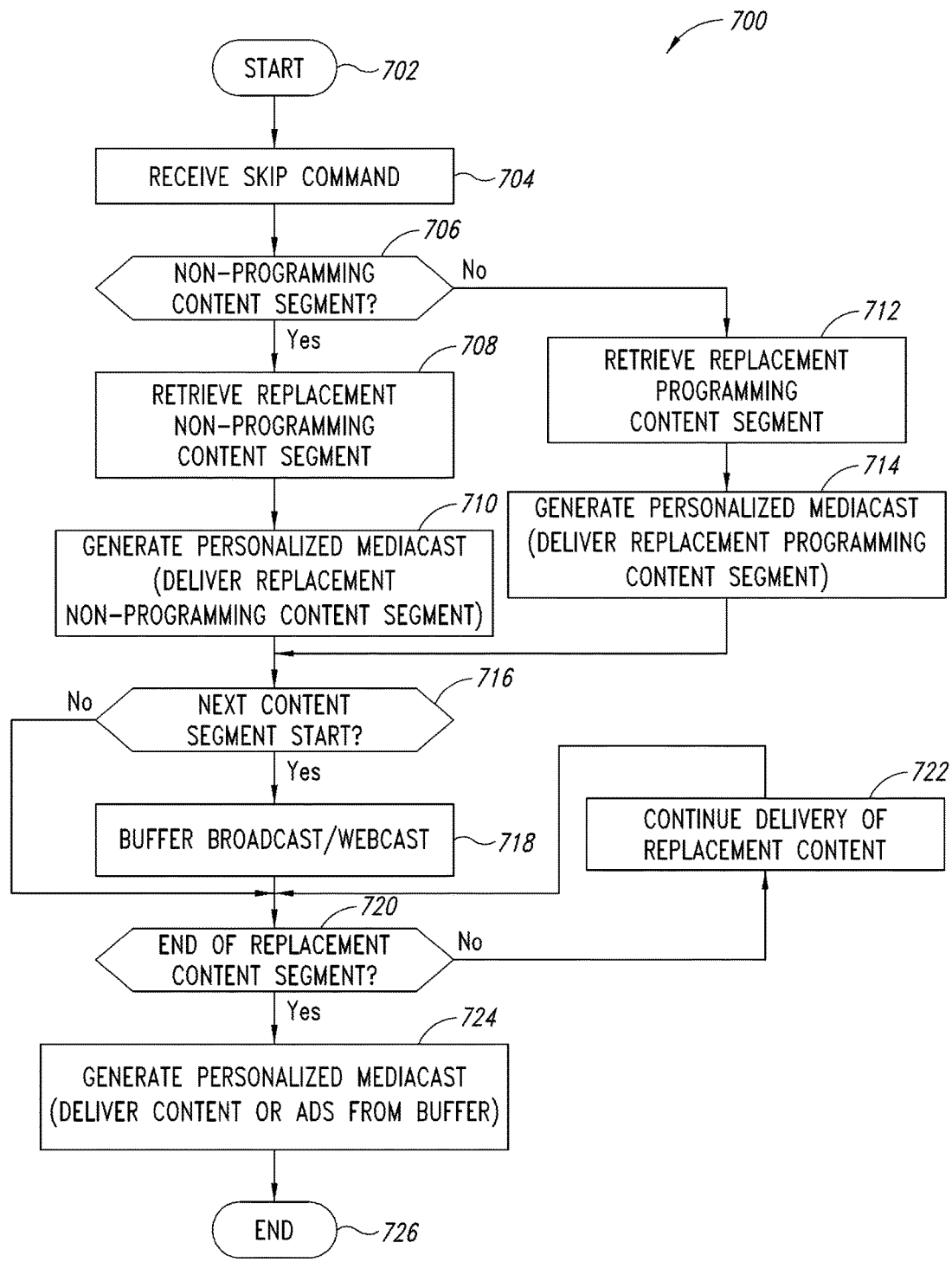
FIG. 7 is a high-level flow diagram of a method of providing a personalized mediacast where at least a portion of the broadcast advertising segments are replaced with replacement advertising segments, according to one non-limiting illustrated embodiment.

FIG. 7 shows another method 700 for delivering alternative broadcast or Webcast content to a user of the personalized mediacast generation system 200. As discussed in detail above, a broadcast or Webcast can be categorized into programming content segments and non-programming content segments. Each of the programming content segments and non-programming content segments can be further optionally categorized into replaceable content segments (i.e., replaceable programming content segments and replaceable non-programming content segments) and non-replaceable content segments (i.e., non-replaceable programming content segments and non-replaceable non-programming content segments).

The personalized mediacast generation system 200 may, in some instances, provide the mediacast content consumer 114 with the ability to "skip" one or more replaceable content segments. Where a replaceable content segment is skipped, the personalized mediacast generation system 200 can select a replacement content segment for inclusion in the personalized mediacast 118. At times, such replacement content segments may have a greater duration than the replaceable content segments they replace. In such instances, the personalized mediacast generation system 200 can buffer the personalized mediacast 118 to provide a seamless experience for the mediacast content consumer 114.

The replacement content segments provided by the personalized mediacast generation system 200 can include programming content segments selected based at least in part on one or more express or inferred preferences of the mediacast consumer 118. For example, replacement programming content segments may be selected by the personalized mediacast generation system 200 based on a preferred genre or type of entertainment selected by the mediacast content consumer 114.

The replacement content segments provided by the personalized mediacast generation system 200 can include non-programming content segments selected based at least in part on one or more express or inferred preferences of the mediacast consumer 118. For example, a mediacast content consumer 114 interested in automobiles may prefer to receive non-programming content segments directed to products and services related to automobiles. In some instances, the replacement content segments provided by the personalized mediacast generation system 200 can include non-programming content segments selected based at least in part on one or more third party (e.g., advertiser, advertising agency) preferences. For example, an advertiser or advertising agency targeting a demographic or market demonstrating an interest in receiving automotive related non-programming content segments may direct such content to mediacast content consumers 114 identified as included in the demographic or market. The method of providing such replacement content in lieu of replaceable or "skippable" content segments commences at 702.

At 704, the personalized mediacast generation system 200 receives data indicative of an instruction to replace or skip one or more replaceable content segments. In some instances, the instruction may originate with the mediacast content consumer 114 who desires to receive alternative programming content or to receive local or regional advertising relevant to the location and/or interests of the consumer. In some instances, the instruction may originate with the broadcaster or Webcaster providing the broadcast or Webcast programming 112. In some instances, the instruction may originate with a third party such as an advertiser or advertising broker. Such an instruction may be received in the form of a user-selectable icon appearing on a mediacast content consumer display device, on a broadcaster display device, or on a Webcaster display device.

Providing a mediacast content consumer 114 with the ability to skip programming content may be discretionary. For example, a broadcaster or Webcaster 102 may provide a mediacast content consumer 114 with the ability to skip and/or replace replaceable programming content segments but not to skip and/or replace some or all replaceable non-programming content segments. Additionally, mediacast content consumer 114 with the ability to replace skipped programming content with replacement programming content may also be discretionary. For example, a broadcaster or Webcaster 102 may provide a mediacast content consumer 114 with the ability to skip some or all replaceable non-programming (i.e., advertising) content segments, however the broadcaster or Webcaster may require the mediacast content consumer 114 to replace such segments with a replacement non-programming (i.e., advertising) content segment.

At 706, the personalized mediacast generation system 200 determines whether the personalized mediacast 118 delivered to a mediacast content consumer 114 has reached a non-programming content segment such as an advertisement. The personalized mediacast generation system 200 can determine the type of content segment using metadata or similar data that is associated with the particular content segment.

At 708, responsive to determining the personalized mediacast 118 delivered to a mediacast content consumer 114 has reached a non-programming content segment, the personalized mediacast generation system 200 retrieves a number of replacement non-programming content segments. In some instances, the personalized mediacast generation system 200 selects the replacement non-programming content segments based on one or more criteria such as the geographic location of the mediacast content consumer 114, the express or inferred interests of the mediacast content consumer 114, or one or more other similar selection criteria.

At 710, the personalized mediacast generation system 200 inserts the replacement non-programming content retrieved at 708 into a personalized mediacast 118 for delivery to the mediacast content consumer 114.

At 712, responsive to determining the personalized mediacast 118 delivered to a mediacast content consumer 114 has not reached a non-programming content segment at 706, the personalized mediacast generation system 200 retrieves a number of replacement programming content segments. In some instances, the personalized mediacast generation system 200 selects the replacement programming content segments based on one or more criteria such as an express or inferred selection criteria provided by the mediacast content consumer 114.

At 714, the personalized mediacast generation system 200 inserts the replacement programming content retrieved at 712 into a personalized mediacast 118 for delivery to a mediacast content consumer 114.

The personalized mediacast 118 can include replacement content including programming content, non-programming content, or both, until a non-replaceable segment occurs in the original, "live," or real-time broadcast or Webcast programming content 112. When the start of a non-replaceable segment is reached in the original, "live," or real-time broadcast or Webcast programming content 112, the personalized mediacast 118 may not yet have reached the end of a replacement programming or non-programming content segment. In such instances, the personalized mediacast generation system 200 will buffer the original, "live," or real-time broadcast or Webcast programming content 112 for subsequent delivery to the mediacast content consumer 114 at the conclusion of the replacement non-programming content segments inserted at 710 or the replacement programming content segments inserted at 714. To determine whether buffering of the original, "live," or real-time broadcast or Webcast programming content 112 is needed, the personalized mediacast generation system 200 first determines whether a content segment start is present in the original, "live," or real-time broadcast or Webcast programming content 112.

At 716, the personalized mediacast generation system 200 determines whether a start of a next content segment has been reached in the original, "live," or real-time broadcast or Webcast programming content 112. If the personalized mediacast generation system 200 detects the start of the next content segment at 716, the personalized mediacast generation system 200 can begin buffering the original, "live," or real-time broadcast or Webcast programming content 112.

At 718, responsive to the detection of the start of a non-replaceable content segment at 716, the personalized mediacast generation system 200 buffers the non-replaceable content in the original, "live," or real-time broadcast or Webcast programming content 112.

At 720, the personalized mediacast generation system 200 determines whether an "END" marker, flag or similar indicator has been detected in the replacement non-programming content segments inserted into the personalized mediacast 118 at 710 or the replacement programming content segments inserted into the personalized mediacast 118 at 714. If the personalized mediacast generation system 200 fails to detect an "END" marker, flag, or similar indicator at 720, the delivery of the replacement content segments continues at 722.

Responsive to the detection of an "END" marker, flag or similar indicator in the replacement non-programming content segments inserted into the personalized mediacast 118 at 720, the personalized mediacast generation system 200 retrieves the original, "live," or real-time broadcast or Webcast programming content 112 buffered at 718. The retrieved buffered original, "live," or real-time broadcast or Webcast programming content 112 is inserted into the personalized mediacast 118 and delivered to the mediacast content consumer 114. The personalized mediacast generation system 200 continues to buffer the original, "live," or real-time broadcast or Webcast programming content 112 until the respective personalized mediacast 118 becomes temporally synchronized with the original, "live," or real-time broadcast or Webcast programming content 112. The method 700 of skipping content segments in a personalized mediacast 114 using a personalized mediacast generation system 200 concludes at 726.

Figure 8:
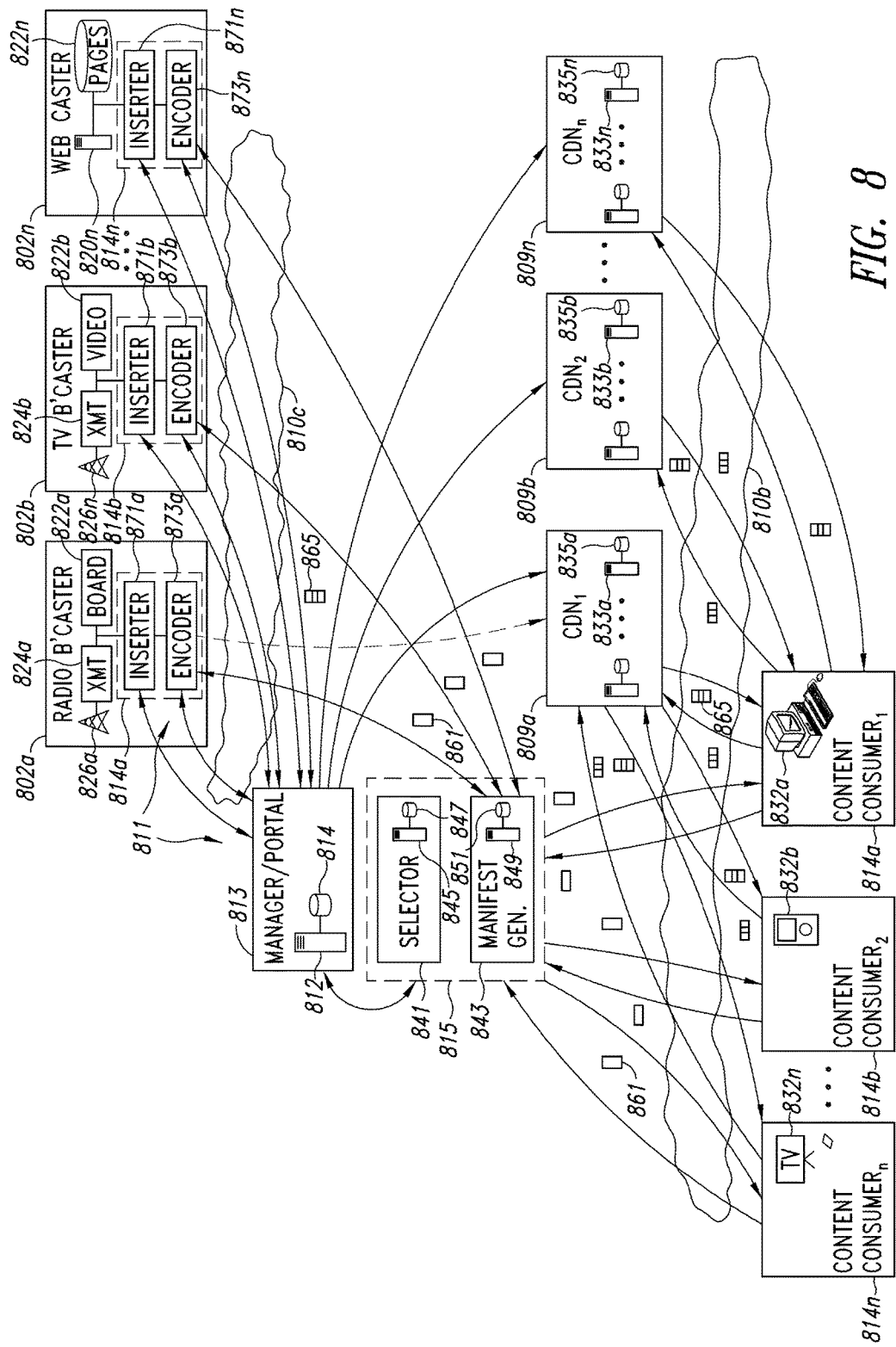
FIG. 8 is a schematic diagram of a networked environment, including a number of content providers (e.g., terrestrial radio or television providers or Webcasters) and associated content provider systems, a number of content consumers and associated content consumer devices (e.g., computers, smartphones, tablets, Internet enabled televisions), a number of content delivery networks (CDNs), and a content delivery system that includes a manager/portal computer system communicatively coupled to a number of inserters, a number of fragment encoder systems, and content selector and manifest generator computer systems communicatively coupled to dynamically generate manifests and supply the dynamically generated manifest to content consumer devices and to the insertion and fragment encoder system, according to one illustrated embodiment.

FIG. 8 shows a networked environment 800, according to one illustrated embodiment in which various apparatus, methods and articles described herein may operate. The networked environment 800 includes a number of content providers 806a, 806b-806n (three illustrated, collectively "content providers 806"), a number of end users or content consumers 808a-808n (two illustrated, collectively "content consumers 808"), and a number of content delivery networks 809a, 809b-809n (collectively "content delivery networks 809"). The environment 800 also includes a content delivery system 811 which includes a number of content manager and/or portal systems 813, a number of content selector and manifest generator systems 815, and a number of chunk encoder systems 873a, 873b-873n (collectively "chunk encoder systems 873") and optionally a number of content inserters 871a, 871b-871n (collectively "content inserters 871"). The content manager and/or portal systems 813 can function cooperatively with the content selector and manifest generation systems 815 to provide content chunks according to a defined manifest. The defined manifest corresponds to an uninterrupted lead-in content block provided to a mediacast content consumer as part of a unicast mediacast 118. The unicast mediacast 118 may be implemented via HTTP, and is denominated as unicast since it is address to a single user, address or account, in contrast to a broadcast (i.e., anyone who cares to receive) or multicast (i.e., to a plurality of users, addresses or accounts).

The content providers 806 may take a variety of forms, for example, radio stations or broadcasters 806a, television stations or broadcasters 806b, other terrestrial or satellite broadcasters or multicasters (not shown), Webcasters 806c, etc. The content providers 806 may, or may not, own the content that they provide. For example, the content provider may own content segments produced by the content provider, and may receive content from other sources (e.g., advertisers, production companies, artists, distributors) for distribution as part of an audio broadcast, a video broadcast, or a Webcast. Additionally, content providers 806 may or may not include non-revenue generating content in the audio broadcast video broadcast or Webcast. Such non-revenue generating content may include public access content and public service announcements.

A radio broadcaster 806a will typically include a source of content, for example, a sound board 822a or similar device. The radio broadcaster 106a will typically include one or more transmitters 824a and antennas 826a to wirelessly transmit programming. Various types of transmitters 824a and antennas 826a may be suitable, for example, commercially available transmitters and antennas for amplitude modulated (AM) or frequency modulated (FM) or other forms of wireless communications. Typically, additional circuitry is present to filter and otherwise condition or process the signals. Radio broadcasters 806a often employ transponders or repeaters (neither shown) to extend the range or coverage of their service area. Typically, the radio broadcaster 806a will have, or will employ another party's content provider content server computer system (not shown) which serves or Webcasts programming. Such allows distribution of programming outside the radio broadcaster's 806a service area or range.

A television broadcaster 806b may include one or more content provider computer systems 820b that may take any of a large variety of forms, including personal or microcomputers including laptop and desktop computers, minicomputers, workstations server computers, and even mainframe computers. Television broadcaster 806b will typically include a source of content, which may be supplied via a video board 822b or similar device. The television broadcaster 106b will typically include one or more transmitters 824b and antennas 826b to wirelessly transmit programming. Various types of transmitters 824b and antennas 826b may be suitable, for example, commercially available transmitters 824b and antennas 826b for analog (e.g., NTSC standard) or digital (e.g., ATSC standard) broadcasts. Typically, additional circuitry is present to filter and otherwise condition or process the signals. Television broadcasters

806b often employ transponders or repeaters (neither shown) to extend the range or coverage of their service area. Typically, the television broadcaster 106b will have, or will employ another party's, content provider content server (not shown) which serves or Webcasts programming. Such allows distribution of programming outside the television broadcaster's 806b service area or range.

A Webcaster 806n may include one or more content provider computer systems 820n that may take any of a large variety of forms, including personal or microcomputers, including laptop and desktop computers, minicomputers, workstations, server computers, and even mainframe computers. A Webcaster 806b will typically include a source of content, which may be supplied via a nontransitory computer- or processor-readable medium that stores one or more WebPages or other content 822n or similar device. Typically, the Webcaster 806b will have, or will employ another party's, content provider content server (not shown) which serves or Webcasts programming.

End users or mediacast content consumers 114 may employ any of a large variety of devices. For example, mediacast content consumers or end users 114 may employ personal computers 832a such as desktop computers, laptop computers, netbooks or tablet computers. Also, for example, mediacast content consumers or end users 114 may employ mobile devices 832b, such as smart phones, personal digital assistants. Also, for example, mediacast content consumers or end users 114 may employ televisions 832c, for example Internet or Web enabled televisions.

As noted above the CDNs may take the form of various networks of server computer systems 833a, 833b-833n (collectively "server computer systems 833") and associated nontransitory storage media 835a, 835b-835n (collectively "nontransitory storage media 835"), typically geographically distributed to allow caching of content, including alternative content, and associated information. Such may be accessible by content consuming devices via a public network infrastructure, for instance the Internet or Worldwide Web 810b.

The content selector and manifest generator system 815 may include a selector subsystem 841 and a manifest generation subsystem 843. The selector subsystem 841 and the manifest generation subsystem 843 may be implemented as two distinct components, for instance two distinct hardware components as illustrated in FIG. 8. Thus, the selector subsystem 841 may include a selector computer system 845 and a selector nontransitory storage medium 847, and the manifest generator subsystem 841 may include a manifest generator computer system 849 and a manifest generation nontransitory storage medium 851. Alternatively, selector subsystem 841 and the manifest generation subsystem 843 may be implemented as a combined component, for example using a same computer system to perform both the selection and the manifest generation. The computer systems 845, 849 may take a variety of forms, for example a simple controller (e.g., DSP, microprocessor, programmable logic controller, ASIC, FPGA), with or with separate memory (e.g., ROM, RAM), to more complicated systems such a desktop, mini, server or mainframe computer systems. Likewise, the non-transitory storage medium 847, 851, may take a variety of forms, for example spinning media such as hard disks or optical disks and associated drives, or stationary media such as solid-state drives or FLASH memory.

The content selector and manifest generator system 815, and particularly the manifest generator subsystem 843, is communicatively coupled to the chunk encoder systems 873 and the content inserter systems 871, for example via the private network infrastructure 810c. In some implementations the manifest generator subsystem 843 is communicatively coupled to the content inserter systems 871 in lieu of the chunk encoder systems 873. The content selector and manifest generator system 815, and particularly the manifest generator subsystem 843, is communicatively coupled to the mediacast content consumers 114, for example via the public network infrastructure 810b.

The selector subsystem 841 selects content in the form of content chunks for insertion into the uninterrupted lead-in content block of each personalized mediacast 118. In at least one example, the inserted content chunks replace content segments in the "live" or original broadcast or Webcast provided by the broadcaster or Webcaster. In at least some instances, the total duration of the inserted content chunks forming the uninterrupted lead-in content block may have an aggregate length or duration differing from the length or duration of the content segments in the "live" or original broadcast or Webcast that the content chunks replace. In some instances multiple lead-in content chunks may replace a single content segment in the "live" or original broadcast or Webcast, while in other instances a single lead-in content chunk may replace multiple sequential content segments in the "live" or original broadcast or Webcast.

The selector subsystem 841 may select lead-in content chunks, based on a variety of criteria. For example, the selector subsystem 841 may select lead-in content chunks based at least in part on content appearing on a defined and/or approved broadcaster or Webcaster playlist. Thus, a classic rock broadcaster may provide uninterrupted lead-in content segments selected from a classic rock content or format playlist (e.g., the Rolling Stones, The Who, The Doors, Jimi Hendrix, and the like). Similarly, a progressive talk format Webcaster may provide lead-in content segments selected from the same or similar progressive talk format presentations.

Also for example, the selector subsystem 841 may select uninterrupted lead-in content chunks that are targeted or deemed to be of more interest to an individual or audience receiving the personalized mediacast 118. In some instances, the selector subsystem 841 may rely on information about content consumers 108 on an individual or more general audience basis. For example, a classic rock broadcaster may provide a first uninterrupted lead-in content block to a mediacast content consumer who has indicated a preference for classic southern rock (e.g., Molly Hatchet, Lynyrd Skynyrd) and a second uninterrupted lead-in content block to a mediacast content consumer who has indicated a preference for a classic metal rock (e.g., Deep Purple, Led Zepplin).

As a further example, the selector subsystem 841 may select content chunks for use in an uninterrupted lead-in content block, at least in part based on a duration or length of a broadcast or Webcast content segment which is to be replaced. For example, the selector subsystem 841 may select content chunks for inclusion in an uninterrupted lead-in content segment to minimize any delay between presentation of the uninterrupted lead-in content block and the content segments occurring in the "live" or original broadcast or Webcast provided by the broadcaster or Webcaster. Such may be achieved while still not requiring an exact or even an approximate match between duration or length of replacement content chunks in the uninterrupted lead-in content block and those content segments in the "live" or original broadcast or Webcast provided by the broadcaster or Webcaster that are to be replaced.

Thus, the selector subsystem 841 may base the selection of content chunks on a variety of factors or parameters. For example, the selector subsystem 841 may base content chunk selection at least in part on an appropriateness of the material to be inserted. For instance, the selector subsystem 841 may select content chunks for the uninterrupted lead-in content block at least in part on an attempt to match a format, language, general demographic or specific demographic of the audience or target audience of the programming which will be delivered via the audio broadcast, video broadcast or Webcast. This advantageously allows differences between audiences of broadcasts and Web based viewing or listening to be accommodated.

The manifest generator subsystem 843 dynamically generates manifests 861 (only one called out in FIG. 8) for uninterrupted lead-in content blocks in response to one or more requests 863 (only two called out in FIG. 8). In particular, the manifest generator subsystem 843 dynamically generates manifests 861 that indicate the location and playback sequence for content chunks included in an uninterrupted lead-in content block delivered as a unicast or personalized mediacast 118. In some instances, the manifests 861 can indicate or provide pointers to one or more cache or memory locations where content chunks may be retrieved or otherwise obtained. In other instances, the dynamically generated manifests 861 may indicate logical network addresses or other locations or pointers to where the content chunks 865 corresponding to various content segments are cached or otherwise stored. For instance, the dynamically generated manifests 861 may indicate various IP addresses for retrieving content chunks from one or more CDNs 809. The dynamically generated manifests 861 indicate an order for the presentation of the content chunks 865, which order may be the inherent order of the addresses or locations in the dynamically generated manifest 861, or which order may be explicitly set out in a list or array stored in the dynamically generated manifest 861.

The content chunks 865 may be wrapped in an encryption layer (e.g., thin encryption layer). Such may force the content chunks to go through the content manager and/or portal systems 813, or some other system, to unwrap the encryption in the cloud prior to redistribution. Such may advantageously prevent use of encoders 873 directly by the content provider(s) 806 with the CDNs 833. Alternatively or additionally, in some implementations one or more of the encoders 873 may provide the content chunks 165 directly to one or more 8DNs 133, for example as illustrated by broken line single headed arrow extending between encoder 873*a* and CDN 809*a*. Such may omit the encryption layer, or may employ an encryption layer specific to the particular CDN 809*a*.

The manifest generator subsystem 843 may dynamically generate the manifest 861 based on a variety of criteria. For example, the manifest generator subsystem 843 may dynamically generate the manifest 861 based on a least cost, shortest network distance and/or least latency analysis. Such may indicate the caching or use of cached content chunks at one location (e.g., a first CDN 809*a*) over another location (e.g., a second CDN 809*b*). Additionally, the criteria may include a preference for certain delivery systems, such as certain CDNs 809. Such a preference may be based on various criteria, for instance geographic location, redundancy, efficiency, or even financial cost.

Advantageously, the dynamically generated manifests 861 are generated based on content, theme, or composition of the selected uninterrupted lead-in content block. The content chunks included in the uninterrupted lead-in content block may be selected using criteria provided by the mediacast content consumer 114, by the audio broadcaster 102*a*, by the video broadcaster 102*b*, by the Webcaster 102*c*, or any combination thereof. Thus, the dynamically generated manifests 861 are tailored or customized for specific mediacast content consumers 114, groups of mediacast content consumers 114, and/or for specific audio broadcaster 102*a*, video broadcaster 102*b*, or Webcasters 102*c*. The manifest generator subsystem 843 may dynamically generate manifests based on information provided by the chunk encoder systems 873, provided by the uninterrupted lead-in content chunk inserters 871, or provided by both.

The chunk encoder system 873*a* and the uninterrupted lead-in content chunk inserter 871*a* may, for example, be located at the radio broadcaster 806*a* facilities. Alternatively, the chunk encoder system 873*a* and the uninterrupted lead-in content chunk inserter 871*a* may be located remotely from the radio broadcaster 806*a* facilities. Even though collocated, such may be owned, operated or otherwise controlled by a different entity that the radio broadcaster. The chunk encoder system 873*a* and the uninterrupted lead-in content chunk inserter 871*a* may be implemented as two distinct components, for instance two distinct hardware components. Alternatively, the chunk encoder system 873*a* and the uninterrupted lead-in content chunk inserter 871*a* may be implemented as a single, integrated hardware component.

The uninterrupted lead-in content chunk inserter 871*a* is coupled to receive programming from the sound board 822*a*. The uninterrupted lead-in content chunk inserter 171*a* may also optionally be communicatively coupled to receive audio material to be inserted or substituted in the programming, for example music, talk, or video content chunks included in the uninterrupted lead-in content block provided to the mediacast content consumer 114. For instance, the uninterrupted lead-in content chunk inserter 171*a* may be communicatively coupled to the content manager and/or portal systems 813 to receive the content chunks included in the uninterrupted lead-in content block, for example via the private network infrastructure 810*c*. Alternatively, the uninterrupted lead-in content chunk inserter 871*a* may be communicatively coupled to the content manager and/or portal systems 113 to receive information indicative of a location from which the content chunks included in the uninterrupted lead-in content block may be retrieved.

A primary function of the uninterrupted lead-in content chunk inserter 871*a* is to insert content chunks into an uninterrupted lead-in content segment in a mediacast 118 delivered to a mediacast content consumer 114. For example, inserting content chunks in a manifested sequence of defined content chunks forming an uninterrupted lead-in content block. Such may, for example, allow replacement of "live" or original broadcast or Webcast content with material selected to provide the uninterrupted lead-in content block. Where or when the uninterrupted lead-in content chunk inserter 871*a* does not insert or substitute replacement content chunks into the programming, the manifest generator 843 may insert location information that indicates a location (e.g., logical network address) at which the uninterrupted lead-in content chunks may be retrieved.

As explained in more detail herein, the uninterrupted lead-in content chunk inserter 871*a* may use buffering or caching to allow the uninterrupted lead-in content block to, in some instances, fit within a block or segment of "live" or original broadcast or Webcast content. The uninterrupted lead-in content chunk inserter 871*a* may attempt to maintain the delivery of modified programming (i.e., mediacast programming including the uninterrupted lead-in content block and any cached "live" or original broadcast or Webcast content. The uninterrupted lead-in content chunk inserter 871a provides the programming to the chunk encoder system 873a.

The chunk encoder system 873a encodes content chunks, including content chunks from the of "live" or original broadcast or Webcast into content chunks 865 suitable for storage, retrieval, and playback on content consumer audio, video, or Web devices 832. Where the uninterrupted lead-in content chunk inserter 871a is employed to insert or content chunks into a personalized mediacast 118, the chunk encoder system 873a encodes the audio, video, and/or Web content into content chunks 865. Where the uninterrupted lead-in content chunk inserter 871a is not employed, some other system or component (e.g., content manager and/or portal systems 813, selector subsystem 841) may encode the content chunks 865.

The chunk encoder system 873a, or some other system (e.g., content manager and/or portal systems 813, selector subsystem 841) may transmit the encoded content chunks 865 to various network locations for storage. For example, the chunk encoder system 873a may transmit the encoded content chunks 865 to various CDNs 809 for storage, for instance via the private network infrastructure 810c. Such allows content consumer devices 832 to retrieve the encoded content chunks 865 according to a dynamically generated manifest 861 via a public network infrastructure 810b such as the Worldwide Web portion of the Internet.

Similarly, the chunk encoder system 873b and the uninterrupted lead-in content chunk inserter 871b may, for example, be located at the television broadcaster 806b facilities. Alternatively, the chunk encoder system 873b and the uninterrupted lead-in content chunk inserter 871b may be located remotely from the television broadcaster 1806b facilities. Even though collocated, such may be owned, operated or otherwise controlled by a different entity that the television broadcaster. The chunk encoder system 873b and the uninterrupted lead-in content chunk inserter 871b may be implemented as two distinct components, for instance two distinct hardware components. Alternatively, the chunk encoder system 873b and the uninterrupted lead-in content chunk inserter 871b may be implemented as a single, integrated hardware component.

The uninterrupted lead-in content chunk inserter 871b is coupled to receive programming from the video board 822b. The uninterrupted lead-in content chunk inserter 871b may also be communicatively coupled to receive uninterrupted lead-in video content segments to be inserted or substituted in the programming, for example video chunks used to provide a defined uninterrupted lead-in content block. For instance, the uninterrupted lead-in content chunk inserter 871b may be communicatively coupled to the content manager and/or portal systems 813 to receive the uninterrupted lead-in content blocks, for example via the private network infrastructure 810c. Alternatively, the uninterrupted lead-in content chunk inserter 871b may be communicatively coupled to the content manager and/or portal systems 813 to receive information indicative of a location from which the content chunks included in the uninterrupted lead-in content block may be retrieved.

A primary function of the uninterrupted lead-in content chunk inserter 871b is to insert content chunks into an uninterrupted lead-in content segment in a mediacast 118 delivered to a mediacast content consumer 114. For example, inserting content chunks in a manifested sequence of defined content chunks forming an uninterrupted lead-in content block. Where or when the uninterrupted lead-in content chunk inserter 871b does not insert or substitute replacement content chunks into the programming, the manifest generator 843 may insert location information that indicates a location (e.g., logical network address) at which the uninterrupted lead-in content chunks may be retrieved.

As explained in more detail herein, the uninterrupted lead-in content chunk inserter 871b may use buffering or caching to allow the uninterrupted lead-in content block to, in some instances, fit within a block or segment of "live" or original broadcast or Webcast content. The uninterrupted lead-in content chunk inserter 871b may attempt to maintain the streaming of modified programming approximately concurrent with the radio broadcast, reducing delay or lag therebetween. The uninterrupted lead-in content segment inserter 871b provides the programming, with the inserted uninterrupted lead-in content segments or similar material, to chunk encoder subsystem or component 873b.

The chunk encoder system 873b encodes content, including original content from the broadcast or Webcast, into chunks 865 suitable for storage, retrieval and playing on content consumer devices 132. Where the uninterrupted lead-in content segment inserter 871b is employed to insert or substitute replacement material, the chunk encoder system 873b encodes the replacement content as well as into the chunks 865. Where the uninterrupted lead-in content segment inserter 871b is not employed, some other system or component (e.g., content manager and/or portal systems 813, selector subsystem 841) may encode the replacement content into chunks 865.

The chunk encoder system 873b, or some other system (e.g., content manager and/or portal systems 113, selector subsystem 141) may transmit the encoded content chunks 865 to various network locations for storage. For example, the chunk encoder system 873b may transmit the encoded uninterrupted lead-in content segment chunks 865 to various CDNs 809 for storage, for instance via the private network infrastructure 810c. Such allows content consumer devices 832 to retrieve the encoded content chunks 865 according to a dynamically generated manifest 861 via a public network infrastructure 810b such as the Worldwide Web portion of the Internet.

Similarly, chunk encoder system 873n and the uninterrupted lead-in content segment inserter 871n may, for example, be located at the Webcaster 806n facilities. Alternatively, the chunk encoder system 873n and optionally the uninterrupted lead-in content segment inserter 871n may be located remotely from the Webcaster 806n facilities. Even though collocated, such may be owned, operated or otherwise controlled by a different entity that the Webcaster. The chunk encoder system 873n and the uninterrupted lead-in content segment inserter 871n may be implemented as two distinct components, for instance two distinct hardware components. Alternatively, the chunk encoder system 873n and the uninterrupted lead-in content chunk inserter 871n may be implemented as a single, integrated hardware component.

The uninterrupted lead-in content chunk inserter 871n is coupled to receive content from the store of one or more WebPages or other content 822n. The uninterrupted lead-in content chunk inserter 871n may also optionally be communicatively coupled to receive content chunks for insertion into the uninterruptible lead-in content block. For instance, the uninterrupted lead-in content chunk inserter 871n may be communicatively coupled to the content manager and/or portal systems 813 to receive the content chunks for inclusion in the uninterrupted lead-in content block, for example via the private network infrastructure 810c. Alternatively, the uninterrupted lead-in content chunk inserter 871n may be communicatively coupled to the content manager and/or portal systems 813 to receive information indicative of a location from which the content chunks included in the uninterrupted lead-in content block may be retrieved.

A primary function of the uninterrupted lead-in content chunk inserter 871n is to insert content chunks into an uninterrupted lead-in content segment in a mediacast 118 delivered to a mediacast content consumer 114. For example, inserting content chunks in a manifested sequence of defined content chunks forming an uninterrupted lead-in content block. Where or when the uninterrupted lead-in content segment inserter 871n does not insert or substitute replacement content chunks into the programming, the manifest generator 843 may insert location information that indicates a location (e.g., logical network address) at which the uninterrupted lead-in content chunks may be retrieved.

As explained in more detail herein, the uninterrupted lead-in content segment inserter 871n may use buffering or caching to allow the uninterrupted lead-in content block to, in some instances, fit within a block or segment of "live" or original broadcast or Webcast content. The uninterrupted lead-in content chunk inserter 871b may attempt to maintain the streaming of modified programming approximately concurrent with the radio broadcast, reducing delay or lag therebetween. The uninterrupted lead-in content segment inserter 871b provides the programming, with the inserted uninterrupted lead-in content segments or similar material, to chunk encoder subsystem or component 873n.

The chunk encoder system 873n encodes content, including original content from the broadcast or Webcast, into chunks 865 suitable for storage, retrieval and playing on content consumer devices 132. Where the uninterrupted lead-in content segment inserter 871n is employed to insert or substitute replacement material, the chunk encoder system 873n encodes the replacement content as well as into the chunks 865. Where the uninterrupted lead-in content segment inserter 871n is not employed, some other system or component (e.g., content manager and/or portal systems 813, selector subsystem 841) may encode the replacement content into chunks 865.

The chunk encoder system 873n, or some other system (e.g., content manager and/or portal systems 113, selector subsystem 141) may transmit the encoded content chunks 865 to various network locations for storage. For example, the chunk encoder system 873n may transmit the encoded uninterrupted lead-in content segment chunks 865 to various CDNs 809 for storage, for instance via the private network infrastructure 810c. Such allows content consumer devices 832 to retrieve the encoded content chunks 865 according to a dynamically generated manifest 861 via a public network infrastructure 810b such as the Worldwide Web portion of the Internet.

Figure 9:
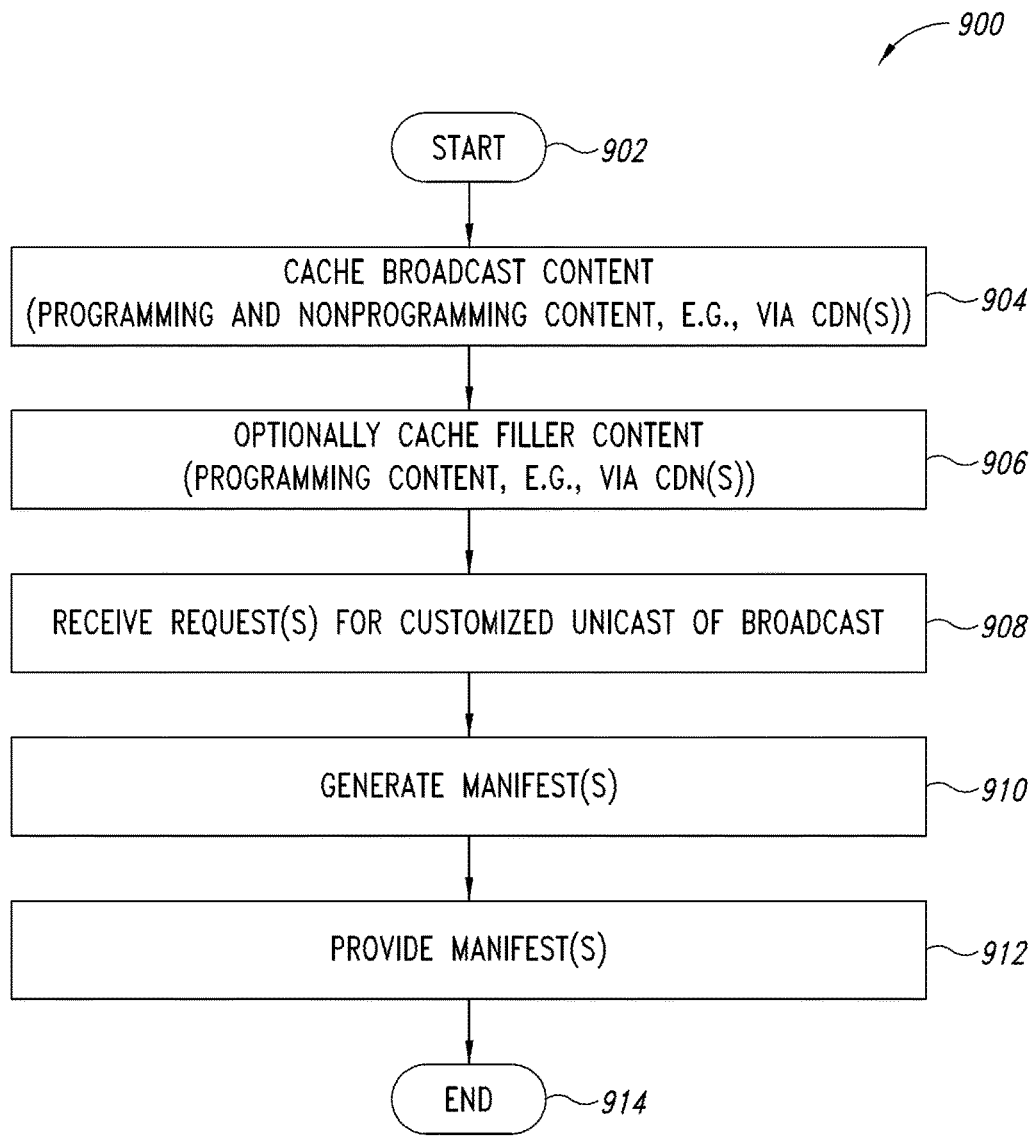
FIG. 9 is a high-level flow diagram of a method for caching blocks of programming content during the delivery of an uninterrupted lead-in content segment of a customized unicast of the programming content, according to one illustrated embodiment.

FIG. 9 shows a method 900 of operating a system for inserting an uninterruptible lead-in content block including a number of content chunks in a personalized mediacast, according to an embodiment. In some instances, an audio broadcaster 102a, a video broadcaster 102b, and/or a Webcaster 102n may generate broadcast or Webcast content that is stored in a nontransitory storage media as a content chunk. Each chunk may be individually addressable and when assembled in a sequence defined by a manifest, reproduces the "live" or original audio broadcast, video broadcast, and/or Webcast. The method of operating a system for inserting an uninterruptible lead-in content block including a number of content chunks in a personalized mediacast commences at 902.

At 904, the broadcaster or Webcaster converts at least a portion of the audio broadcast, video broadcast, and/or Webcast into a number of content chunks. In some instances, the entire broadcast or Webcast presentation, including content segments and non-content segments, may be converted into a number of content chunks. In other instances, only a portion of the entire broadcast or Webcast presentation, for example just content segments, may be converted to a number of content chunks. In at least some instances, addresses or similar location and/or identification data are associated with the content chunks prior to storage in a cache or similar nontransitory storage media.

At 906, the broadcaster or Webcaster converts content intended for inclusion in uninterruptible lead-in content segments into content chunks. Such content typically includes programming content. Thus, an audio broadcaster that provides classic rock format music may convert classic rock songs from a number of artists into content chunks. An audio broadcaster that provides progressive talk radio format may convert talk radio segments into a number of content chunks. A video broadcaster that provides music videos may convert music videos into a number of content chunks.

At 908, the broadcaster or Webcaster receives a request for delivery of a personalized mediacast 118 from a mediacast content consumer 114.

At 910, the broadcaster or Webcaster generates a manifest that includes information indicative of the location of content chunks used in providing the uninterrupted lead-in content block to the mediacast content consumer.

At 912, the mediacast delivery system communicates the manifest identifying the content chunks and storage location associated with each chunk to the mediacast content consumer device. The mediacast content consumer device accesses the content chunk locations included in the manifest and retrieves the content chunks for playback on the mediacast content consumer device. The method of operating a system for inserting an uninterruptible lead-in content block including a number of content chunks in a personalized mediacast concludes at 914.

Figure 10:
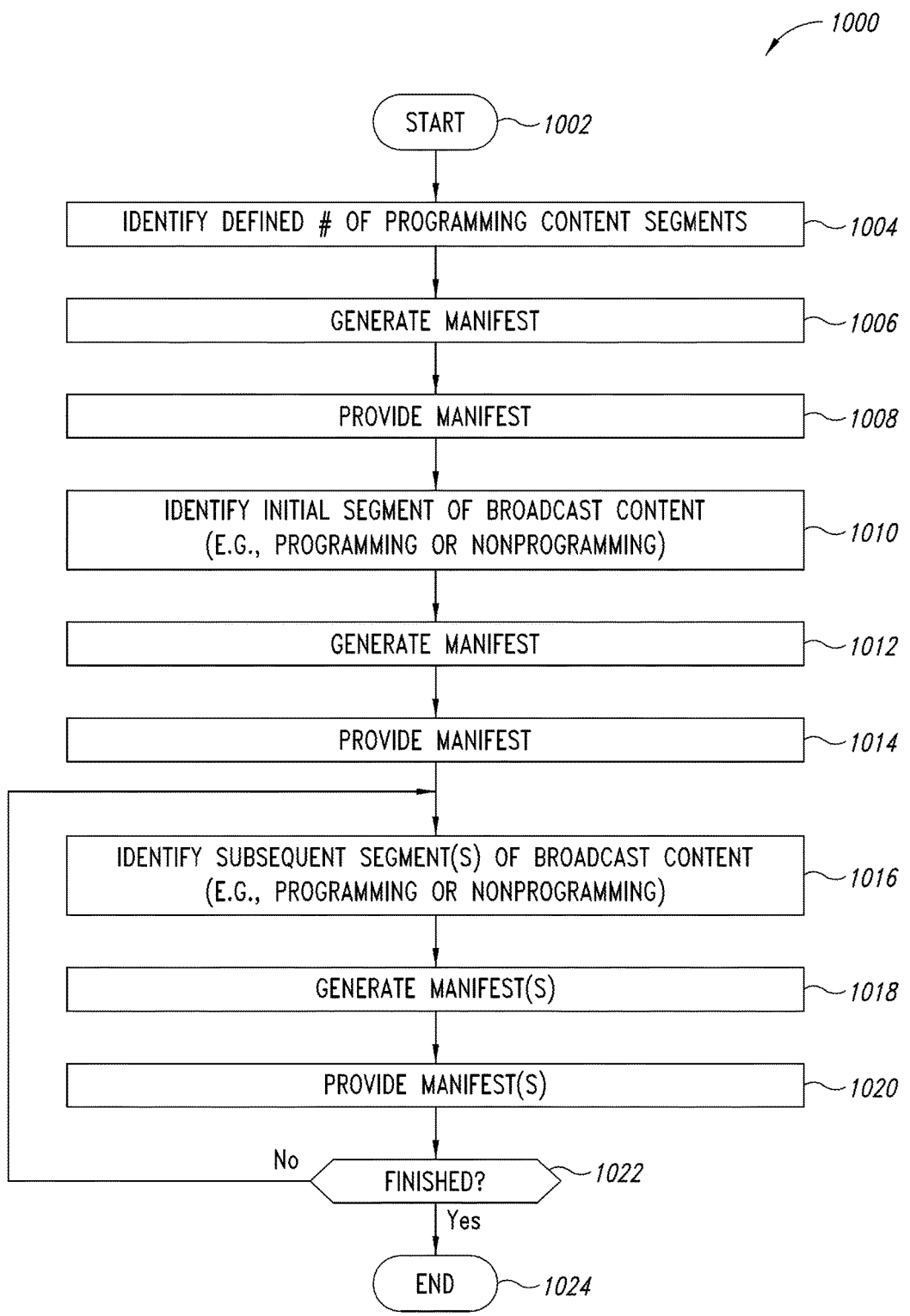
FIG. 10 is a high-level flow diagram of a method for generating manifests corresponding to the programming content segment blocks provided in an uninterrupted lead-in content segment, a cached initial programming content segment and additional cached programming content, according to one illustrated embodiment.

FIG. 10 shows a method 1000 of operating a system for inserting an uninterruptible lead-in content block including a number of content chunks in a personalized mediacast, according to an embodiment. In some instances, an audio broadcaster 102a, a video broadcaster 102b, and/or a Webcaster 102n may generate broadcast or Webcast content that is stored in a nontransitory storage media as a number of individually accessible content chunks. Upon joining the broadcast or Webcast, each mediacast content consumer 114 may receive a defined uninterrupted lead-in content block (e.g., all talk, all classic rock, all music videos) for a defined period (e.g., 10 minutes, 5 songs). The content provided in the uninterrupted lead-in content block may also be stored as a number of individually accessible content chunks. In at least some instances, each content chunk may have an address or similar location and/or identification data associated therewith. The method of operating a system for inserting an uninterruptible lead-in content block including a number of content chunks in a personalized mediacast commences at 1002.

At 1004, the system identifies a number of content segments for delivery to the mediacast content consumer 114 as part of an uninterrupted lead-in segment. For example, the system may select three classic rock songs having an aggregate play time in excess of 10 minutes to generate an uninterrupted lead-in "classic rock format" content block for the respective mediacast content consumer 114. In another example, the system may select three music videos having an aggregate play time in excess of 10 minutes to generate an uninterrupted lead-in "music video" content block for the respective mediacast content consumer 114.

At 1006, the system generates a manifest that includes the playback order and storage location for each content chunk used in providing the uninterrupted lead-in content block. In some instances, the manifest generator 843 generates such a manifest.

At 1008, the system communicates the manifest to the mediacast content consumer device 832. The mediacast content consumer device 832 then retrieves the content chunks from the locations provided by the manifest and in the order specified by the manifest to provide the mediacast content consumer 114 with the uninterrupted lead-in content block.

At 1010, contemporaneous with providing the uninterrupted lead-in content block to the mediacast content consumer, the system identifies an initial segment in the "live" or original audio broadcast, video broadcast, and/or Webcast. Recall, the "live" or original audio broadcast, video broadcast, and/or Webcast is converted to content chunks that are stored in a nontransitory storage medium, for example a storage medium 835 in a content delivery network 809. At the conclusion of the uninterrupted lead-in segment, the system provides the mediacast content consumer with a mediacast including stored content chunks containing programming and non-programming content from the "live" or original audio broadcast, video broadcast, and/or Webcast. The portion of the mediacast that immediately follows the lead-in segment (e.g., follows the uninterrupted programming content) is the beginning of a segment of the broadcast that would have played between the start and end of the lead-in segment. Preferably, the portion of the mediacast that immediately follows the lead-in segment is the beginning of the last segment between the start and end of the lead-in segment so that any time shift is minimized. The conversion of all or a portion of the "live" or original audio broadcast, video broadcast, and/or Webcast to content chunks that are stored in a nontransitory storage occurs periodically or continuously. The uninterrupted lead-in segment provided to the mediacast content consumer introduces an asynchronicity between the mediacast 118 provided to the mediacast content consumer and the "live" or original audio broadcast, video broadcast, and/or Webcast. The ability to identify and provide content chunks to the mediacast content consumer asynchronously with the "live" or original audio broadcast, video broadcast, and/or Webcast advantageously provides the broadcaster or Webcaster with the ability to deliver a mediacast including broadcast or Webcast content to each mediacast content consumer. The broadcast or Webcast content in each mediacast may have the same or different degrees of asynchronicity with the "live" or original audio broadcast, video broadcast, and/or Webcast.

At 1012, the system generates a manifest of the "live" or original audio broadcast, video broadcast, and/or Webcast content chunks created while the uninterrupted lead-in content block is provided to the mediacast content consumer 114.

At 1014, the system communicates the manifest generated at 1012 to the mediacast content consumer device 832. Advantageously, the communication of the manifest to the device 832 permits the device to seamlessly transition from the uninterrupted lead-in content segment to a cached or stored version of the "live" or original audio broadcast, video broadcast, and/or Webcast. Note that temporal asynchronicity may exist between the broadcast or Webcast content provided subsequent to the uninterrupted lead-in content block and the "live" or original audio broadcast, video broadcast, and/or Webcast.

At 1016, the system converts the "live" or original audio broadcast, video broadcast, and/or Webcast into content chunks that are stored in a nontransitory storage media. For a particular mediacast 118 provided to a mediacast content consumer, the system will continue to deliver cached or stored content chunks until the mediacast 118 attains an at least approximate temporal synchronization with the "live" or original audio broadcast, video broadcast, and/or Webcast. At the point of the at least approximate temporal synchronization, the "live" or original audio broadcast, video broadcast, and/or Webcast can be used to provide the respective mediacast 118 to the mediacast content consumer 114.

At 1018, the system generates and/or updates manifest information to reflect the ongoing conversion of the "live" or original audio broadcast, video broadcast, and/or Webcast into content chunks.

At 1020, the system communicates the updated manifest information or data generated at 1018 to the mediacast content consumer device 832.

At 1022, the system determines whether a temporal asynchronicity between the "live" or original audio broadcast, video broadcast, and/or Webcast and the mediacast 118 received by the mediacast content consumer 114 exists. If such temporal asynchronicity exists, the system continues to update the manifest and communicate the updated manifest to the mediacast content consumer device 832. If an at least approximate temporal synchronization exists, the "live" or original audio broadcast, video broadcast, and/or Webcast is delivered to the mediacast content consumer 114 and the method concludes at 1024.

Figure 11:
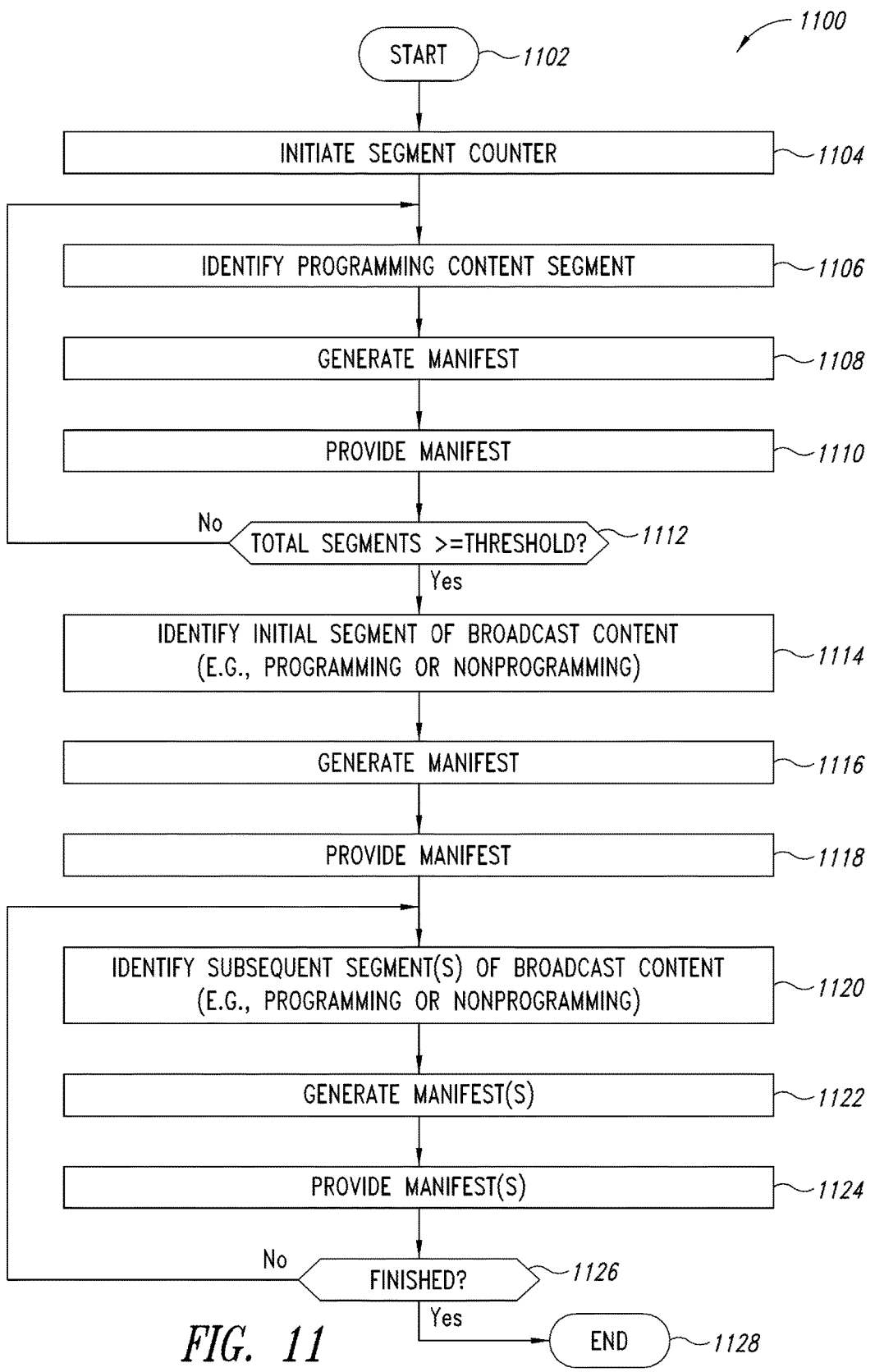
FIG. 11 is a high-level flow diagram of another method for generating manifests corresponding to a number of content segment blocks provided as uninterrupted lead-in content based on a defined number of content segment blocks, a cached initial programming content segment and additional cached programming content, according to one illustrated embodiment.

FIG. 11 shows a method 1100 of operating a system for inserting an uninterruptible lead-in content block including a number of content chunks in a personalized mediacast, according to an embodiment. In some instances, an audio broadcaster 102*a*, a video broadcaster 102*b*, and/or a Webcaster 102*n* may generate broadcast or Webcast content that is stored in a nontransitory storage media as a number of individually accessible content chunks. Upon joining the broadcast or Webcast, each mediacast content consumer 114 receives a defined uninterrupted lead-in content block that includes a defined number of content segments (e.g., 3 songs, 4 music videos). The content provided in the uninterrupted lead-in content block is stored as a number of individually accessible content chunks. In at least some instances, each content chunk may have an address or similar location data associated therewith. The method of operating a system for inserting an uninterruptible lead-in content block including a number of content chunks in a personalized mediacast commences at 1102.

At 1104, the system initiates a segment counter used to track the number of content segments provided in the uninterrupted lead-in content block delivered as a mediacast 118 to a particular mediacast content consumer 114.

At 1106, the system identifies a number of content segments for delivery to the mediacast content consumer 114 as part of an uninterrupted lead-in segment. For example, the system may select three music videos having an aggregate play time in excess of 10 minutes to generate an uninterrupted lead-in "music video" content block for the respective mediacast content consumer 114.

At 1108, the system generates a manifest that includes the playback order and storage location for each content chunk used in providing the uninterrupted lead-in content block. In some instances, the manifest generator 843 generates such a manifest.

At 1110, the system communicates the manifest to the mediacast content consumer device 832. The mediacast content consumer device 832 then retrieves the content chunks from the locations provided by the manifest and in the order specified by the manifest to provide the mediacast content consumer 114 with the uninterrupted lead-in content block.

At 1112, the system determines whether the number of content segments included in the uninterrupted lead-in segment has been reached. If the number of segments has not been reached, the system continues to provide lead-in content chunks to the mediacast content consumer device 832 according to data included in an updated manifest.

At 1114, contemporaneous with providing the uninterrupted lead-in content block to the mediacast content consumer, the system identifies an initial segment in the "live" or original audio broadcast, video broadcast, and/or Webcast.

Recall, the "live" or original audio broadcast, video broadcast, and/or Webcast is converted to content chunks that are stored in a nontransitory storage medium, for example a storage medium 835 in a content delivery network 809. At the conclusion of the uninterrupted lead-in segment, the system provides the mediacast content consumer with a mediacast including stored content chunks containing programming and non-programming content from the "live" or original audio broadcast, video broadcast, and/or Webcast. The conversion of all or a portion of the "live" or original audio broadcast, video broadcast, and/or Webcast to content chunks that are stored in a nontransitory storage occurs periodically or continuously. The uninterrupted lead-in segment provided to the mediacast content consumer introduces an asynchronicity between the mediacast 118 provided to the mediacast content consumer and the "live" or original audio broadcast, video broadcast, and/or Webcast. The ability to identify and provide content chunks to the mediacast content consumer asynchronously with the "live" or original audio broadcast, video broadcast, and/or Webcast advantageously provides the broadcaster or Webcaster with the ability to deliver a mediacast including broadcast or Webcast content to each mediacast content consumer. The broadcast or Webcast content in each mediacast may have the same or different degrees of asynchronicity with the "live" or original audio broadcast, video broadcast, and/or Webcast.

At 1116, the system generates a manifest of the "live" or original audio broadcast, video broadcast, and/or Webcast content chunks created while the uninterrupted lead-in content block is provided to the mediacast content consumer 114.

At 1118, the system communicates the manifest generated at 1116 to the mediacast content consumer device 832. Advantageously, the communication of the manifest to the device 832 permits the device to seamlessly transition from the uninterrupted lead-in content segment to a cached or stored version of the "live" or original audio broadcast, video broadcast, and/or Webcast. Note that temporal asynchronicity may exist between the broadcast or Webcast content provided subsequent to the uninterrupted lead-in content block and the "live" or original audio broadcast, video broadcast, and/or Webcast.

At 1120, the system converts the "live" or original audio broadcast, video broadcast, and/or Webcast into content chunks that are stored in a nontransitory storage media. For a particular mediacast 118 provided to a mediacast content consumer, the system will continue to deliver cached or stored content chunks until the mediacast 118 attains an at least approximate temporal synchronization with the "live" or original audio broadcast, video broadcast, and/or Webcast. At the point of the at least approximate temporal synchronization, the "live" or original audio broadcast, video broadcast, and/or Webcast can be used to provide the respective mediacast 118 to the mediacast content consumer 114.

At 1122, the system generates and/or updates manifest information to reflect the ongoing conversion of the "live" or original audio broadcast, video broadcast, and/or Webcast into content chunks.

At 1124, the system communicates the updated manifest information or data generated at 1122 to the mediacast content consumer device 832.

At 1126, the system determines whether a temporal asynchronicity between the "live" or original audio broadcast, video broadcast, and/or Webcast and the mediacast 118 received by the mediacast content consumer 114 exists. If such temporal asynchronicity exists, the system continues to update the manifest and communicate the updated manifest to the mediacast content consumer device 832. If an at least approximate temporal synchronization exists, the "live" or original audio broadcast, video broadcast, and/or Webcast is delivered to the mediacast content consumer 114 and the method concludes at 1128.

Figure 12:
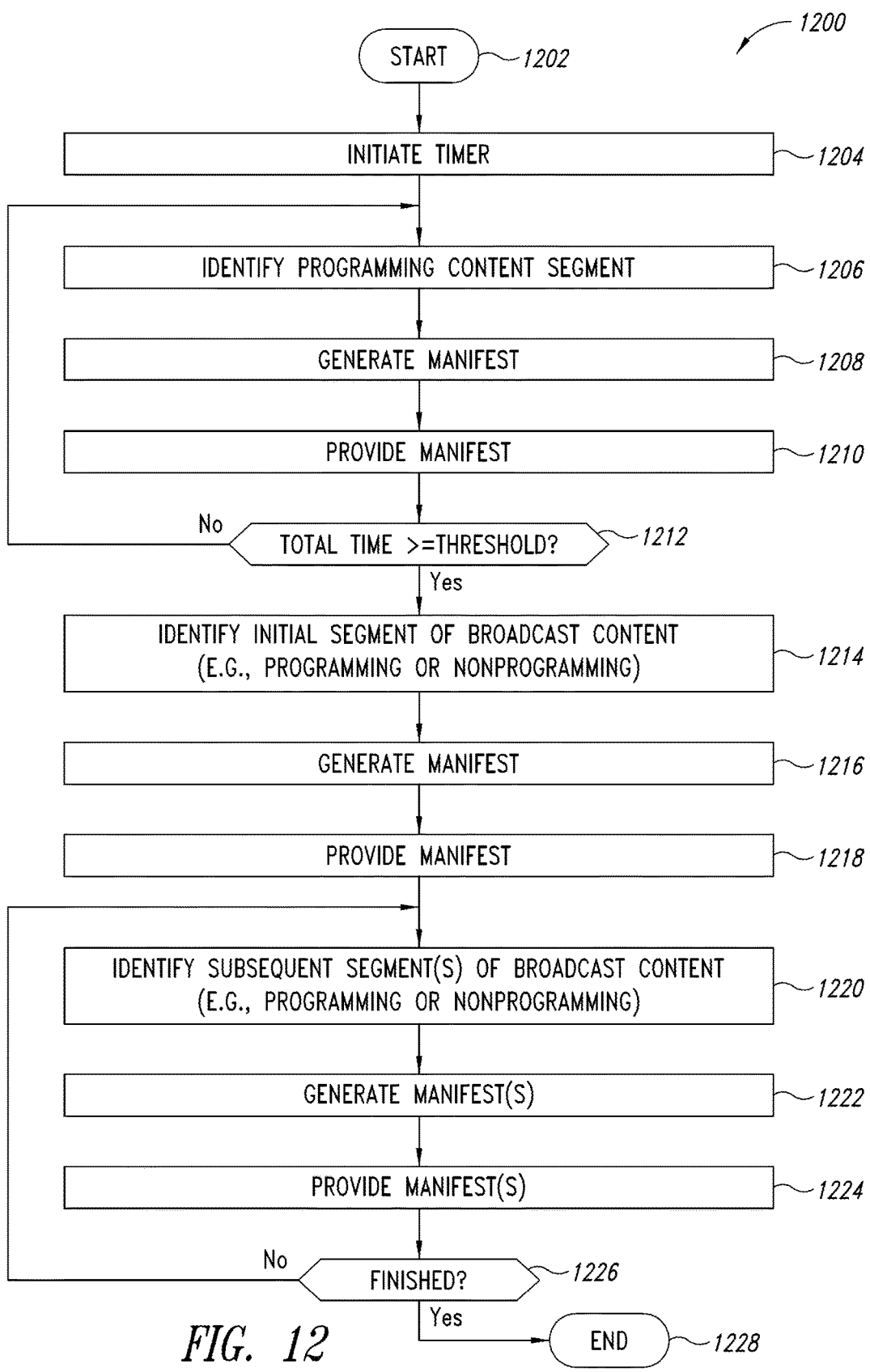
FIG. 12 is a high-level flow diagram of another method for generating manifests corresponding to a number of content segment blocks provided as uninterrupted lead-in content based on a defined time period, a cached initial programming content segment and additional cached programming content, according to one illustrated embodiment.

FIG. 12 shows a method 1200 of operating a system for inserting an uninterruptible lead-in content block including a number of content chunks in a personalized mediacast, according to an embodiment. In some instances, an audio broadcaster 102a, a video broadcaster 102b, and/or a Webcaster 102n may generate broadcast or Webcast content that is stored in a nontransitory storage media as a number of individually accessible content chunks. Upon joining the broadcast or Webcast, each mediacast content consumer 114 receives a defined uninterrupted lead-in content block having a defined duration or length (e.g., 10 minutes of classic rock, 12 minutes of talk radio, 9 minutes of humorous videos). The content provided in the uninterrupted lead-in content block is stored as a number of individually accessible content chunks. In at least some instances, each content chunk may have an address or similar location data associated therewith. The method of operating a system for inserting an uninterruptible lead-in content block including a number of content chunks in a personalized mediacast commences at 1202.

At 1204, the system initiates a timer used to track the aggregate length or duration of the content segments provided in the uninterrupted lead-in content block delivered as a mediacast 118 to a particular mediacast content consumer 114.

At 1206, the system identifies a number of content segments for delivery to the mediacast content consumer 114 as part of an uninterrupted lead-in segment. For example, the system may select three music videos having an aggregate play time in excess of 10 minutes to generate an uninterrupted lead-in "music video" content block for the respective mediacast content consumer 114.

At 1208, the system generates a manifest that includes the playback order and storage location for each content chunk used in providing the uninterrupted lead-in content block. In some instances, the manifest generator 843 generates such a manifest.

At 1210, the system communicates the manifest to the mediacast content consumer device 832. The mediacast content consumer device 832 then retrieves the content chunks from the locations provided by the manifest and in the order specified by the manifest to provide the mediacast content consumer 114 with the uninterrupted lead-in content block.

At 1212, the system determines whether the defined aggregate length or duration of the content segments included in the uninterrupted lead-in segment has been reached. If the aggregate length or duration has not been reached, the system continues to provide lead-in content chunks to the mediacast content consumer device 832 according to data included in an updated manifest.

At 1214, contemporaneous with providing the uninterrupted lead-in content block to the mediacast content consumer, the system identifies an initial segment in the "live" or original audio broadcast, video broadcast, and/or Webcast. Recall, the "live" or original audio broadcast, video broadcast, and/or Webcast is converted to content chunks that are stored in a nontransitory storage medium, for example a storage medium 835 in a content delivery network 809. At the conclusion of the uninterrupted lead-in segment, the system provides the mediacast content consumer with a mediacast including stored content chunks containing programming and non-programming content from the "live" or original audio broadcast, video broadcast, and/or Webcast. The conversion of all or a portion of the "live" or original audio broadcast, video broadcast, and/or Webcast to content chunks that are stored in a nontransitory storage occurs periodically or continuously. The uninterrupted lead-in segment provided to the mediacast content consumer introduces an asynchronicity between the mediacast 118 provided to the mediacast content consumer and the "live" or original audio broadcast, video broadcast, and/or Webcast. The ability to identify and provide content chunks to the mediacast content consumer asynchronously with the "live" or original audio broadcast, video broadcast, and/or Webcast advantageously provides the broadcaster or Webcaster with the ability to deliver a mediacast including broadcast or Webcast content to each mediacast content consumer. The broadcast or Webcast content in each mediacast may have the same or different degrees of asynchronicity with the "live" or original audio broadcast, video broadcast, and/or Webcast.

At 1216, the system generates a manifest of the "live" or original audio broadcast, video broadcast, and/or Webcast content chunks created while the uninterrupted lead-in content block is provided to the mediacast content consumer 114.

At 1218, the system communicates the manifest generated at 1216 to the mediacast content consumer device 832. Advantageously, the communication of the manifest to the device 832 permits the device to seamlessly transition from the uninterrupted lead-in content segment to a cached or stored version of the "live" or original audio broadcast, video broadcast, and/or Webcast. Note that temporal asynchronicity may exist between the broadcast or Webcast content provided subsequent to the uninterrupted lead-in content block and the "live" or original audio broadcast, video broadcast, and/or Webcast.

At 1220, the system converts the "live" or original audio broadcast, video broadcast, and/or Webcast into content chunks that are stored in a nontransitory storage media. For a particular mediacast 118 provided to a mediacast content consumer, the system will continue to deliver cached or stored content chunks until the mediacast 118 attains an at least approximate temporal synchronization with the "live" or original audio broadcast, video broadcast, and/or Webcast. At the point of the at least approximate temporal synchronization, the "live" or original audio broadcast, video broadcast, and/or Webcast can be used to provide the respective mediacast 118 to the mediacast content consumer 114.

At 1222, the system generates and/or updates manifest information to reflect the ongoing conversion of the "live" or original audio broadcast, video broadcast, and/or Webcast into content chunks.

At 1224, the system communicates the updated manifest information or data generated at 1222 to the mediacast content consumer device 832.

At 1226, the system determines whether a temporal asynchronicity between the "live" or original audio broadcast, video broadcast, and/or Webcast and the mediacast 118 received by the mediacast content consumer 114 exists. If such temporal asynchronicity exists, the system continues to update the manifest and communicate the updated manifest to the mediacast content consumer device 832. If an at least approximate temporal synchronization exists, the "live" or original audio broadcast, video broadcast, and/or Webcast is delivered to the mediacast content consumer 114 and the method concludes at 1228.

Modifications

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary system generally described above.

For instance, network and even non-networked topologies other than those illustrated and/or described may be employed. The personalized mediacast generation system may be co-located with the broadcasters or Webcasters or located remotely from the broadcasters or Webcasters, or for example "in the cloud." As noted above, the personalized mediacast generation system may detect replaceable programming or non-programming content segments within the original broadcast or Webcast programming which may directly or indirectly trigger substitution or insertion of new or replacement programming or non-programming content segments to generate the personalized mediacast.

The metadata may simply specify characteristics of the replaceable programming or non-programming content segments which are being replaced, for example specifying a start time, stop time, duration, genre, language, and/or demographic market. A personalized mediacast generation system may use the information, as well as additional information specific to the mediacast content consumer to identify or retrieve the new or replacement programming content and/or new or replacement non-programming content.

The personalized mediacast generation system may be triggered by, or otherwise employ, the metadata to retrieve new or replacement programming and/or new or replacement non-programming content segments. As discussed in detail above, the replacement programming content segments may be selected based at least in part upon a content consumer specific selection criterion, and may additionally be based at least in part upon a playlist or similar approved programming content associated with the broadcaster or Webcaster.

The personalized mediacast generation system may include server computer systems that retrieve the new or replacement programming or new or replacement non-programming content from a variety of different sources. Replacement non-programming content segments may be sourced from an advertiser network server computer system, an advertising network, and/or a third party advertisement aggregator. As previously explained, the replacement non-programming content segments may be targeted to the intended audience of personalized mediacast content consumers, or even an individual personalized mediacast content consumer and/or may be selected based on various external factors, as well as to maximize revenue generation.

In some implementations, replacement programming or non-programming content segments may be inserted or substituted in the programming at a mediacast content consumer device, for example by a media player executing on the mediacast content consumer device. This occurs downstream of the personalized mediacast generation system 116. In contrast, the replacement programming or non-programming content segments may be inserted or substituted in the programming at the personalized mediacast generation system, upstream from the content consumer device. At least some of the implementations described herein may take a server side approach. Taking a server side approach advantageously avoids the need to customize client code for each different mediacast content consumer device, while still providing personalized mediacast capabilities personalized mediacast media players. Depending on the approach taken, a client-side layer could still be added on top of the server-side layer to provide even more level of targeting detail and flexibility.

The implementations described herein can work with all current and future manifest protocols. Examples of current manifest protocols include: M3U8 (Apple HLS), ISML (MSFT Smooth), F4M (Adobe "San Jose"). An example of a possible future manifest protocol includes MPEG DASH or other follow on iterations.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or programmable gate arrays. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of nontransitory signal bearing media include, but are not limited to, the following: recordable type media such as portable disks and memory, hard disk drives, CD/DVD ROMs, digital tape, computer memory, and other non-transitory computer-readable storage media.

The various embodiments described above can be combined to provide further embodiments. To the extent that they are not inconsistent with the specific teachings and definitions herein, U.S. patent application Ser. No. 11/958,143, published as Publication No. 2008-0120638, U.S. provisional patent application Ser. No. 61/877,182 filed Sep. 12, 2013; U.S. provisional patent application Ser. No. 61/561,186 filed Nov. 17, 2011; U.S. provisional patent application Ser. No. 61/587,475 filed Jan. 17, 2012; and U.S. provisional patent application Ser. No. 61/611,403 filed Mar. 15, 2012 are each incorporated herein by reference, in their entireties. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a content personalization system, the content personalization system including at least one processor and at least one nontransitory processor-readable medium communicatively coupled to the at least one processor, the method comprising:

in response to a request to start a personalized delivery of a sequence of broadcast content:
causing delivery of lead-in programming content via personalized delivery, by at least one component of the content personalization system;
determining whether a lead-in satisfaction condition is reached after a start of the causing of delivery of the lead-in programming content, by at least one component of the content personalization system;
buffering at least some subsequent broadcast content of the sequence of broadcast content, by at least one component of the content personalization system, the broadcast content different from the lead-in programming content;

in response to reaching the lead-in satisfaction condition, monitoring for at least one of an end of a segment of the lead-in programming content which is being caused to be delivered or a start of a segment of the lead-in programming content which is being caused to be delivered, by at least one component of the content personalization system; and in response to detection of at least one of the end or the start of the lead-in programming content segment, causing delivery of at least a portion of the buffered broadcast content via personalized delivery, by at least one component of the content personalization system;

in response to a request to skip a content segment in the personalized delivery of a sequence of broadcast content:

causing delivery of filler content via the personalized delivery, by at least one component of the content personalization system;

monitoring the broadcast content of the sequence of broadcast content in the personalized delivery for a start of at least one content segment, by at least one component of the content personalization system;

in response to detection of the start of at least one content segment in the sequence of broadcast content in the personalized delivery, buffering at least some subsequent broadcast content of the sequence of broadcast content in the personalized delivery, by at least one component of the content personalization system;

in response to reaching a satisfaction condition, monitoring for at least one of an end of a segment of the filler content which is being caused to be delivered or a start of a segment of the filler content which is being caused to be delivered, by at least one component of the content personalization system; and in response to detection of at least one of the end or the start of the filler segment, causing delivery of at least a portion of the buffered broadcast content in the personalized delivery via unicast delivery, by at least one component of the content personalization system.

2. The method of operation of claim 1, the method further comprising:

retrieving the lead-in programming content from a store of programming content, by at least one component of the content personalization system.

3. The method of operation of claim 1 wherein causing delivery of lead-in programming content via personalized delivery includes causing delivery of programming content that is free of advertising content.

4. The method of operation of claim 1 wherein causing delivery of lead-in programming content via personalized delivery includes providing a streaming feed of programming content that is free of advertising content by at least one content delivery server computer system.

5. The method of operation of claim 1 wherein determining whether a lead-in satisfaction condition is reached after a start of the causing of delivery of the lead-in programming content includes both determining whether a duration after the start has occurred exceeds a threshold duration and determining whether a total number of lead-in content segments caused to be delivered after the start exceeds a threshold number.

6. The method of operation of claim 1 wherein determining whether a lead-in satisfaction condition is reached after a start of the causing of delivery of the lead-in programming content includes determining whether a duration after the start has occurred exceeds a threshold duration.

7. The method of operation of claim 1 wherein determining whether a lead-in satisfaction condition is reached after a start of the causing of delivery of the lead-in programming content includes determining whether a total number of lead-in programming content segments caused to be delivered after the start has exceeded a threshold number.

8. The method of operation of claim 1, the method further comprising:

monitoring the broadcast content of the sequence of broadcast content for at least one of a start or a finish of at least one content segment, by at least one component of the content personalization system, and wherein the buffering at least some subsequent broadcast content of the sequence of broadcast content is responsive at least in part to detection of the start or the finish of at least one content segment in the sequence of broadcast content.

9. The method of operation of claim 8 wherein monitoring the broadcast content of the sequence of broadcast content for at least one of a start or a finish of at least one content segment includes monitoring the broadcast content for a start of any type of content segment.

10. The method of operation of claim 8 wherein monitoring the broadcast content of the sequence of broadcast content for at least one of a start or a finish of at least one content segment includes monitoring the broadcast content for the start or the finish of at least one of a programming or nonprogramming content segment, the programming content segment comprising programming content and the nonprogramming content segment comprising advertising content.

11. The method of operation of claim 8 wherein monitoring the broadcast content of the sequence of broadcast content for a start of at least one content segment includes monitoring the broadcast content for the start or the finish of a programming content segment.

12. The method of operation of claim 8 wherein monitoring the broadcast content of the sequence of broadcast content for a start of at least one content segment includes monitoring the broadcast content for the start or the finish of a nonprogramming content segment that consists of advertising content.

13. The method of operation of claim 8 wherein monitoring the broadcast content of the sequence of broadcast content for a start of at least one content segment includes monitoring the broadcast content for an inaudible marker.

14. The method of operation of claim 1, further comprising:

selecting a portion of the buffered subsequent broadcast content to deliver and wherein causing delivery of at least a portion of the buffered broadcast content via personalized delivery includes causing delivery of at least the portion of the buffered broadcast content starting from a start of the selecting a portion of the buffered subsequent broadcast content.

15. The method of operation of claim 14 wherein selecting a portion of the buffered subsequent broadcast content to deliver includes selecting an earliest complete content segment of the portion of the buffered broadcast content.

16. The method of operation of claim 14 wherein selecting a portion of the buffered subsequent broadcast content to deliver includes selecting a most recent complete content segment of the portion of the buffered broadcast content.

17. The method of operation of claim 1 wherein the buffering at least some subsequent broadcast content of the sequence of broadcast content is responsive to the request to start the personalized delivery or to causing the delivery of lead-in programming material, and causing delivery of at least a portion of the buffered broadcast content via personalized delivery includes causing delivery of at least the portion of the buffered broadcast content starting from a start of a buffered content segment.

18. The method of operation of claim 1 wherein the buffering at least some subsequent broadcast content of the sequence of broadcast content is responsive to the request to start the personalized delivery or to causing the delivery of lead-in programming material, and causing delivery of at least a portion of the buffered broadcast content via personalized delivery includes causing delivery of at least the portion of the buffered broadcast content starting from a start of a buffered programming content segment.

19. The method of operation of claim 1 wherein the buffering at least some subsequent broadcast content of the sequence of broadcast content is responsive to the request to start the personalized delivery or to causing the delivery of lead-in programming material, and causing delivery of at least a portion of the buffered broadcast content via personalized delivery includes causing delivery of at least the portion of the buffered broadcast content starting from a start of a buffered nonprogramming content segment.

20. The method of operation of claim 1 wherein buffering at least some subsequent broadcast content includes buffering a number of programming content segments of the broadcast at least until a defined condition is detected, the programming content segments free of advertising content.

21. The method of operation of claim 1 wherein buffering at least some subsequent broadcast content includes buffering a number of nonprogramming content segments of the broadcast at least until a defined condition is detected, the nonprogramming content segments consisting of advertising content.

22. The method of operation of claim 1 wherein buffering at least some subsequent broadcast content includes buffering all subsequent broadcast content at least until an end buffering condition is detected.

23. The method of operation of claim 22 wherein buffering all subsequent broadcast content at least until a defined condition is detected includes buffering both programming and nonprogramming content segments of the broadcast at least until an end buffering condition is detected.

24. The method of operation of claim 22, further comprising:
detecting the end buffering condition, by at least one component of the content personalization system; and
ceasing buffering of the subsequent broadcast content in response to detection of the end buffering condition, by at least one component of the content personalization system.

25. The method of operation of claim 24 wherein detecting the end buffering condition includes detecting at least one of a start or an end of at least one content segment in the sequence of broadcast content.

26. The method of operation of claim 1 wherein the personalized delivery is a personalized mediacast, and causing delivery of at least a portion of the buffered broadcast content via personalized delivery includes causing delivery of at least a portion of the buffered broadcast content with replacement nonprogramming content segments.

27. The method of operation of claim 1 wherein the personalized delivery is a personalized mediacast, and causing delivery of at least a portion of the buffered broadcast content via personalized delivery includes causing delivery of at least a portion of the buffered broadcast content via personalized delivery with replacement programming content segments.

28. A content personalization system, comprising:
at least one processor;
at least one nontransitory processor-readable medium communicatively coupled to the at least one processor, the at least one nontransitory processor-readable medium including one or more processor executable instruction sets that, when executed by the at least one processor, cause the at least one processor to:
in response to receipt of a request to start a unicast delivery of a sequence of broadcast content,
cause delivery of lead-in programming content via unicast delivery;
determine whether a satisfaction condition is reached after a start of the causing of delivery of the lead-in programming content;
buffer at least some subsequent broadcast content of the sequence of broadcast content, the broadcast content different from the lead-in programming content;
responsive to reaching the satisfaction condition, monitor for at least one of an end of a segment of the lead-in programming content which is being caused to be delivered or a start of a segment of the lead-in programming content which is being caused to be delivered; and
responsive to detection of at least one of the end or the start of the lead-in programming content segment, cause delivery of at least a portion of the buffered broadcast content via unicast delivery;
in response to a request to skip a content segment in a personalized delivery of a sequence of broadcast content:
cause delivery of filler content via the personalized delivery, by at least one component of the content personalization system;
monitor the broadcast content of the sequence of broadcast content in the personalized delivery for a start of at least one content segment, by at least one component of the content personalization system;
in response to detection of the start of at least one content segment in the sequence of broadcast content in the personalized delivery, cause a buffer to buffer at least some subsequent broadcast content of the sequence of broadcast content in the personalized delivery, by at least one component of the content personalization system;
in response to reaching the satisfaction condition, monitor for at least one of an end of a segment of the filler content which is being caused to be delivered or a start of a segment of the filler content which is being caused to be delivered, by at least one component of the content personalization system; and
in response to detection of at least one of the end or the start of the filler segment, cause delivery of at least a portion of the buffered broadcast content in the personalized delivery via unicast delivery, by at least one component of the content personalization system.

29. The system of claim 28 wherein the one or more processor executable instruction sets further cause the at least one processor to:
retrieve the lead-in programming content from a store of programming content.

30. The system of claim 28 wherein the one or more processor executable instruction sets that cause the at least one processor to cause delivery of lead-in programming content via unicast delivery further cause the at least one processor to:
  cause delivery of programming content free of advertising content.

* * * * *